United States Patent
Tomaru

(10) Patent No.: US 6,601,060 B1
(45) Date of Patent: Jul. 29, 2003

(54) INFORMATION SERVICE SYSTEM CAPABLE OF PROVIDING DESIRED INFORMATION DEPENDING ON USER-MEMORABLE INFORMATION

(75) Inventor: Tomonobu Tomaru, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/522,613

(22) Filed: Mar. 10, 2000

(30) Foreign Application Priority Data

Mar. 11, 1999 (JP) ............................. 11-064523
Feb. 28, 2000 (JP) ........................ 2000-050992

(51) Int. Cl.[7] ................................. G06F 17/30
(52) U.S. Cl. ................................. 707/3; 707/4
(58) Field of Search ............... 340/995; 364/444; 179/15.5; 395/200.47; 370/352; 707/3, 4

(56) References Cited

U.S. PATENT DOCUMENTS

| 4,311,876 A | * | 1/1982 | Endo et al. ................. 340/905 |
| 4,931,993 A | * | 6/1990 | Urushima ............... 365/189.01 |
| 4,954,958 A | * | 9/1990 | Savage et al. ......... 379/201.06 |
| 5,543,789 A | * | 8/1996 | Behr et al. .................. 340/990 |
| 5,740,369 A | * | 4/1998 | Yokozawa et al. .......... 235/382 |
| 2001/0015972 A1 | * | 8/2001 | Horiguchi et al. .......... 370/352 |

FOREIGN PATENT DOCUMENTS

| JP | 5189690 A | 7/1993 | .......... G08G/1/005 |
| JP | 6120877 A | 4/1994 | .......... G08G/1/005 |

* cited by examiner

Primary Examiner—Safet Metjahic
Assistant Examiner—Cam Linh Nguyen
(74) Attorney, Agent, or Firm—Birch, Stewart, Kolasch & Birch, LLP

(57) ABSTRACT

An information service system allowing a user to use user-memorable information to obtain desired information includes: a portable device referring to an input logical concept indicating a destination, such as a dining hall for breakfast, a public bath, to search for a physical concept, such as "AZALEA (corresponding to the name of a dining hall for breakfast)," a corner on the third floor, and transmit a retrieved physical concept to a stationary device installed, e.g., at an intersection of passageways in a hotel, and receiving from the stationary device a direction to be taken by the user and displaying such direction; and the stationary device searching for a direction to a physical concept and transmitting to the portable device a retrieved direction to the physical concept. The information service system also includes an association control system to rewrite an association between a logical concept and a physical concept that is stored in the portable device.

55 Claims, 65 Drawing Sheets

FIG. 2

|      | JAPANESE | ENGLISH   |
|------|----------|-----------|
| R001 | 朝食会場   | breakfast |
| R002 | 夕食会場   | dinner    |
| R003 | 宿泊部屋   | ...       |
| ...  | ...      | ...       |

FIG. 3

|      | JAPANESE | ENGLISH |
|------|----------|---------|
| S001 | 右       | right   |
| S002 | 左       | left    |
| S003 | 直進     | ...     |
| ...  | ...      | ...     |

FIG. 5

| LOGICAL CONCEPT | PHYSICAL CONCEPT |
|---|---|
| LODGING | ROOM NO. 301 |
| DINING HALL FOR BREAKFAST | AZALEA |
| DINING HALL FOR DINNER | ⋮ |
| PUBLIC BATH | ⋮ |
| ⋮ | ⋮ |

FIG. 7

| LOGICAL CONCEPT | DIRECTION |
|---|---|
| ROOM NO. 201 | TURN RIGHT |
| ... | ... |
| ROOM NO. 999 | GO UPSTAIRS |
| AZALEA | GO STRAIGHT AHEAD |
| ⋮ | ⋮ |

FIG. 21

| ID NO. | 001 | 002 | 003 | 004 | ... |
|---|---|---|---|---|---|
| LODGING | ROOM NO. 305 | ROOM NO. 306 | ROOM NO. 412 | ROOM NO. 413 | |
| DINING HALL FOR BREAKFAST | AZALEA | AZALEA | SAFFRON | SAFFRON | |
| DINING HALL FOR DINNER | | | | | |
| ... | | | | | |

FIG. 22

| PHYSICAL CONCEPT | DIRECTION |
|---|---|
| ROOM NO. 201 | TURN RIGHT |
| ... | ... |
| ROOM NO. 999 | GO UPSTAIRS |
| AZALEA | GO STRAIGHT AHEAD |
| ⋮ | ⋮ |

FIG. 32

| TO HONOLULU, DEPARTING AT 10:23 | JAM, FLIGHT NO. 323 |
|---|---|
| TO HELSINKI, DEPARTING AT 10:51 | JAM, FLIGHT NO. 421 |
| TO CANBERRA, DEPARTING AT 11:20 | JAM, FLIGHT NO. 222 |
| ⋮ | ⋮ |

FIG. 34

| JAM, FLIGHT NO. 323 | GATE NO. 15 |
|---|---|
| JAM, FLIGHT NO. 421 | GATE NO. 32 |
| JAM, FLIGHT NO. 222 | GATE NO. 2 |
|  |  |
| ⋮ |  |

FIG. 35

| GATE NO. 1 | RIGHT |
|---|---|
| GATE NO. 2 | LEFT |
| GATE NO. 3 | LEFT |
| GATE NO. 4 | RIGHT |
| ⋮ |  |

FIG. 46

| NAME OF BANK | 1ST BANK | 2ND BANK | ... |
|---|---|---|---|
| NEAREST BANK/ATM | 32ND BANK AKASAKA BRANCH | 8TH BANK KITA-AKASAKA BRANCH | ... |
| BUSINESS HOUR | 9:00—17:00 | 24 HOURS | ... |

FIG. 47

| PHYSICAL CONCEPT | DIRECTION |
|---|---|
| 32ND BANK, AKASAKA BRANCH | TURN RIGHT |
| 8TH BANK, KITA-AKASAKA BRANCH | GO STRAIGHT AHEAD |
| ⋮ | ⋮ |

FIG. 58

| ID NO. OF CELLULAR STATION | 1058 | 3402 | . . . |
|---|---|---|---|
| LOCATION OF CELLULAR STATION | LAT. 45° N LONG. 30° E | LAT. 46° N LONG. 32° E | . . . |

FIG. 59

| NAME OF BRANCH BANK/FACILITY WITH ATM INSTALLED | 32ND BANK, AKASAKA BRANCH | 8TH BANK, KITA-AKASAKA BRANCH | . . . |
|---|---|---|---|
| LOCATION | LAT. 46° N LONG. 31° E | LAT. 46° N LONG. 33° E | . . . |
| BUSINESS HOUR | 9:00—17:00 | 24 HOURS | . . . |
| AFFILIATE BANK | 1ST BANK 6TH BANK 32ND BANK | 2ND BANK 8TH BANK | . . . |

FIG. 64

|  |  | ID NO. OF CELLULAR STATION ||
|  |  | 1058 | 6295 |
| --- | --- | --- | --- |
| AFFILIATE BANK | 32ND BANK, AKASAKA BRANCH | TURN RIGHT | TURN LEFT |
| | 8TH BANK, KITA-AKASAKA BRANCH | TURN LEFT | GO STRAIGHT AHEAD |

INFORMATION SERVICE SYSTEM CAPABLE OF PROVIDING DESIRED INFORMATION DEPENDING ON USER-MEMORABLE INFORMATION

BACKGROUND OF THE INVENTION

1. Field of the Invention

The present invention relates to information service systems, and portable devices and information service devices used in such information service systems. The present invention relates particularly to information service systems capable of providing a user with desired information when the user simply inputs thereto a logical concept memorable for the user, and portable devices and information service devices used in such information service systems.

2. Description of the Background Art

Lodgers in a hotel or the like require positional information on their lodgings, dining hall for breakfast and the like. If a lodger is a tourist belonging to a tour group the lodger can obtain such information from a tour guide. If a lodger is an individual tourist, the lodger can obtain such information from the reception of the hotel. At any rate, it is necessary for a lodger to associate his or her lodging, dining hall for breakfast and the like with his or her room number, the name of the dining hall for breakfast and the like, respectively.

Conventionally, in moving to a lodging, a dining hall for breakfast and the like, a lodger refers to his or her own memory and a guide map of the hotel where the lodger stays, to determine a route to his or her destination in the hotel for himself or herself and go to the destination. However, a room number, the name of a hall and the like are in effect a simple number, a name such as a proper noun, and the like, respectively, and are in general forgettable. As such, the lodger can often forget a room number or the name of a hall and in that case must obtain the information on the room number and the like again from the reception or the like of the hotel. Such information changes whenever a lodger changes his or her accommodation, and the lodger must memorize different such information for each accommodation.

Japanese Patent Laying-Open No. 5-189690 discloses a guide system assisting a user in moving to a destination. Referring to FIG. 68, the conventional guide system includes more than one transmitter 10 used in a building, an exhibition hall and the like and each installed on a passageway at a predetermined position to transmit positional information indicating its installed position, and a user-portable, direction guide device 20. The positional information is used in direction guide device 20 to determine the current position.

Direction guide device 20 includes a start-point memory 21 storing a start point input by a user, a destination memory 22 storing a destination input by the user, a receive block 23 receiving positional information transmitted from transmitter 10, and a map memory 24 previously storing a route (i.e., a direction to the destination and the location at which transmitter 10 is installed) in a form of on-map information.

Direction guide device 20 also includes an on-map information search block 25 connected to start-point memory 21, destination memory 22 and map memory 24 to refer to a start point stored in start-point memory 21 and a destination stored in destination memory 22 to search map memory 24 for on-map information on a route and direction to the destination, and a route memory 26 connected to on-map information search block 25 to store on-map information (a route) retrieved by on-map information search block 25.

Direction guide device 20 also includes a direction guide block 27 connected to route memory 26 and receive block 23 to refer to positional information received by receive block 23 and on-map information stored in route memory 26 to indicate a direction to be taken by the user.

A user receives direction guide device 20 at a reception or the like and inputs thereinto a start point and a destination. Based on the start point and the destination, on-map information search block 25 calculates a route to the destination which is in turn stored in route memory 26. When the user approaches a transmitter installed for example at an intersection of passageways, receive block 23 receives positional information. Direction guide block 27 refers to the route to the destination stored in route memory 26 and the positional information received by receive block 23 to determine and indicate to the user a direction to be taken by the user. Thus the user can efficiently reach the destination.

If such guide system is used in an accommodation facility such as a hotel, however, the user must associate his or her necessary logical concepts, such as a lodging, a dining hall for breakfast, with physical concepts, such as a room number, the name of the dining hall for breakfast, and thus memorize them. As such, if the user uses more accommodations in the hotel, it is difficult for the user to memorize such correspondence. Furthermore, this guide system cannot display information in a manner switched depending on the user, such as in languages switched depending on the user. Furthermore, this guide system having an internal map memory for storing data large in scale corresponding to a map, would disadvantageously increase the size of the device itself and render the device inconvenient to hold.

Furthermore, the user is required to input to the guide system both a start point and a destination, which is also required to be input in the form of a physical concept described above. As such, the system is inconvenient for the user to use.

SUMMARY OF THE INVENTION

The present invention has been made to overcome the disadvantages described above and contemplates an information service system using user-memorable information to provide desired information, and a portable device and an information service device used in such information service system.

The present invention also contemplates an information service system providing information allowing a user to efficiently reach a destination if the user does not know the name of the destination, and a portable device and an information service device used in such information service system.

The present invention also contemplates an information service system capable of providing information allowing a user to reach a destination without inputting the user's start point, and a portable device and an information service device used in such information service system.

The present invention also contemplates a portable device convenient to hold.

In accordance with the present invention in one aspect an information service system includes a portable device receiving information contained in a first group and converting the information contained in the first group into information contained in a second group for output, and an information service device receiving the information contained in the second group and converting the information contained in the second group into information contained in a third group. The portable device includes an input block inputting the information contained in the first group, a first memory storing an association between the information contained in the first group and the information contained in the second group, a first conversion block connected to the input block and the first memory to receive the information contained in the first group and refer to the association stored in the first memory to convert the information contained in the first group into the information contained in the second group, and a first transmit block connected to the first conversion block to receive an output of the first conversion block and transmit the output of the first conversion block to the information service device. The information service device includes a second memory storing an association between the information contained in the second group and the information contained in the third group, a first receive block receiving information from the first transmit block, and a second conversion block connected to the first receive block and the second memory to receive an output of the first receive block and refer to the association stored in the second memory to convert the information contained in the second group into the information contained in the third group for output.

The information contained in the first group is adapted to be information easy for a user to memorize and the information contained in the second group is adapted to be information hard for the user to memorize. As such, the user can use the information easy for the user to memorize to obtain desired information contained in the third group. Thus the user can readily obtain desired information. For example, a logical concept, such as a dining hall for breakfast, a lodging, is prepared as the information contained in the first group, and a physical concept indicative of a destination, such as "AZALEA (corresponding to the name of the dining hall for breakfast)," "a corner on the third floor," is prepared as the information contained in the second group. Furthermore, a direction to a destination, such as a leftward direction, a rightward direction, is prepared as the information contained in the third group. Thus, if the user does not know the name of his or her destination, the user can efficiently reach the destination.

If the information service device is provided in a facility at various locations, simply by inputting a logical concept to the portable device the user can obtain from the information service device a direction to his or her destination. Thus, without inputting his or her current position the user can efficiently reach the destination.

Furthermore, the portable device is not required to store data large in scale, such as information in the form of a map. Thus the portable device can be miniaturized and thus easy for the user to hold.

Preferably the second memory includes a third memory storing an association between the information contained in the second group and information contained in a fourth group, and a fourth memory storing an association between the information contained in the fourth group and the information contained in the third group. The second conversion block includes a third conversion block connected to the first receive block and the third memory to receive the output of the first receive block and refer to the association stored in the third memory to convert the information contained in the second group into the information contained in the fourth group for output, and a fourth conversion block connected to the third conversion block and the fourth memory to receive an output of the third conversion block and refer to the association stored in the fourth memory to convert the information contained in the fourth group into the information contained in the third group for output.

If it is difficult to obtain an association between the information contained in the second group and that contained in the third group, an association between the information contained in the second group and the additionally prepared information contained in the fourth group and an association between the information contained in the fourth group and that contained in the third group can be used to allow the information contained in the second group to be converted into that contained in the third group.

For example, if the present system is used in an airport, the information contained in the first group may be the destination and time of an airplane to board, and the information contained in the second group may be the flight number of the airplane. Furthermore, the information contained in the fourth group may be a gate number and the information contained in the third group may be a direction to a boarding gate corresponding to the gate number. The destination and time of the airplane to board and the gate number for the airplane are previously not definite. In other words, when a ticket for the airplane is actually purchased the destination and time of the airplane and the gate number therefor do not yet have therebetween a definite association while the destination and time of the airplane and the flight number thereof already have a definite association therebetween. As such, introducing new information, or the flight number of the airplane, can distinctively separate an association definite when a ticket for the airplane is purchased (an association between the destination and time of the airplane and the flight number of the airplane) and an association definite on the day of the departure of the airplane (an association between the flight number of the airplane and the gate number for the airplane). The association between the destination, time and the flight number may be stored in the portable device at the first memory, and the association between the flight number and the gate number may be stored in the information service device at the third memory. If an association between a destination, time and a gate number can be separated in two, such association can be readily understood and controlled. For example, an association between a destination, time and a flight number, stored in the portable device, may be controlled by an airline, while an association between the flight number and a gate number, stored in the information service device, may be controlled by an airport management office.

Still preferably the portable device further includes an information output block outputting the information contained in the fourth group. The first memory stores an association between the information contained in the first group, the information contained in the second group and the information contained in the fourth group. The first conversion block is connected to the input block, the information output block and the first memory to receive the information contained in the first group and the information contained in the fourth group and refer to the association stored in the first memory to convert the information contained in the first group and the information contained in the fourth group into the information contained in the second group.

For example, the information contained in the first group may be the name of a bank which a user desires to use (the name of the bank of interest) and the information contained in the second group may be the name of a bank which accepts a bank book or a cash card of the bank of interest (the name of an affiliate bank). Furthermore, the information contained in the third group may be a direction to the affiliate bank and the information contained in the fourth group may be time. The first memory is adapted to store the name of the bank of interest, the name of the affiliate bank, and the business hours of the affiliate bank. As such, the user is only required to input the name of the bank of interest to obtain information on the name of any affiliate bank currently open for business and obtain information on a direction to the affiliate bank via the information service device. Thus the user efficiently reach a destination if the user does not know specifically the name, location or business hours of the destination.

In accordance with the present invention in another aspect a portable device is used in an information service system including a portable device receiving and converting information contained in a first group into information contained in a second group for output, and an information service device receiving and converting the information contained in the second group into information contained in a third group. The portable device includes an input block inputting the information contained in the first group, a first memory storing an association between the information contained in the first group and the information contained in the second group, a first conversion block connected to the input block and the first memory to receive the information contained in the first group and refer to the association stored in the first memory to convert the information contained in the first group into the information contained in the second group, and a first transmit block connected to the first conversion block to receive and transmit an output of the first conversion block to the information service device.

The information contained in the first group is adapted to be information easy for a user to memorize and the information contained in the second group is adapted to be information hard for the user to memorize. As such, the user can use the information easy for the user to memorize to obtain desired information contained in the third group. Thus the user can readily obtain desired information. For example, a logical concept, such as a dining hall for breakfast, a lodging, is prepared as the information contained in the first group, and a physical concept indicative of a destination, such as "AZALEA," "a corner on the third floor," is prepared as the information contained in the second group. Furthermore, a direction to a destination, such as a leftward direction, a rightward direction, is prepared as the information contained in the third group. Thus, if the user does not know the name of his or her destination, the user can efficiently reach the destination.

If the information service device is provided in a facility at various locations, simply by inputting a logical concept to the portable device the user can obtain from the information service device a direction to his or her destination. Thus, without inputting his or her current position the user can efficiently reach the destination.

Furthermore, the portable device is not required to store data large in scale, such as information in the form of a map. Thus the portable device can be miniaturized and thus easy for the user to hold.

In accordance with the present invention in another aspect an information service device is used in an information service system including a portable device receiving and converting information contained in a first group into information contained in a second group for output, and an information service device receiving and converting the information contained in the second group into information contained in a third group. The information service device includes a first memory storing an association between the information contained in the second group and the information contained in the third group, a first receive block receiving from the portable device the information contained in the second group, and a first conversion block connected to the first receive block and the first memory to receive an output of the first receive block and refer to the association stored in the first memory to convert the information contained in the second group into the information contained in the third group for output.

The information contained in the first group is adapted to be information easy for a user to memorize and the information contained in the second group is adapted to be information hard for the user to memorize. As such, the user can use the information easy for the user to memorize to obtain desired information contained in the third group. Thus the user can readily obtain desired information. For example, a logical concept, such as a dining hall for breakfast, a lodging, is prepared as the information contained in the first group, and a physical concept indicative of a destination, such as "AZALEA," "a corner on the third floor," is prepared as the information contained in the second group. Furthermore, a direction to a destination, such as a leftward direction, a rightward direction, is prepared as the information contained in the third group. Thus, if the user does not know the name of his or her destination, the user can efficiently reach the destination.

If the information service device is provided in a facility at various locations, simply by inputting a logical concept to the portable device the user can obtain from the information service device a direction to his or her destination. Thus, without inputting his or her current position the user can efficiently reach the destination.

In accordance with the present invention in still another aspect an information service system includes a portable device receiving information contained in a first group and outputting the information contained in the first group and an identifier of the portable device, and an information service device receiving and converting the information contained in the first group and the identifier into information contained in a second group and further converting the information contained in the second group into information contained in a third group for output. The portable device includes an identifier memory storing the identifier, an input block inputting the information contained in the first group, and a first transmit block connected to the input block and the identifier memory to receive the information contained in the first group and transmit to the information service device the information contained in the first group and the identifier stored in the identifier memory. The information service device includes a first receive block receiving information from the first transmit block, a first memory storing an association between the information contained in the first group, the identifier and the information contained in the second group, a second memory storing an association between the information contained in the second group and the information contained in the third group, a first conversion block connected to the first receive block and the first memory to receive an output of the first receive block and refer to the association stored in the first memory to convert the information contained in the first group and the identifier into the information contained in the second group for output, and a second conversion block connected to the first conversion block and the second memory to receive an output of the first conversion block and refer to the association stored in the second memory to convert the information contained in the second group into the information contained in the third group for output.

The information contained in the first group is adapted to be information easy for a user to memorize and the information contained in the second group is adapted to be information hard for the user to memorize. As such, the user can use the information easy for the user to memorize to obtain desired information contained in the third group. Thus the user can readily obtain desired information. For example, a logical concept, such as a dining hall for breakfast, a lodging, is prepared as the information contained in the first group, and a physical concept indicative of a destination, such as "AZALEA," "a corner on the third floor," is prepared as the information contained in the second group. Furthermore, a direction to a destination, such as a leftward direction, a rightward direction, is prepared as the information contained in the third group. Thus, if the user does not know the name of his or her destination, the user can efficiently reach the destination.

If the information service device is provided in a facility at various locations, simply by inputting a logical concept to the portable device the user can obtain from the information service device a direction to his or her destination. Thus, without inputting his or her current position the user can efficiently reach the destination.

Furthermore, the portable device is not required to store data large in scale, such as information in the form of a map. Thus the portable device can be miniaturized and thus easy for the user to hold.

Preferably the information service system also includes a central control system connected to the first memory to rewrite the association between the information contained in the first group, the identifier and the information contained in the second group that is stored in the first memory.

The central control system collectively rewrites an association between the information contained in the first group, an identifier and the information contained in the second group that is stored in the first memory. This eliminates the necessity of rewriting the association between the information contained in the first group and that contained in the second group for each portable device and thus allows such association to be rewritten efficiently.

In accordance with the present invention in still another aspect a portable device is used in an information service system including a portable device receiving information contained in a first group and outputting the information contained in the first group and an identifier of the portable device, and an information service device receiving and converting the information contained in the first group and the identifier into information contained in a second group and further converting the information contained in the second group into information contained in a third group for output. The portable device includes an identifier memory storing the identifier, an input block inputting the information contained in the first group, and a first transmit block connected to the input block and the identifier memory to receive the information contained in the first group and transmit to the information service device the information contained in the first group and the identifier stored in the identifier memory.

The information contained in the first group is adapted to be information easy for a user to memorize and the information contained in the second group is adapted to be information hard for the user to memorize. As such, the user can use the information easy for the user to memorize to obtain desired information contained in the third group. Thus the user can readily obtain desired information. For example, a logical concept, such as a dining hall for breakfast, a lodging, is prepared as the information contained in the first group, and a physical concept indicative of a destination, such as "AZALEA," "a corner on the third floor," is prepared as the information contained in the second group. Furthermore, a direction to a destination, such as a leftward direction, a rightward direction, is prepared as the information contained in the third group. Thus, if the user does not know the name of his or her destination, the user can efficiently reach the destination.

If the information service device is provided in a facility at various locations, simply by inputting a logical concept to the portable device the user can obtain from the information service device a direction to his or her destination. Thus, without inputting his or her current position the user can efficiently reach the destination.

Furthermore, the portable device is not required to store data large in scale, such as information in the form of a map. Thus the portable device can be miniaturized and thus easy for the user to hold.

In accordance with the present invention in still another aspect an information service device is used in an information service system including a portable device receiving information contained in a first group and outputting the information contained in the first group and an identifier of the portable device, and an information service device receiving and converting the information contained in the first group and the identifier into information contained in a second group and further converting the information contained in the second group into information contained in a third group for output. The information service device includes a first receive block receiving an output of the portable device, a first memory storing an association between the information contained in the first group, the identifier and the information contained in the second group, a second memory storing an association between the information contained in the second group and the information contained in the third group, a first conversion block connected to the first receive block and the first memory to receive an output of the first receive block and refer to the association stored in the first memory to convert the information contained in the first group and the identifier into the information contained in the second group for output, and a second conversion block connected to the first conversion block and the second memory to receive an output of the first conversion block and refer to the association stored in the second memory to convert the information contained in the second group into the information contained in the third group for output.

The information contained in the first group is adapted to be information easy for a user to memorize and the information contained in the second group is adapted to be information hard for the user to memorize. As such, the user can use the information easy for the user to memorize to obtain desired information contained in the third group. Thus the user can readily obtain desired information. For example, a logical concept, such as a dining hall for breakfast, a lodging, is prepared as the information contained in the first group, and a physical concept indicative of a destination, such as "AZALEA," "a corner on the third floor," is prepared as the information contained in the second group. Furthermore, a direction to a destination, such as a leftward direction, a rightward direction, is prepared as the information contained in the third group. Thus, if the user does not know the name of his or her destination, the user can efficiently reach the destination.

If the information service device is provided in a facility at various locations, simply by inputting a logical concept to the portable device the user can obtain from the information service device a direction to his or her destination. Thus, without inputting his or her current position the user can efficiently reach the destination.

In accordance with the present invention in still another aspect an information service system includes a portable device receiving information contained in a first group and outputting the information contained in the first group, and an information service device receiving the information contained in the first group and converting the information contained in the first group into information contained in a second group and further converting the information contained in the second group into information contained in a third group for output. The portable device includes an input block inputting the information contained in the first group, and a first transmit block connected to the input block to receive the information contained in the first group and transmit to the information service device the information contained in the first group. The information service device includes a first receive block receiving information from the first receive block, an information output block outputting information contained in a fourth group, a first memory storing an association between the information contained in the first group, the information contained in the second group and the information contained in the fourth group, a second memory storing an association between the information stored in the second group and the information stored in the third group, a first conversion block connected to the first receive block, the information output block and the first memory to receive the information contained in the first group and the information contained in the fourth group and refer to the association stored in the first memory to convert the information contained in the first group and the information contained in the fourth group into the information contained in the second group, and a second conversion block connected to the first conversion block and the second memory to receive an output of the first conversion block and refer to the association stored in the second memory to convert the information contained in the second group into the information contained in the third group for output.

For example, the information contained in the first group may be the name of a bank which a user desires to use (the name of the bank of interest) and the information contained in the second group may be the name of a bank which accepts a bank book or a cash card of the bank of interest (the name of an affiliate bank). Furthermore, the information contained in the third group may be a direction to the affiliate bank and the information contained in the fourth group may be time. The first memory is adapted to store the name of the bank of interest, the name of the affiliate bank and the business hours of the affiliate bank, and the second memory is adapted to store the name of the affiliate bank and the direction to the affiliate bank. As such, the user is only required to input the name of the bank of interest to obtain information on a direction to an affiliate bank currently open for business. Thus the user efficiently reach a destination if the user does not know specifically the name, location or business hours of the destination.

In accordance with the present invention in still another aspect a portable device is used in an information service system including a portable device receiving and outputting information contained in a first group, and an information service device receiving and converting the information contained in the first group into information contained in the second group and further converting the information contained in the second group into information contained in a third group for output. The portable device includes an input block inputting information contained in the first group, an identifier memory storing an identifier of the portable device, a transmit block connected to the input block and the identifier memory to transit to the information service device the information contained in the first group together with the identifier of the portable device, a receive block receiving from the information service device the information contained in the third group and the identifier of the portable device, and a display block connected to the receive block and the identifier memory to refer to a result of comparing the identifier received by the receive block with the identifier stored in the identifier memory to display the information contained in the third group.

The portable device transmits to the information service device an identifier which is in tern sent back to the portable device together with the information contained in the third group. As such, the portable device can display on the display block only the information transmitted thereto.

In accordance with the present invention in still another aspect an information service device is used in an information service system including a portable device receiving and outputting information contained in a first group, and an information service device receiving and converting the information contained in the first group into information contained in a second group and further converting the information contained in the second group into information contained in a third group for output. The information service device includes a first receive block receiving information from the portable device, an information output block outputting information contained in a fourth group, a first memory storing an association between the information contained in the first group, the information contained in the second group and the information contained in the fourth group, a second memory storing an association between the information stored in the second group and the information stored in the third group, a first conversion block connected to the receive block, the information output block and the first memory to receive the information contained in the first group and the information contained in the fourth group and refer to the association stored in the first memory to convert the information contained in the first group and the information contained in the fourth group into the information contained in the second group, and a second conversion block connected to the first conversion block and the second memory to receive an output of the first conversion block and refer to the association stored in the second memory to convert the information contained in the second group into the information contained in the third group for output.

For example, the information contained in the first group may be the name of a bank which a user desires to use (the name of the bank of interest) and the information contained in the second group may be the name of a bank which accepts a bank book or a cash card of the bank of interest (the name of an affiliate bank). Furthermore, the information contained in the third group may be a direction to the affiliate bank and the information contained in the fourth group may be time. The first memory is adapted to store the name of the bank of interest, the name of the affiliate bank, and the business hours of the affiliate bank, and the second memory is adapted to store the name of the affiliate bank and the direction to the affiliate bank. As such, the user is only required to input the name of the bank of interest to obtain information on a direction to an affiliate bank currently open for business. Thus the user efficiently reach a destination if the user does not know specifically the name, location or business hours of the destination.

In accordance with the present invention in still another aspect an information service system includes a portable device receiving information contained in a first group and outputting the information contained in the first group, an information service device receiving the information contained in the first group and converting the information contained in the first group into information contained in a second group and further converting the information contained in the second group into information contained in a third group for output, and a relay device relaying information between the portable device and the information service device. The portable device includes an input block inputting the information contained in the first group, and a first transmit block connected to the input block to receive the information contained in the first group and transmit to the relay device the information contained in the first group. The relay device includes a first receive block receiving information from the first transmit block, and a second transmit block connected to the first receive block to receive the information contained in the first group and transmit to the information service device the information contained in the first group. The information service device includes a first memory storing an association between the information contained in the first group and the information contained in the second group, a second memory storing an association between the information contained in the second group and the information contained in the third group, a second receive block receiving information from the relay device, a first conversion block connected to the second receive block and the first memory to refer to the association stored in the first memory to convert the information contained in the first group into the information contained in the second group for output, and a second conversion block connected to the first conversion block and the second memory to refer to the association stored in the second memory to convert the information contained in the second group into the information contained in the third group for output.

The portable device and the information service device are adapted to communicate information with each other via a relay device. As such, if for example the information service device is an artificial satellite and the relay device is a cellular station, the information service system can provide information in a wide range of area.

Preferably the information service device also includes an information output block outputting information contained in a fourth group. The first memory stores an association between the information contained in the first group, the information contained in the second group and the information contained in the fourth group. The first conversion block is connected to the second receive block, the information output block and the first memory to refer to the association stored in the first memory to convert the information contained in the first group and the information contained in the fourth group into the information contained in the second group for output.

For example, the information contained in the first group may be the name of a bank which a user desires to use (the name of the bank of interest) and the information contained in the second group may be the name of a bank which accepts a bank book or a cash card of the bank of interest (the name of an affiliate bank). Furthermore, the information contained in the third group may be a direction to the affiliate bank and the information contained in the fourth group may be time. The first memory is adapted to store the name of the bank of interest, the name of the affiliate bank, and the business hours of the affiliate bank, and the second memory is adapted to store the name of the affiliate bank and the direction to the affiliate bank. As such, the user is only required to input the name of the bank of interest to obtain information on a direction to an affiliate bank currently open for business. Thus the user efficiently reach a destination if the user does not know specifically the name, location or business hours of the destination.

Still preferably the relay device also includes a relay device identifier memory storing an identifier of the relay device. The second transmit block is connected to the first receive block and the relay device identifier memory to transmit to the information service device the information contained in the first group together with the identifier of the relay device. The information service device also includes a third memory storing an association between the identifier of the relay device and information contained in a fifth group. The first memory stores an association between the information contained in the first group, the information contained in the second group, the information contained in the fourth group and the information contained in the fifth group. The first conversion block is connected to the second receive block, the information output block, the first memory and the third memory to receive the identifier of the relay device and refer to the association stored in the third memory to convert the identifier of the relay device into the information contained in the fifth group, and further refer to the association stored in the first memory to convert the information contained in the first group, the information contained in the fourth group and the information contained in the fifth group into the information contained in the second group for output.

For example, with the information contained in the fifth group corresponding to the location of a relay device, the first memory may store an association between the name of the bank of interest, the name of an affiliate bank, a direction to the affiliate bank, and the location of the relay device. As such, the information service device can refer to the location of the relay device having relayed data, to select an affiliate bank closest to the relay device and thus provide a direction to the affiliate bank. Thus the information service system can provide information depending on the user's position, as appropriate.

In accordance with the present invention in still another aspect an information service device is used in an information service system including a portable device receiving and outputting information contained in a first group, an information service device receiving and converting the information contained in the first group into information contained in a second group and further converting the information contained in the second group into information contained in a third group for output, and a relay device relaying information between the portable device and the information service device. The information service device includes a first memory storing an association between the information contained in the first group and the information contained in the second group, a second memory storing an association between the information contained in the second group and the information contained in the third group, a receive block receiving the information from the relay device, a first conversion block connected to the receive block and the first memory to refer to the association stored in the first memory to convert the information contained in the first group into the information contained in the second group for output, and a second conversion block connected to the first conversion block and the second memory to refer to the association stored in the second memory to convert the information contained in the second group into the information contained in the third group for output.

The portable device and the information service device are adapted to communicate information with each other via a relay device. As such, if for example the information service device is an artificial satellite and the relay device is a cellular station, the information service system can provide information in a wide range of area.

In accordance with the present invention in still another aspect the information service system includes a portable device receiving information contained in a first group and converting the information contained in the first group into information contained in a second group for output, an information service device receiving the information contained in the second group and converting the information contained in the second group into information contained in a third group for output, and a relay device relaying information between the portable device and the information service device. The portable device includes an input block inputting the information contained in the first group, a first memory storing an association between the information contained in the first group and the information contained in the second group, a first conversion block connected to the input block and the first memory to refer to the association stored in the first memory to convert the information contained in the first group into the information contained in the second group, and a first transmit block connected to the first conversion block to transmit to the relay device the information contained in the second group. The relay device includes a first receive block receiving information from the first transmit block, and a second transmit block connected to the first receive block to receive the information contained in the second group and transmit to the information service device the information contained in the second group. The information service device includes a second memory storing an association between the information contained in the second group and the information contained in the third group, a second receive block receiving information from the second transmit block, and a second conversion block connected to the second receive block and the second memory to refer to the association stored in the second memory to convert the information received by the second receive block and contained in the second group into the information contained in the third group for output.

The portable device and the information service device are adapted to communicate information with each other via a relay device. As such, if for example the information service device is an artificial satellite and the relay device is a cellular station, the information service system can provide information in a wide range of area.

Preferably the portable device also includes an information output block outputting the information contained in the fourth group. The first memory stores an association between the information contained in the first group, the information contained in the second group and the information contained in the fourth group. The first conversion block is connected to the input block, the information output block and the first memory to refer to the association stored in the first memory to convert the information contained in the first group and the information contained in the fourth group into the information contained in the second group for output.

For example, the information contained in the first group may be the name of a bank which a user desires to use (the name of the bank of interest) and the information contained in the second group may be the name of a bank which accepts a bank book or a cash card of the bank of interest (the name of an affiliate bank). Furthermore, the information contained in the third group may be a direction to the affiliate bank and the information contained in the fourth group may be time. The first memory is adapted to store the name of the bank of interest, the name of the affiliate bank, and the business hours of the affiliate bank, and the second memory is adapted to store the name of the affiliate bank and the direction to the affiliate bank. As such, the user is only required to input the name of the bank of interest to obtain information on a direction to an affiliate bank currently open for business. Thus the user efficiently reach a destination if the user does not know specifically the name, location or business hours of the destination.

In accordance with the present invention in still another aspect a portable device is used in an information service system including a portable device receiving information contained in a first group and converting the information contained in the first group into information contained in a second group for output, an information service device receiving the information contained in the second group and converting the information contained in the second group into information contained in a third group for output, and a relay device relaying information between the portable device and the information service device. The portable device includes an input block inputting the information contained in the first group, a memory storing an association between the information contained in the first group and the information contained in the second group, a conversion block connected to the input block and the memory to refer to the association stored in the memory to convert the information contained in the first group into the information contained in the second group for output, and a transmit block connected to the conversion block to transmit to the relay device the information contained in the second group.

The portable device and the information service device are adapted to communicate information with each other via a relay device. As such, if for example the information service device is an artificial satellite and the relay device is a cellular station, the information service system can provide information in a wide range of area.

In accordance with the present invention in still another aspect an information service device is used in an information service system including a portable device receiving and converting information contained in a first group into information contained in a second group for output, an information service device receiving and converting the information contained in the second group into information contained in a third group for output, and a relay device relaying information between the portable device and the information service device. The information service device includes a memory storing an association between the information contained in the second group and the information contained in the third group, a receive block receiving information from the relay device, and a conversion block connected to the receive block and the memory to refer to the association stored in the memory to convert the information received by the receive block and contained in the second group into the information contained in the third group for output.

The portable device and the information service device are adapted to communicate information with each other via a relay device. As such, if for example the information service device is an artificial satellite and the relay device is a cellular station, the information service system can provide information in a wide range of area.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates codes for logical concepts.

FIG. 3 illustrates codes for directions.

FIG. 5 represents associations between logical concepts and physical concepts stored in an LC-PC correspondence memory 303.

FIG. 7 represents associations between physical concepts and directions stored in a PC-direction correspondence memory 313.

FIG. 21 illustrates associations stored in an LC-PC correspondence memory 1313, each between a logical concept, ID number and a physical concept.

FIG. 22 illustrates associations stored in PC-direction correspondence memory 1315, each between a physical concept and a direction.

FIG. 32 illustrates associations stored in an LC-IC correspondence memory 2303, each between a logical concept and an intermediate concept.

FIG. 34 illustrates associations stored in an IC-PC correspondence memory 2313, each between an intermediate concept and a physical concept.

FIG. 35 illustrates associations stored in a PC-direction correspondence memory 2315, each between a physical concept and a direction.

FIG. 46 illustrates an association between the name of the bank of interest, the name of an affiliate bank and the business hours of the affiliate bank that is stored in an LC-PC correspondence memory 2813.

FIG. 47 illustrates an association between the name of an affiliate bank and a direction to the affiliate bank that is stored in a PC-direction correspondence memory 2816.

FIG. 58 illustrates an association between the ID number of a cellular station and the exact location of the cellular station that is stored in a memory storing the locations of cellular stations 3511.

FIG. 59 illustrates an association stored in an LC-PC correspondence memory 3518 between the name of a bank, the location of the bank, the business hours of the bank and the name of the bank of interest with which the above bank is affiliated.

FIG. 64 illustrates an association between a cellular station's ID number, an affiliate bank's name and the affiliate bank's direction that is stored in artificial satellite 3701 at a PC-direction correspondence memory 3213.

DESCRIPTION OF THE PREFERRED EMBODIMENTS

First Embodiment

An information service system according to one embodiment of the present invention will now be described with reference to the drawings.

Figure 1:
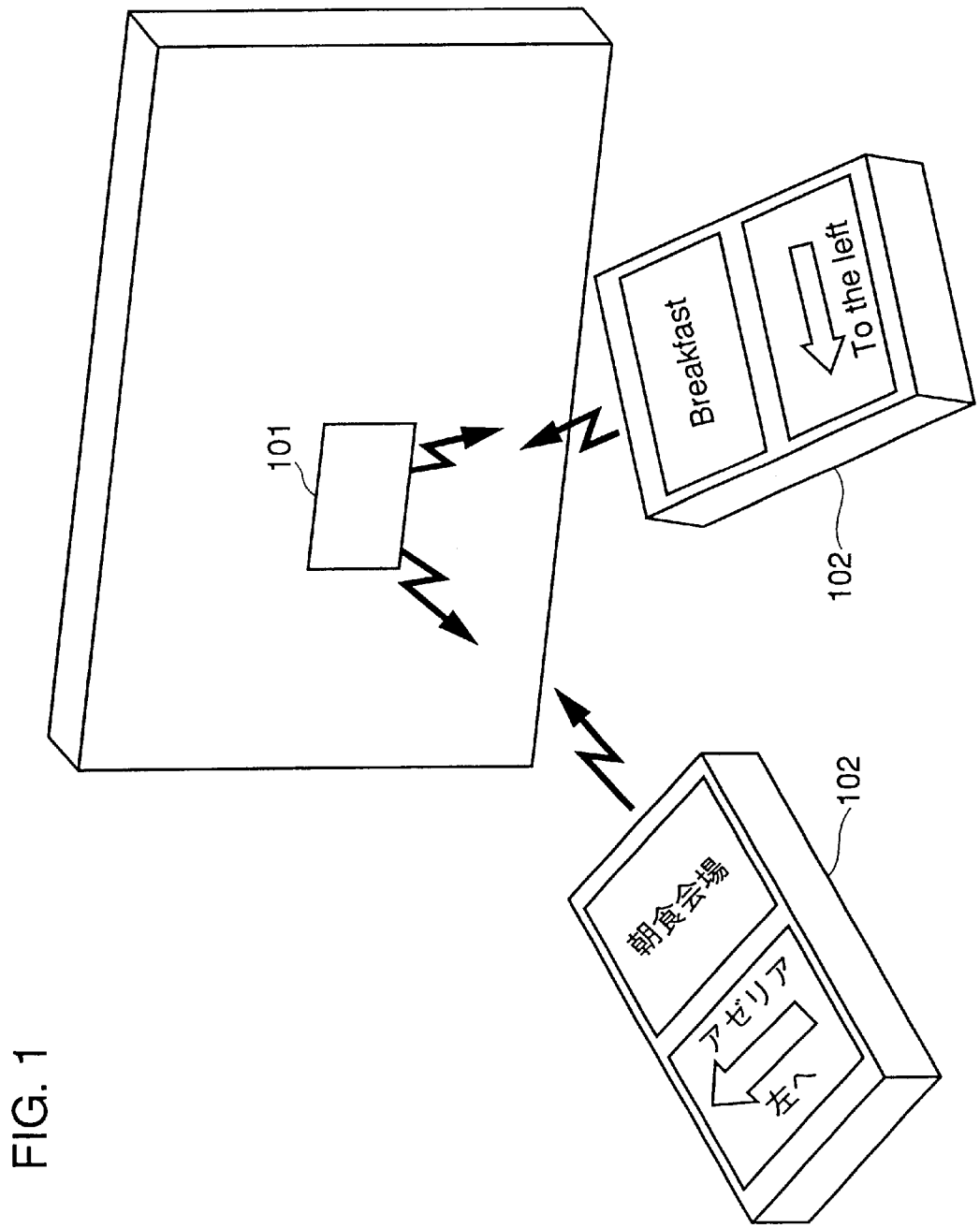
FIG. 1 shows an appearance of an information service system of a first embodiment of the present invention.

Referring to FIG. 1, the information service system according to the first embodiment includes a portable device 102 which receives a logical concept indicating a destination, such as a dining hall floor breakfast, a public bath and the like, and uses the logical concept to search for a physical concept, such as "AZALEA (the name of a dining hall for breakfast)," a corner on the third floor and the like, transmits a retrieved physical concept to a stationary device 101 (described later) installed, e.g., at an intersection of passageways in a hotel, and receives from stationary device 101 a direction to be taken and displays such direction.

The information service system also includes stationary device 101 which receives a physical concept from portable device 102, searches for a direction to the physical concept and transmits such direction to portable device 102, and an association control system (not shown) which rewrites an association between a logical concept and a physical concept that is stored in portable device 102.

A physical concept herein refers to the name of an object itself, representing a concept associated with the exact location of the object. A logical concept corresponds, e.g., to a purpose which an object serves.

It should be noted that portable device 102 displays information in any language desired by the user. Accordingly, portable device 102 is adapted to receive logical concepts represented by codes common throughout the world, such as shown in FIG. 2. For example, if a logical concept corresponds to a dining hall for breakfast, then a code R001 is input to portable device 102. Furthermore, stationary device 101 is also adapted to transmit to portable device 102 a direction to a physical concept that is represented by a code common throughout the world, such as shown in FIG. 3. For example, if such direction is a rightward direction, then stationary device 101 transmits a code S001 to portable device 102. Portable device 102 having received code S001 displays a Japanese word corresponding to the word "right" if the user desires to use Japanese, and portable device 102 displays an English word "right" when the user desires to use English.

Figure 4:
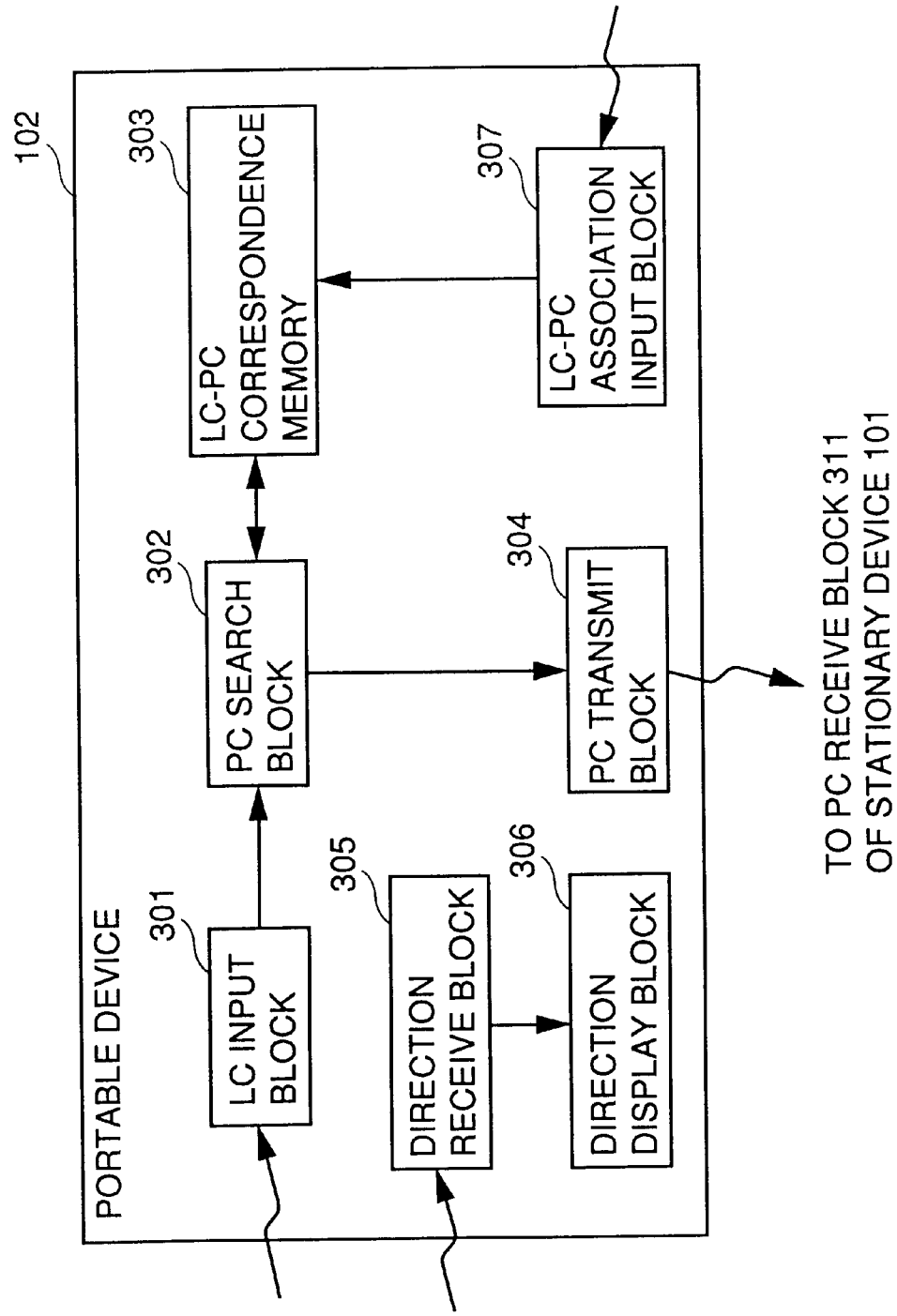
FIG. 4 is a block diagram showing a configuration of a portable device 102.

Referring to FIG. 4, portable device 102 includes a logical concept (LC) input block 301 receiving a logical concept input by a user indicative of a destination, a logical concept-physical concept (LC-PC) correspondence memory 303 storing an association between a logical concept and a physical concept, and an LC-PC association input block 307 connected to LC-PC correspondence memory 303 and externally receiving an association between a logical concept and a physical concept to store such association to LC-PC correspondence memory 303.

Portable device 102 also includes a physical concept (PC) search block 302 connected to LC input block 301 and LC-PC correspondence memory 303 to receive a logical concept input by the user and search LC-PC correspondence memory 303 for a physical concept corresponding to the logical concept and output a retrieved physical concept, and a PC transmit block 304 connected to PC search block 302 to externally transmit an output from PC search block 302.

Portable device 102 also includes a direction receive block 305 receiving from stationary device 101 a direction to a destination and a physical concept indicating a destination, and a direction display block 306 displaying a direction to a destination and a physical concept indicating a destination.

Referring to FIG. 5, LC-PC correspondence memory 303 stores an association between a logical concept and a physical concept, as has been described above. For example, logical concepts such as a lodging and a dining hall for breakfast are associated with physical concepts such as room no. 301, "AZALEA," respectively. LC-PC correspondence memory 303 stores information varying for each individual, i.e., for each portable device 102. For example, each individual can stay at a different room and each tour group can have breakfast in a different dining hall. For a dining hall for breakfast, in particular, each dining table may be more specifically indicated as a unit position. It should be noted that in effect the column for logical concepts in FIG. 5 stores such codes as shown in FIG. 2.

Figure 6:
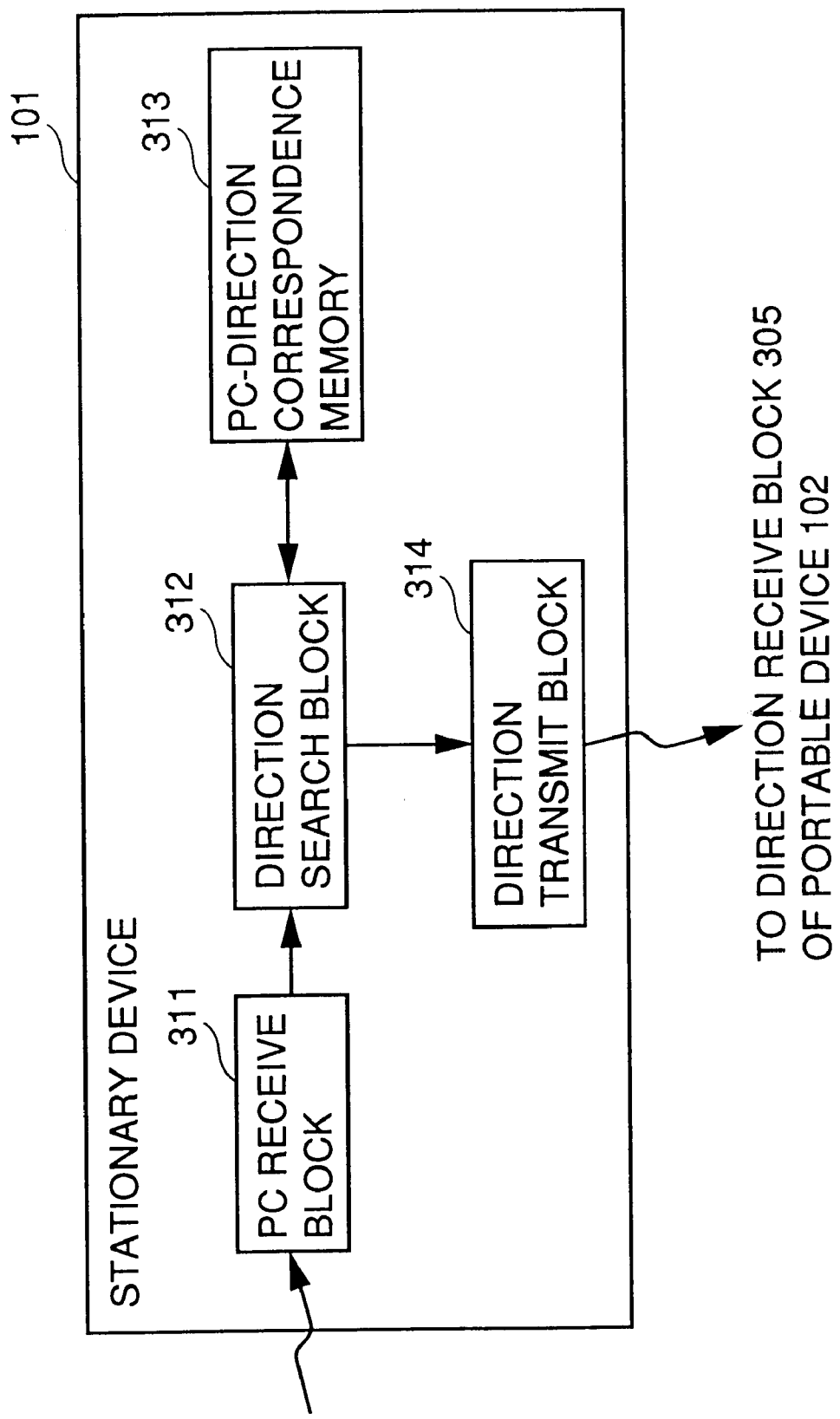
FIG. 6 is a block diagram showing a configuration of a stationary device 101.

Referring to FIG. 6, stationary device 101 includes a PC receive block 311 receiving a physical concept transmitted from portable device 102, and a PC-direction correspondence memory 313 storing an association between a physical concept and a direction to a destination represented by the physical concept.

Stationary device 101 also includes a direction search block 312 connected to PC receive block 311 and PC-direction correspondence memory 313 to search PC-direction correspondence memory 313 for a direction to a destination represented by a physical concept received by PC receive block 311 and output a retrieved direction together with the physical concept, and a direction transmit block 314 connected to direction search block 312 to externally transmit an output from direction search block 312.

Referring to FIG. 7, PC-direction correspondence memory 313 stores an association between a physical concept and a direction, as has been described above. For example, physical concepts such as room no. 201, "AZALEA" are associated with directions, such as "turn right" and "go straight ahead," respectively. It should be noted that in effect the column for directions in FIG. 7 stores such codes as shown in FIG. 3.

Figure 8:
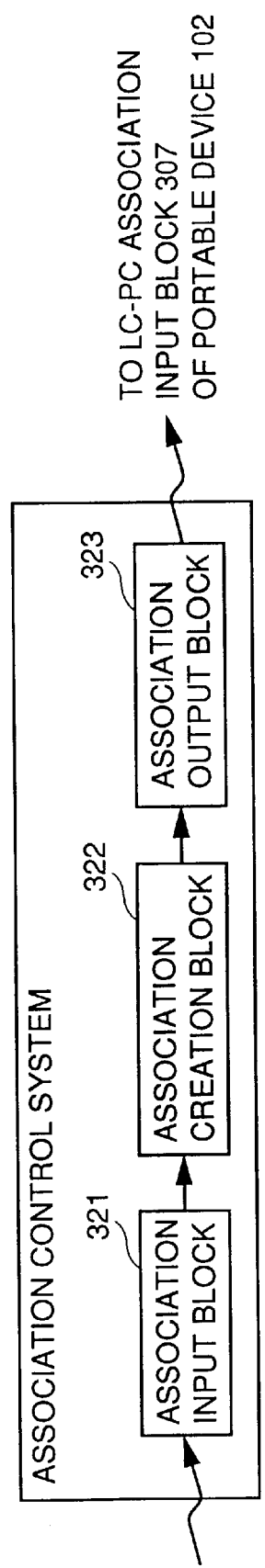
FIG. 8 is a block diagram showing a configuration of an association control system.

Referring to FIG. 8, the association control system includes an association input block 321 receiving an association between a logical concept and a physical concept, an association creation block 322 connected to association input block 321 to create from an association input to association input block 321 an association in a form transmittable to portable device 102, and an association output block 323 connected to association creation block 322 to provide to the portable device's LC-PC association input block 307 an association created by association creation block 322.

The information service system according to the present embodiment is used for example as described below. In a hotel at its reception or the like the association control system is used to input to portable device 102 information depending on a user. More specifically, an association between a logical concept and a physical concept depending on the user is stored to LC-PC correspondence memory 303. Portable device 102 with information input depending on each user is provided to the user when the user checks in the hotel. The user inquires of stationary device 101 installed at an intersection or the like the direction to a destination. More specifically, when the user directs portable device 102 towards stationary device 101 and presses an icon indicative of a logical concept displayed on the portable device's input screen, a direction is displayed on direction display block 306 of portable device 102. The user proceeds in the direction displayed on direction display block 306. Thus the user can efficiently reach the destination.

Figure 9:
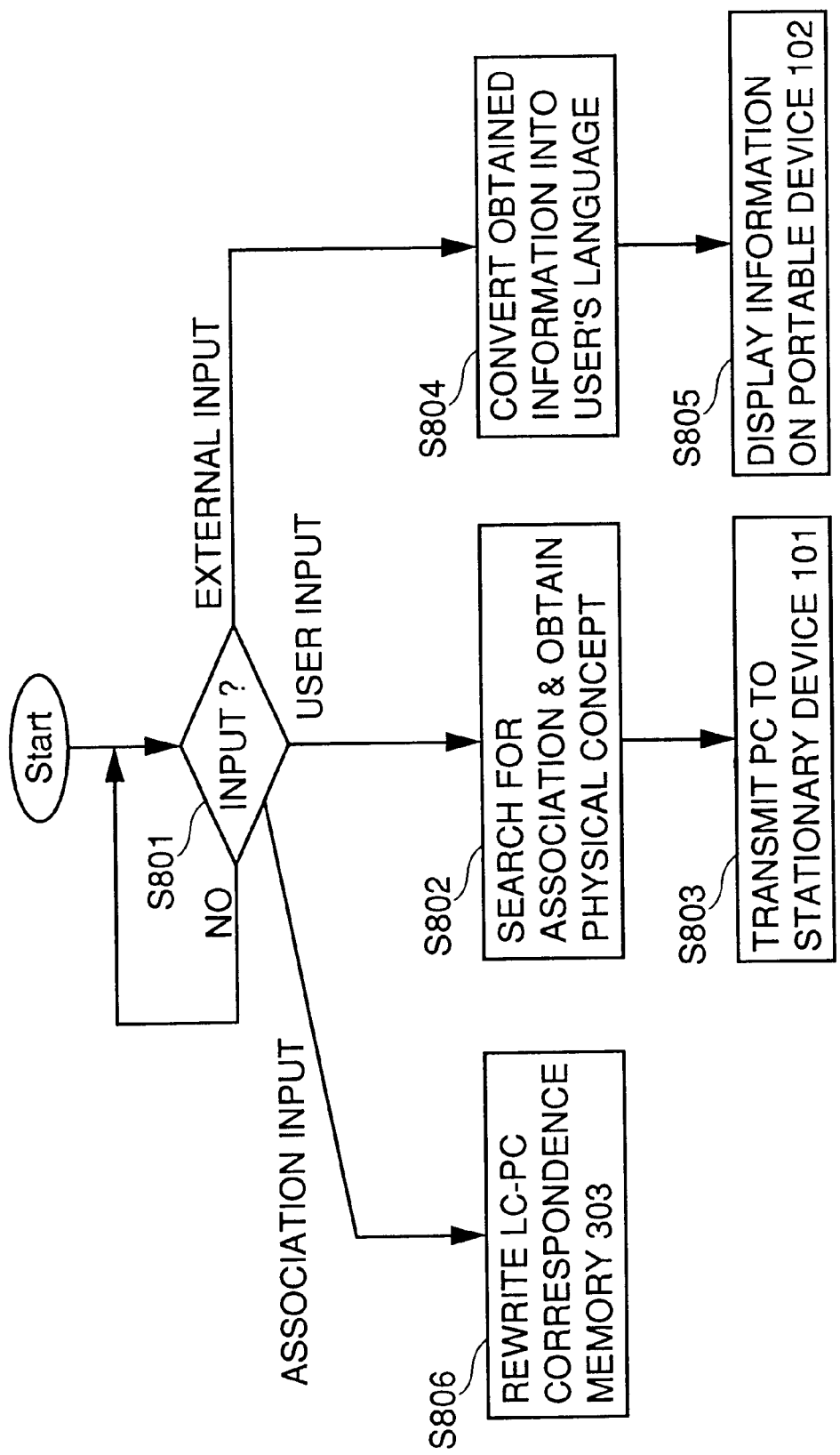
FIG. 9 is a flow chart representing a process performed by portable device 102.

Referring to FIG. 9, portable device 102 operates as described below: portable device 102 waits for data input by a user or from stationary device 101 (S801). If a user inputs data or LC input block 301 receives a logical concept (a user input at S801), then PC search block 302 searches LC-PC correspondence memory 303 for and outputs a physical concept corresponding to the logical concept received by LC input block 301 (S802). PC transmit block 304 receives the physical concept output from PC search block 302 and transmits such physical concept to stationary device 101 with portable device 102 opposite thereto (S803).

If via stationary device 101 data is input or direction receive block 305 receives a direction from stationary device 101 (an external input at S801), then direction receive block 305 converts the data of the received direction into a predetermined language used by the user and outputs such converted data (S804). Direction display block 306 receives and displays the data (S805).

If via LC-PC association input block 307 an association between a logical concept and a physical concept is input (an association input at S801), then LC-PC association input block 307 rewrites a content of LC-PC correspondence memory 303 (S806).

Figure 10:
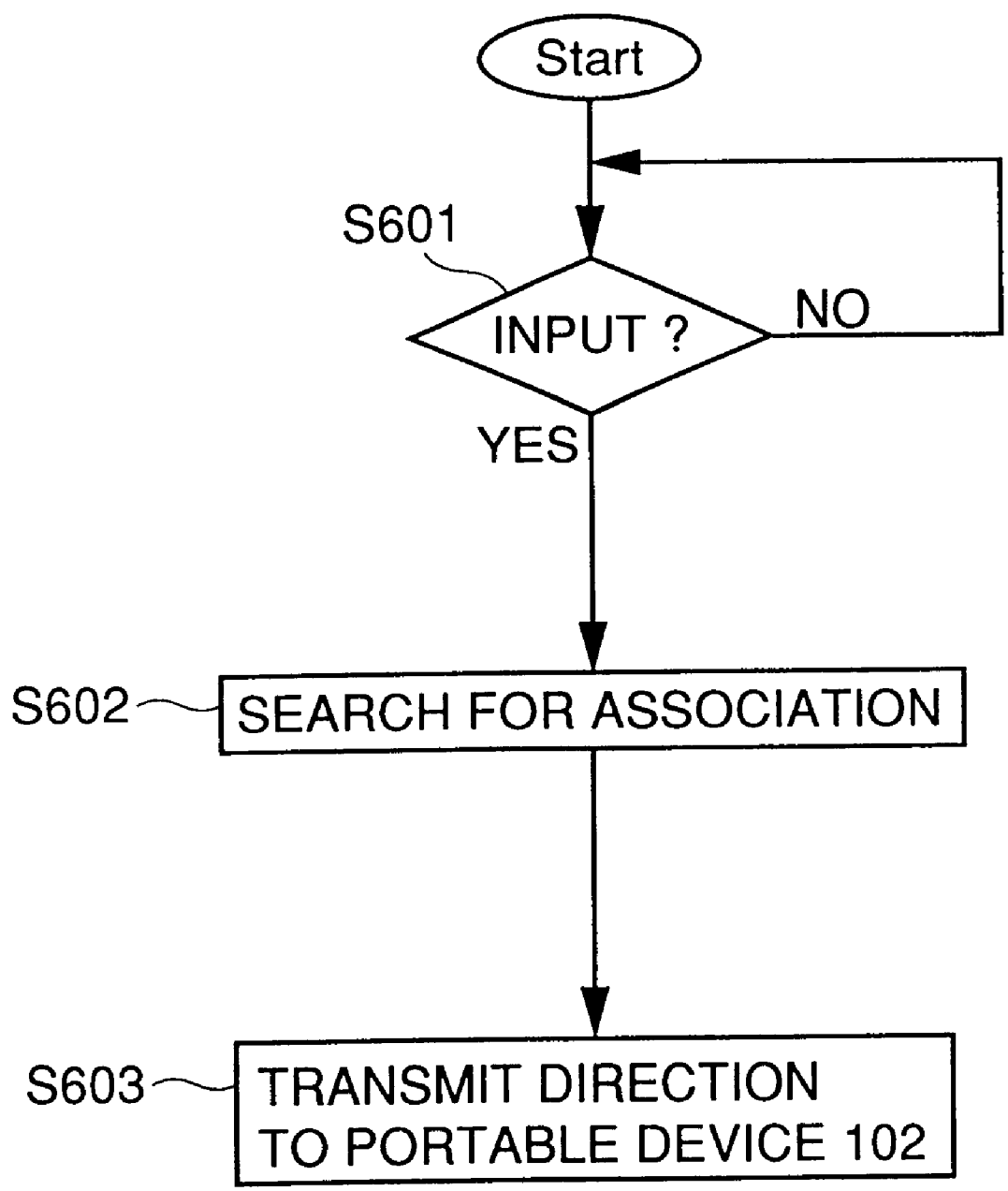
FIG. 10 is a flow chart representing a process performed by stationary device 101.

Referring to FIG. 10, stationary device 101 operates as described below: stationary device 101 waits for data input from portable device 102 (S601). When via portable device 102 data is input or PC receive block 311 receives a physical concept (YES at S601), then direction search block 312 searches PC-direction correspondence memory 313 for and outputs a direction to a destination represented by the received physical concept (S602). Direction transmit block 314 transmits to portable device 102 the direction output from PC-direction correspondence memory 313.

Figure 11:
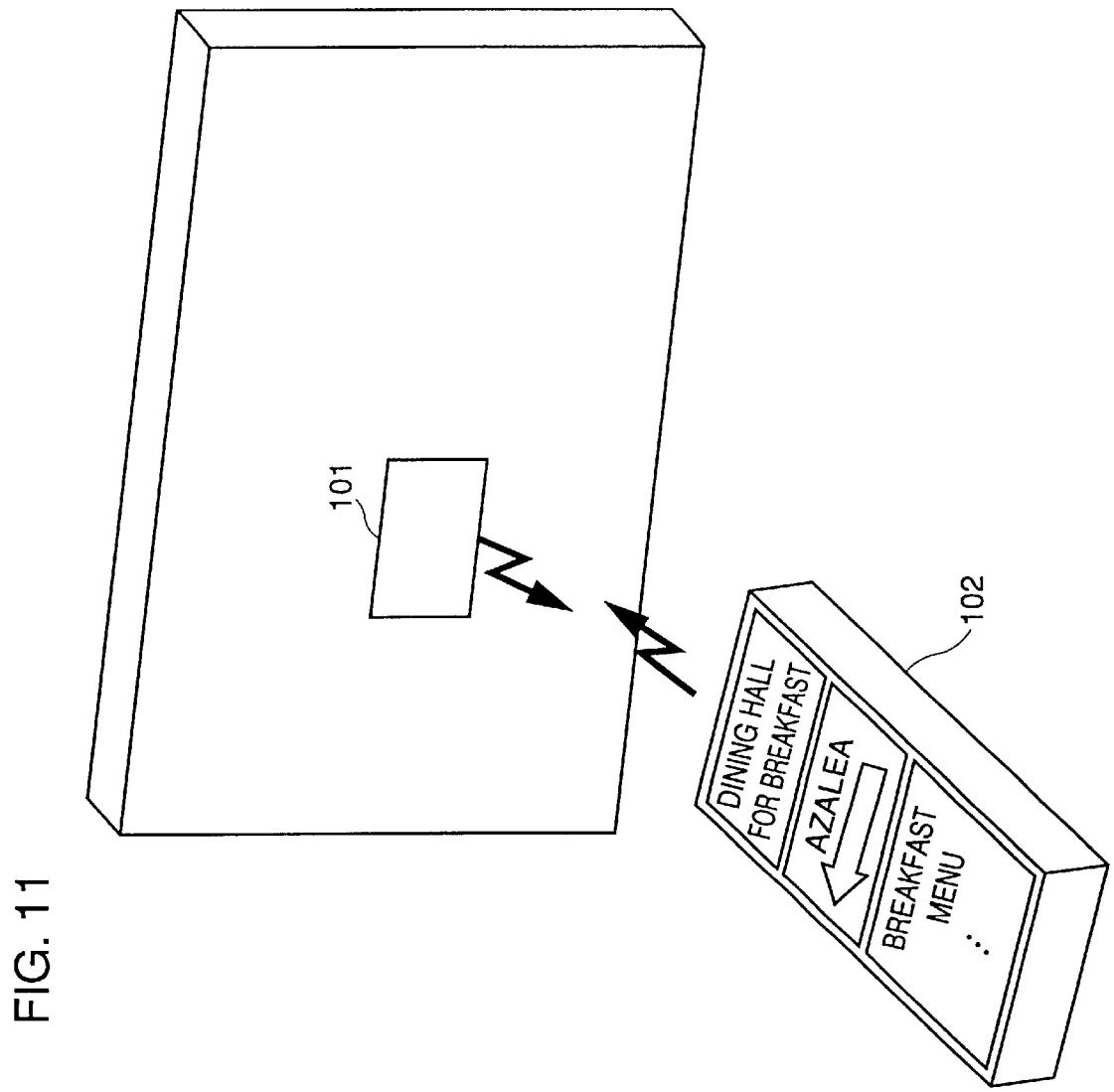
FIG. 11 shows an appearance of another example of the information service system according to the first embodiment.

Referring to FIG. 11, portable device 102 may also display supplementary information on an input logical concept simultaneously. For example, if a user inputs "a dining hall for breakfast" then it may display a breakfast menu, or a distance to the input destination. In such example, PC-direction correspondence memory 313 stores supplementary information on a physical concept that is supplementary to an association between the physical concept and a direction. Direction search block 312 refers to the physical concept and thus searches for a direction and the supplementary information on the physical concept and outputs them together with the physical concept. Direction transmit block 314 transmits an output from direction search block 312. Direction receive block 305 receives the output and direction display block 306 displays the direction, the supplementary information on the physical concept, and the physical concept.

In the information service system as described above, the user is not required to input his or her current position and is only required to input a destination to obtain a direction to the destination and thus efficiently reach the destination.

Furthermore, the user can input a destination through a logical concept. As such, the user can efficiently reach the destination if as in a hotel or other unfamiliar buildings the user does not know the name of a hall or the like corresponding to the destination or the positional relationship thereof.

Furthermore, the portable device capable of displaying information in a manner switchable depending on the user, such as in languages switchable used to display the information, can have enhanced operability.

Furthermore, the portable device is not required to internally store data large in scale, such as a map. Thus the device can be miniaturized and thus have a structure convenient to hold.

While in the above description portable device 102 belongs to a hotel, it may belong to an individual.

Second Embodiment

Figure 12:
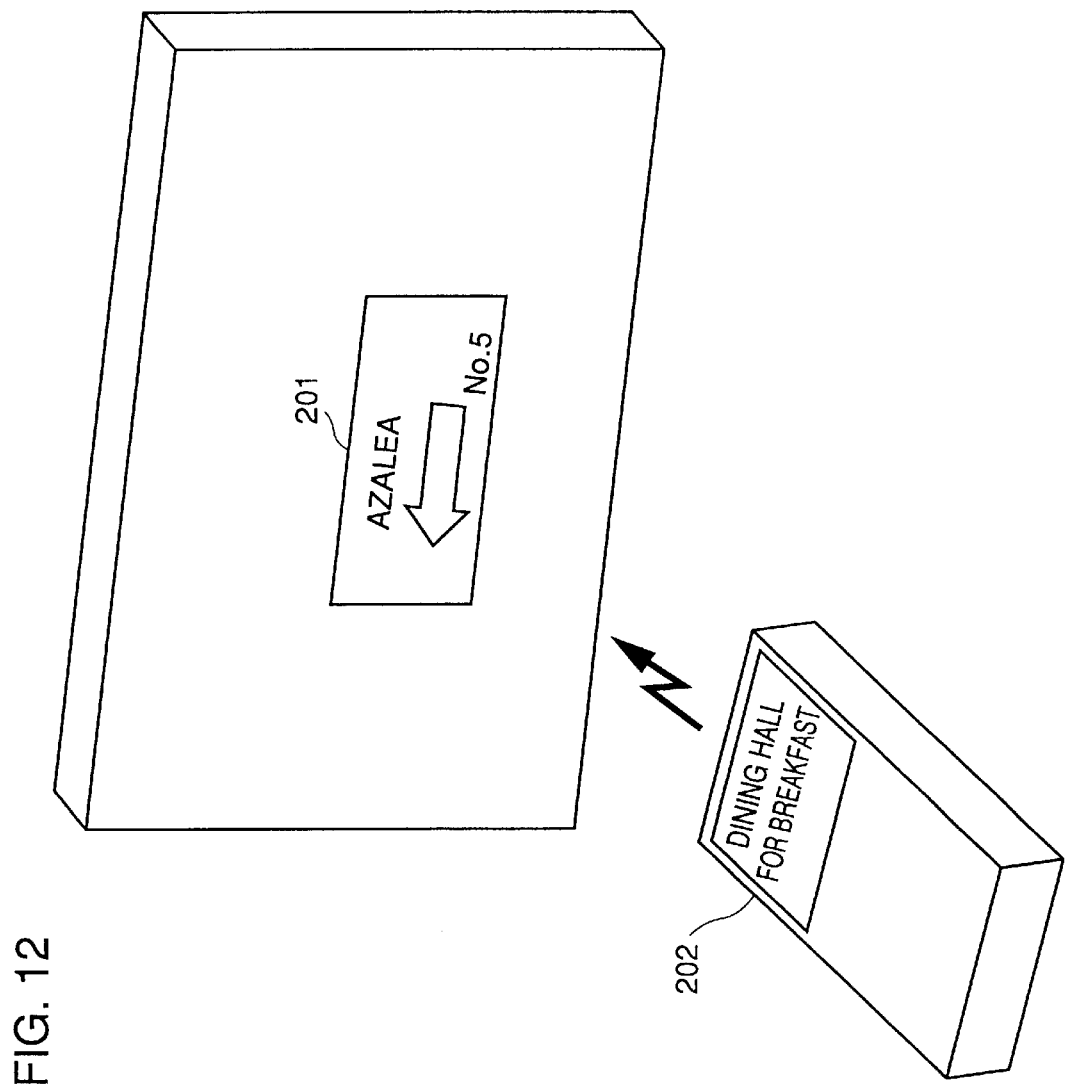
FIG. 12 shows an appearance of an information service system according to a second embodiment of the present invention.

Referring to FIG. 12, an information service system according to a second embodiment includes a portable device 202 responding to a logical concept indicative of a destination input, such as a dining hall for breakfast, a public bath and the like, by searching for a physical concept, such as "AZALEA," a corner on the third floor and the like, and transmitting a retrieved physical concept and an identification (ID) number of portable device 202 to a stationary device 201 (described hereinafter) installed, e.g., at an intersection of passageways in a hotel.

The information service system also includes stationary device 201 receiving from portable device 202 a physical concept and an ID number of portable device 202 and searching for a direction to the physical concept and displaying a retrieved direction together with the ID number and the physical concept, and an association control system (not shown) rewriting an association between a logical concept and a physical concept that is stored in portable device 202.

Figure 13:
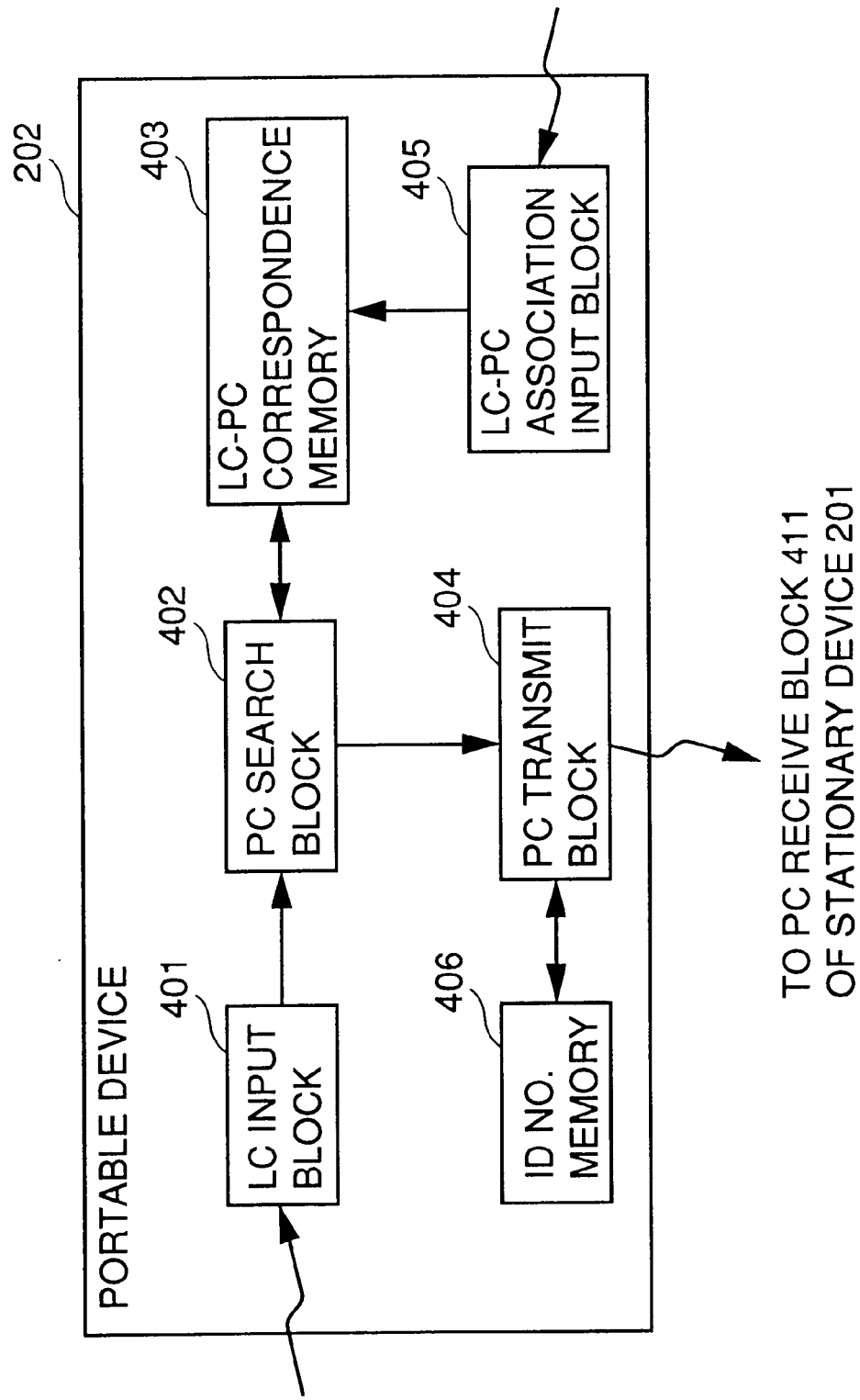
FIG. 13 is a block diagram showing a configuration of a portable device 202.

Referring to FIG. 13, portable device 202 includes an LC input block 401 receiving a logical concept indicative of a destination input by a user, an LC-PC correspondence memory 403 storing an association between a logical concept and a physical concept, and a PC search block 402 connected to LC input block 401 and LC-PC correspondence memory 403 to receive a logical concept input by the user and search LC-PC correspondence memory 403 for and output a physical concept corresponding to the logical concept input by the user.

Portable device 202 also includes an ID number memory 406 storing its ID number, a PC transmit block 404 connected to PC search block 402 and ID number memory 406 to externally transmit an output from PC search block 402 together with the ID number, and an LC-PC association input block 405 connected to LC-PC correspondence memory 403 to externally receive an association between a logical concept and a physical concept and store such association to LC-PC correspondence memory 403.

LC-PC correspondence memory 403 stores an LC-PC association similar to that stored in LC-PC correspondence memory 303 of portable device 102 of the first embodiment as described with reference to FIG. 5. Accordingly such association will not be described in detail.

Figure 14:
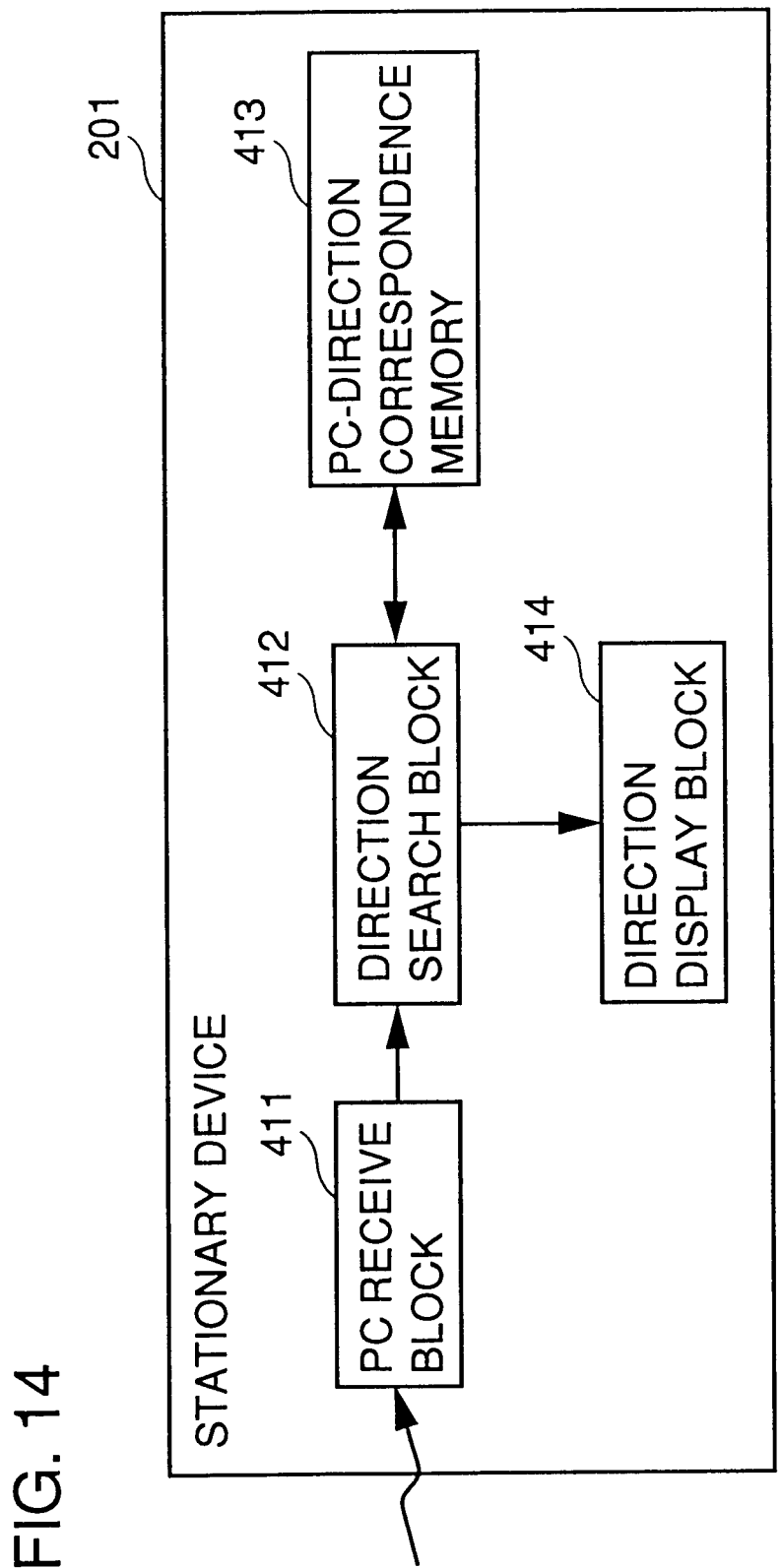
FIG. 14 is a block diagram showing a configuration of a stationary device 201.

Referring to FIG. 14, stationary device 201 includes a PC receive block 411 receiving from portable device 202 a physical concept and an ID number, and a PC-direction correspondence memory 413 storing an association between a physical concept and a direction to a destination represented by the physical concept.

Stationary device 201 also includes a direction search block 412 connected to PC receive block 411 and PC-direction correspondence memory 413 to search PC-direction correspondence memory 413 for a direction to a destination represented by a physical concept received by PC receive block 411 and output a retrieved direction together with the physical concept and an ID number, and a direction display block 414 connected to direction search block 412 to display a physical concept, an ID number and a direction to a destination.

PC-direction correspondence memory 413 stores a PC-direction association similar to that stored in PC-direction correspondence memory 313 of stationary device 101 of the first embodiment described with reference to FIG. 7. Accordingly, such association will not be described in detail.

The association control system has a hardware block configuration similar to that shown in FIG. 8. Accordingly, each components thereof will not be described in detail.

Figure 15:
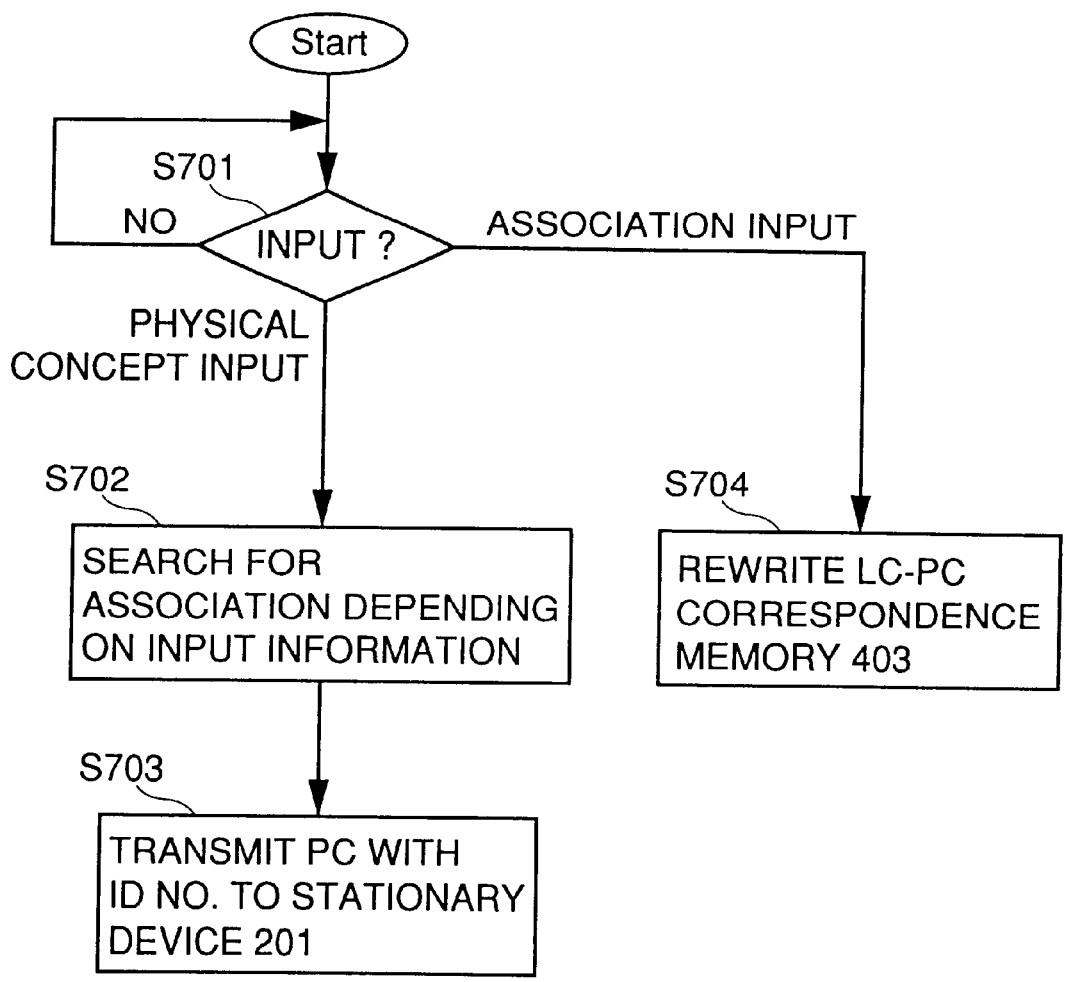
FIG. 15 is a flow chart representing a process performed by portable device 202.

Referring to FIG. 15, portable device 202 operates as described below: portable device 202 waits for data externally input (S701). If a user inputs data or LC input block 401 receives a logical concept (a logical concept at S701), then PC search block 402 searches PC search block 402 for a physical concept corresponding to the logical concept received by LC input block 401 and outputs a retrieved physical concept (S702). PC transmit block 404 receives the physical concept output from PC search block 402 and transmits such physical concept together with an ID number to stationary device 201 with portable device 202 directed thereto (S703). If via LC-PC association input block 405 an LC-PC association is input (an association at S701), then LC-PC association input block 405 rewrites a content of LC-PC correspondence memory 403 (S704).

Figure 16:
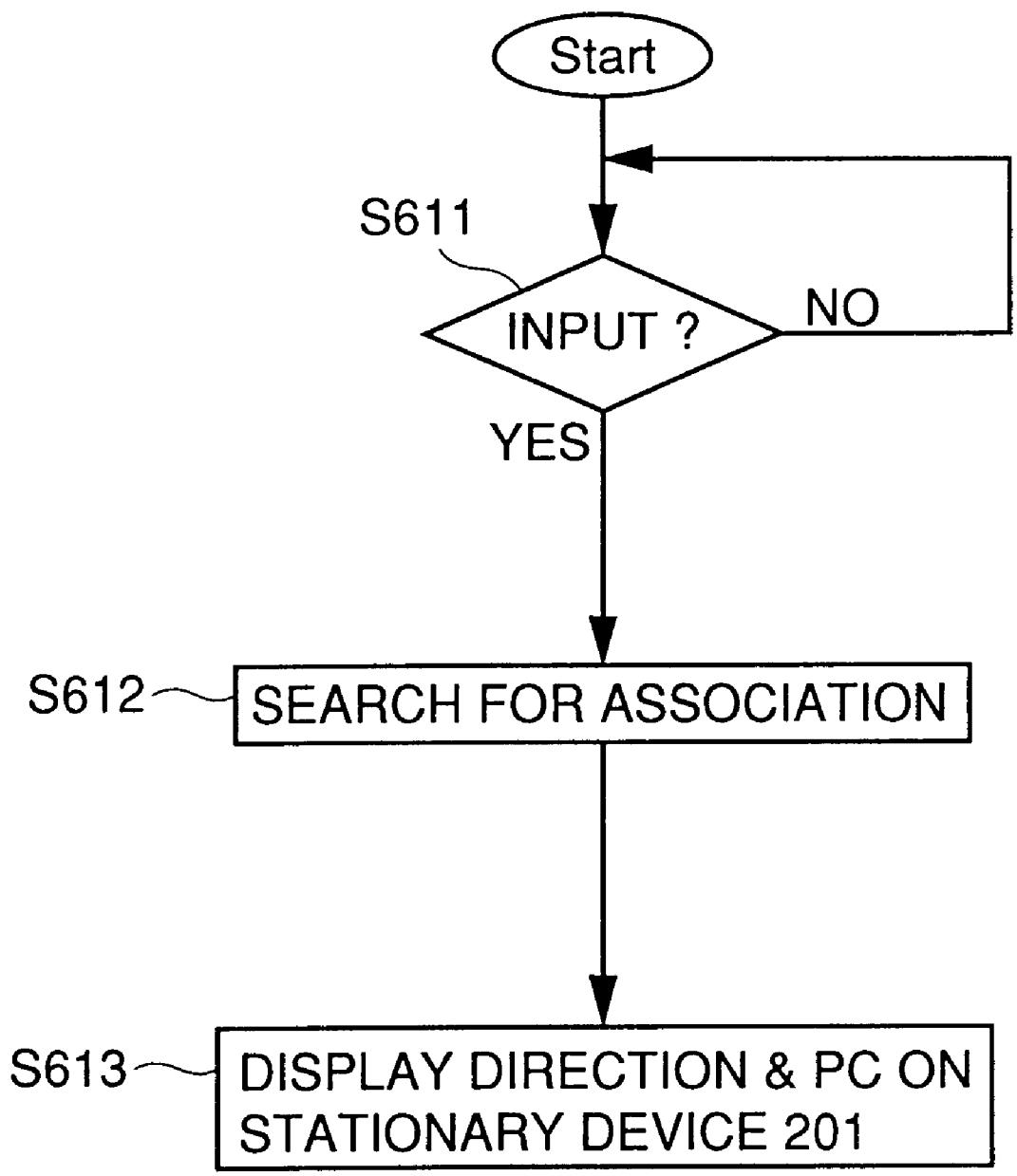
FIG. 16 is a flow chart representing a process performed by stationary device 201.

Referring to FIG. 16, stationary device 201 operates as described below: stationary device 201 waits for data input from portable device 202 (S611). When via portable device 202 data is input or PC receive block 411 receives a physical concept (YES at S611), then direction search block 412 searches PC-direction correspondence memory 413 for a direction to a destination represented by the physical concept and outputs a retrieved direction together with the physical concept. Direction display block 414 displays the direction to the destination and the physical concept (S613).

Figure 17:
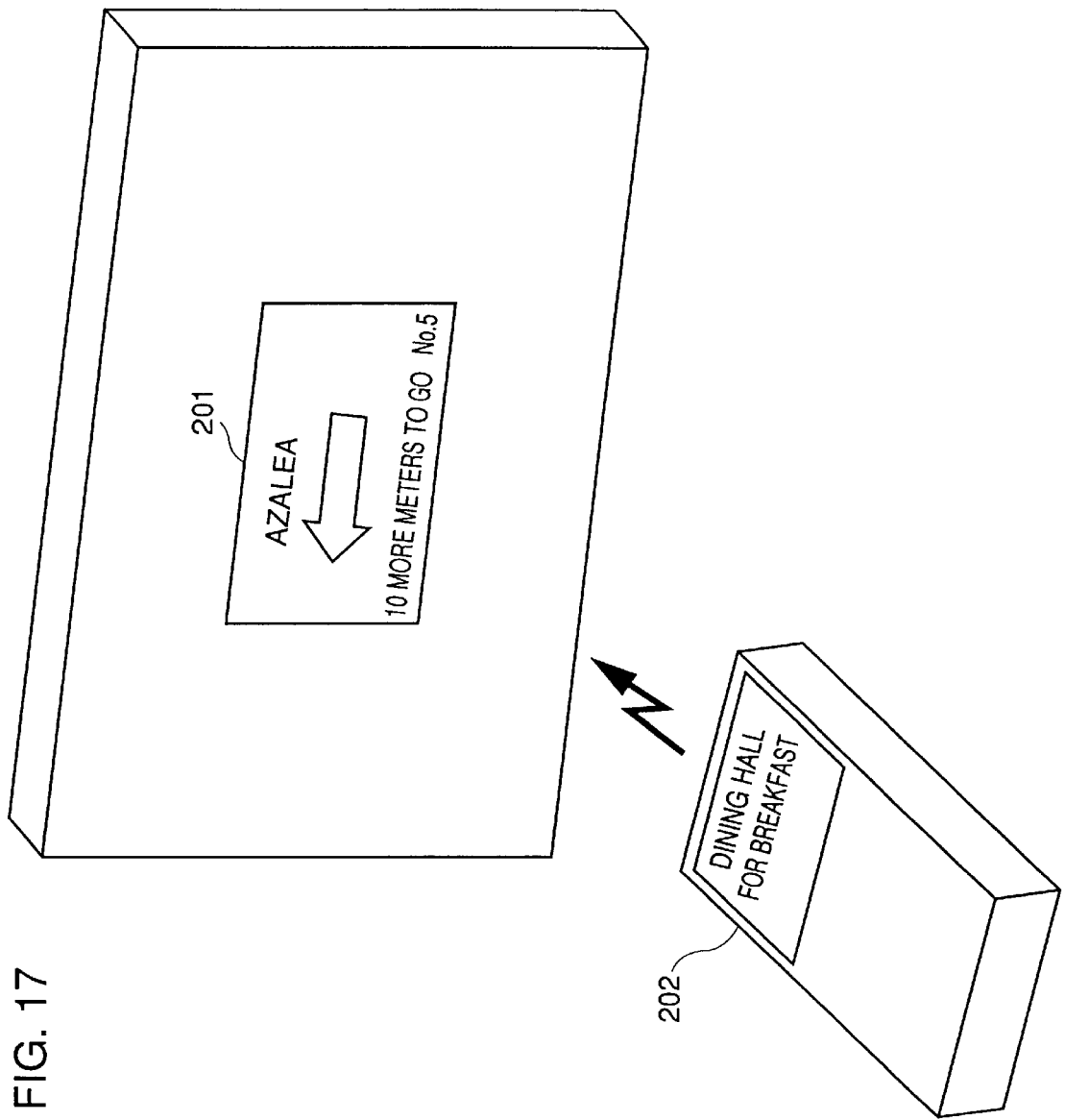
FIG. 17 shows an appearance of another example of the information service system according to the second embodiment.

It should be noted that stationary device 201 may also simultaneously display supplementary information on a physical concept input via portable device 202, as shown in FIG. 17. For example, stationary device 201 may display the distance to an input destination or stationary device 201 may display a breakfast menu when a user inputs a dining hall for breakfast. In this example, PC-direction correspondence memory 413 stores supplementary information on a physical concept that is supplementary to an association between the physical concept and a direction. Direction search block 412 refers to a physical concept and thus searches for a direction and supplementary information on the physical concept and outputs them together with the physical concept. Direction display block 414 receives from direction search block 412 the physical concept, the direction and the supplementary information on the physical concept and displays them together with an ID number.

In the information service system as described above, the user is not required to input his or her current position and is only required to input a destination to obtain a direction to the destination and thus efficiently reach the destination.

Furthermore, the user can input a destination through a logical concept. As such, the user can efficiently reach the destination if as in a hotel or other unfamiliar buildings the user does not know the name of a hall or the like corresponding to the destination or the positional relationship thereof.

Furthermore, the stationary device can display a portable device's ID number. As such, if more than one portable device transmit information to the stationary device, a user can determine whether the information displayed on the stationary device is associated with the information transmitted by the user. Thus the user can obtain information accurately.

Furthermore, the portable device is not required to internally store data large in scale, such as maps. Thus the device can be miniaturized and thus have a structure convenient to hold.

Third Embodiment

Figure 18:
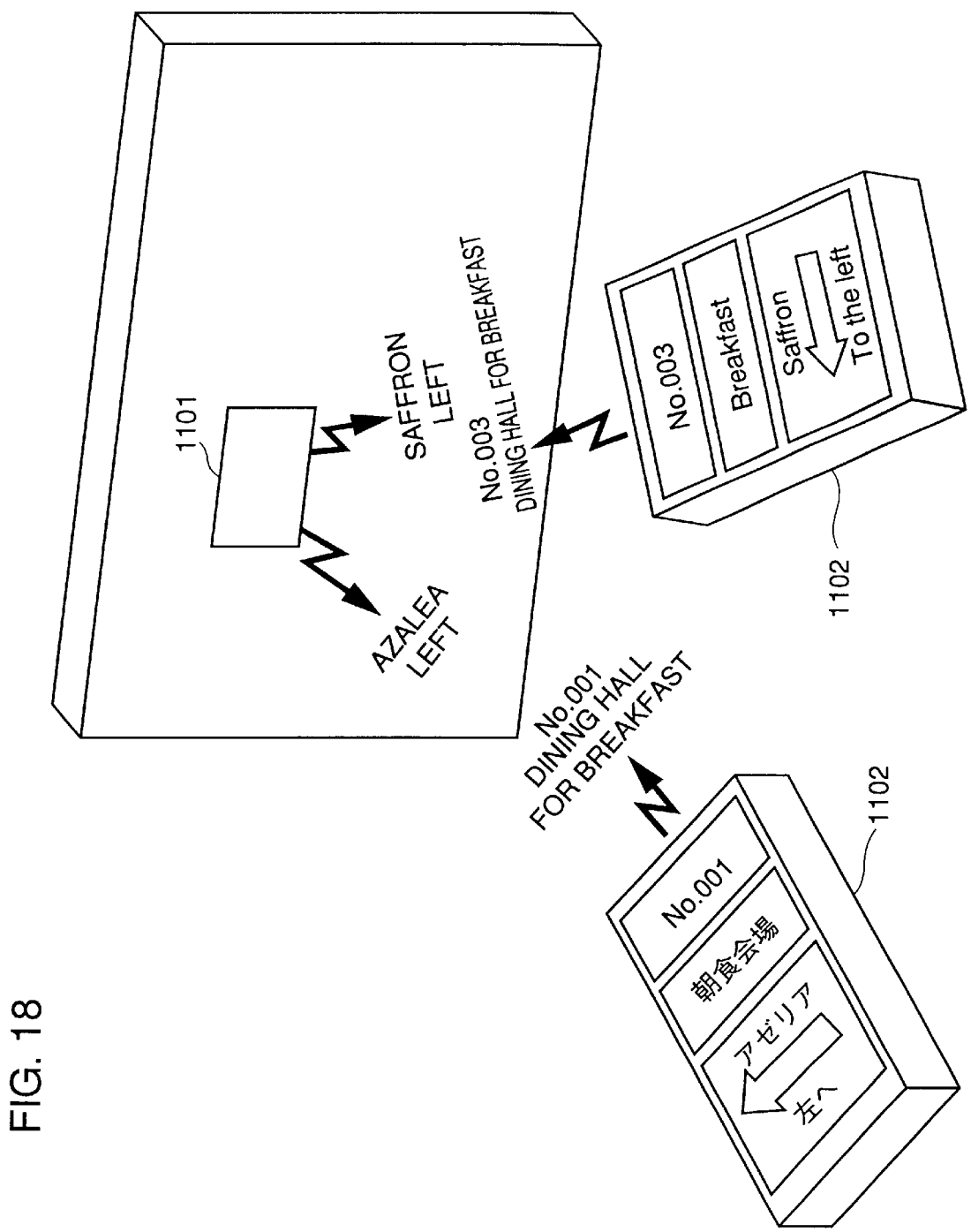
FIG. 18 shows an appearance of an information service system according to a third embodiment of the present invention.

Referring to FIG. 18, an information service system according to a third embodiment includes a user-portable device 1102 receiving a logical concept indicative of a destination, such as a dining hall for breakfast, a public bath, and transmitting such logical concept together with an ID number of the portable device, such as no. 001, to a stationary device 1101 (described later) installed, e.g., at an intersection of passageways in a hotel, and also receiving from stationary device 1101 a physical concept indicative of the destination, such as "AZALEA," a corner on the third floor, and a direction to be taken by the user and displaying the physical concept and the direction.

The information service system also includes stationary device 1101 receiving from portable device 1102 a logical concept and an ID number of portable device 1102, searching for a physical concept depending on the logical concept and the ID number, searching for a direction to the physical concept, and transmitting to portable device 1102 the physical concept and the direction to the physical concept, and a central control system (not shown) connected to stationary device 1101 to update an association between a logical concept, ID number and a physical concept that is stored in stationary device 1101.

Portable device 1102 displays information in a language as desired by a user. Accordingly, a direction to a physical concept and a logical concept are adapted to be represented by codes common throughout the world. Such codes are similar to those described with reference to FIGS. 2 and 3 and will thus not be described in detail.

Figure 19:
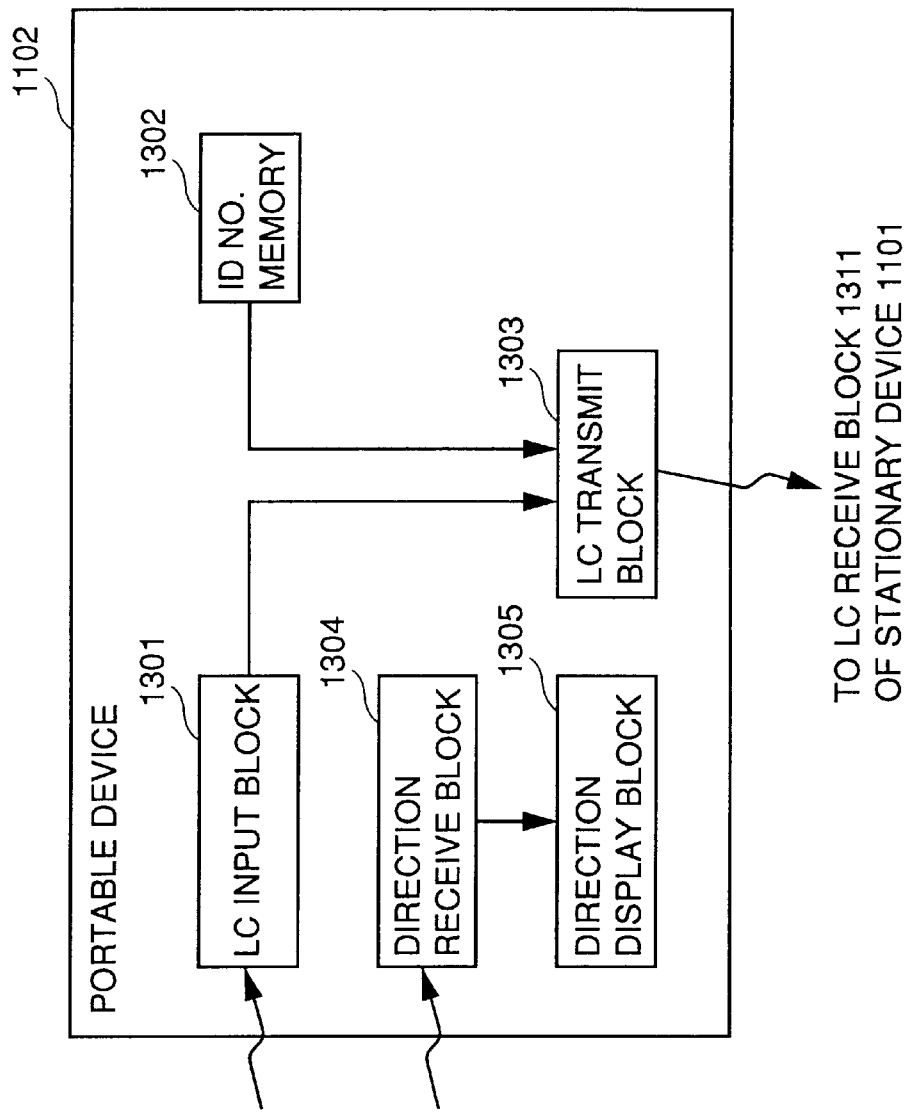
FIG. 19 is a block diagram showing a configuration of a portable device 1102.

Referring to FIG. 19, portable device 1102 includes an LC input block 1301 receiving a logical concept input by a user indicative of a destination, an ID number memory 132 storing an ID number of portable device 1102, and an LC transmit block 1303 connected to LC input block 1301 and ID number memory 1302 to externally transmit a logical concept and an ID number.

Portable device 1102 also includes a direction receive block 1304 receiving from stationary device 1101 a direction to a destination and a physical concept, and a direction display block 1305 connected to direction receive block 1304 to display a direction and a physical concept.

Figure 20:
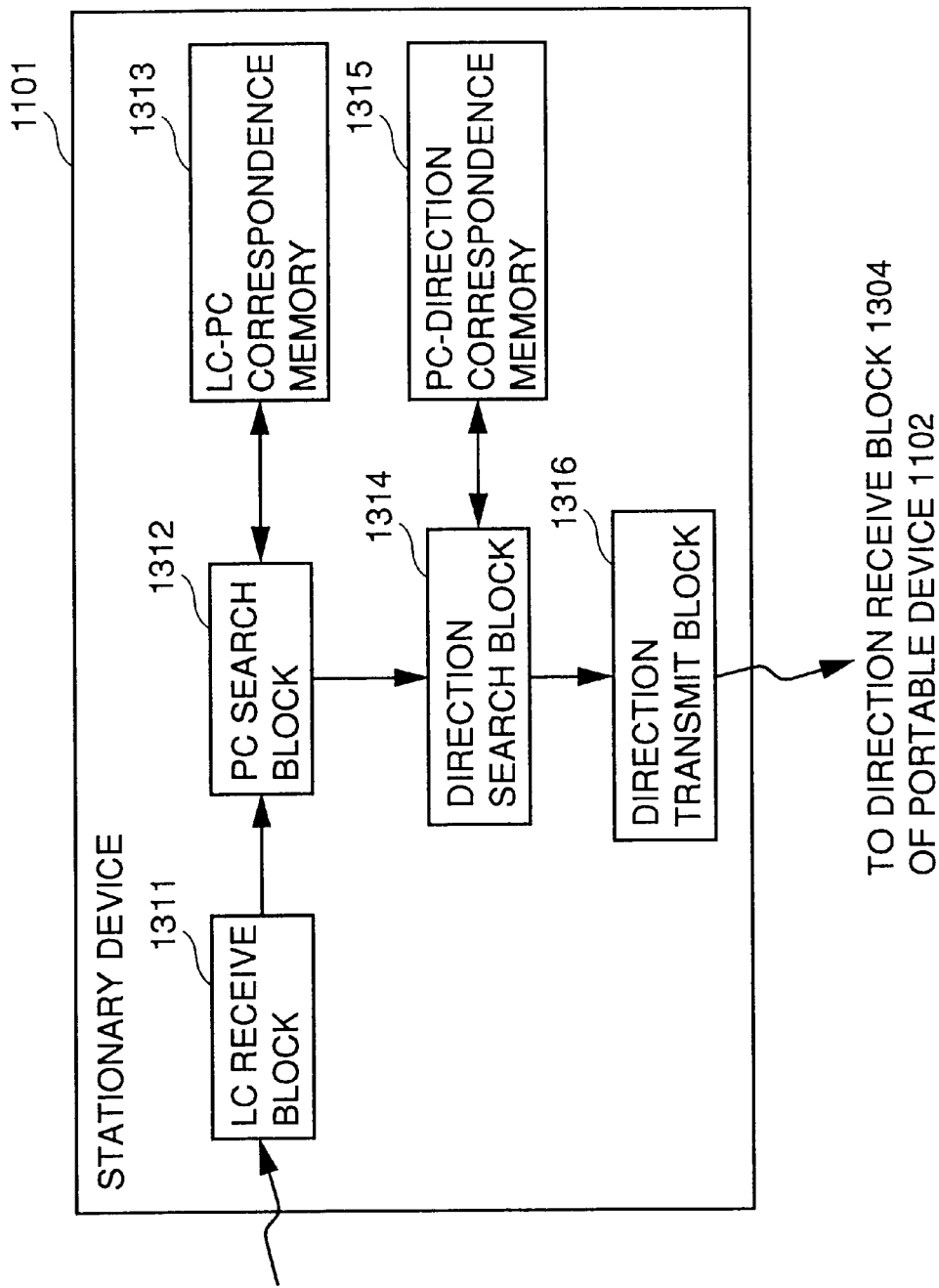
FIG. 20 is a block diagram showing a configuration of a stationary device 1101.

Referring to FIG. 20, stationary device 1101 includes an LC receive block 1311 receiving from portable device 1102 a logical concept and an ID number, an LC-PC correspondence memory 1313 storing an association between a logical concept, ID number and a physical concept, and a PC search block 1312 connected to LC receive block 1311 and LC-PC correspondence memory 1313 to search a correspondence stored in LC-PC correspondence memory 1313 for a physical concept corresponding to a logical concept and an ID number and output a retrieved physical concept.

Stationary device 1101 also includes a PC-direction correspondence memory 1315 storing an association between a physical concept and a direction to a destination represented by the physical concept, a direction search block 1314 connected to PC search block 1312 and PC-direction correspondence memory 1315 to search PC-direction correspondence memory 1315 for a direction to a destination represented by a physical concept output from PC search block 1312 and output a retrieved direction to the destination together with the physical concept, and a direction transmit block 1316 connected to direction search block 1314 to externally transmit a physical concept and a direction.

It should be noted that LC-PC correspondence memory 1313 is connected to the above-described central control system to update an association between a logical concept, ID number and a physical concept that is stored in LC-PC correspondence memory 1313, as appropriate.

Referring to FIG. 21, LC-PC correspondence memory 1313 stores an association between a logical concept, ID number and a physical concept, as has been described above. For example, an ID number "001" and a logical concept "lodging" correspond to a physical concept "room no. 305." An ID number "003" and a logical concept "a dining hall for breakfast" correspond to a physical concept "SAFFRON."

Referring to FIG. 22, PC-direction correspondence memory 1315 stores an association between a physical concept and a direction, as has been described above. For example, physical concepts such as "room no. 201," ""AZALEA" are associated with directions such as "turn right," "go straight ahead," respectively.

The information service system of the present embodiment is used for example as described below. In a hotel, portable device 1102 with information input depending on a user is provided to the user when the user checks in the hotel. The user inquires of stationary device 1101 installed at an intersection or the like in the hotel the direction to a destination. More specifically, when the user positions portable device 1102 opposite to stationary device 1101 and presses an icon indicative of a logical concept displayed on the portable device's input screen, a direction is displayed on direction display block 1305 of portable device 1102. The user proceeds in the direction displayed on direction display block 1305. Thus the user can efficiently reach the destination.

Figure 23:
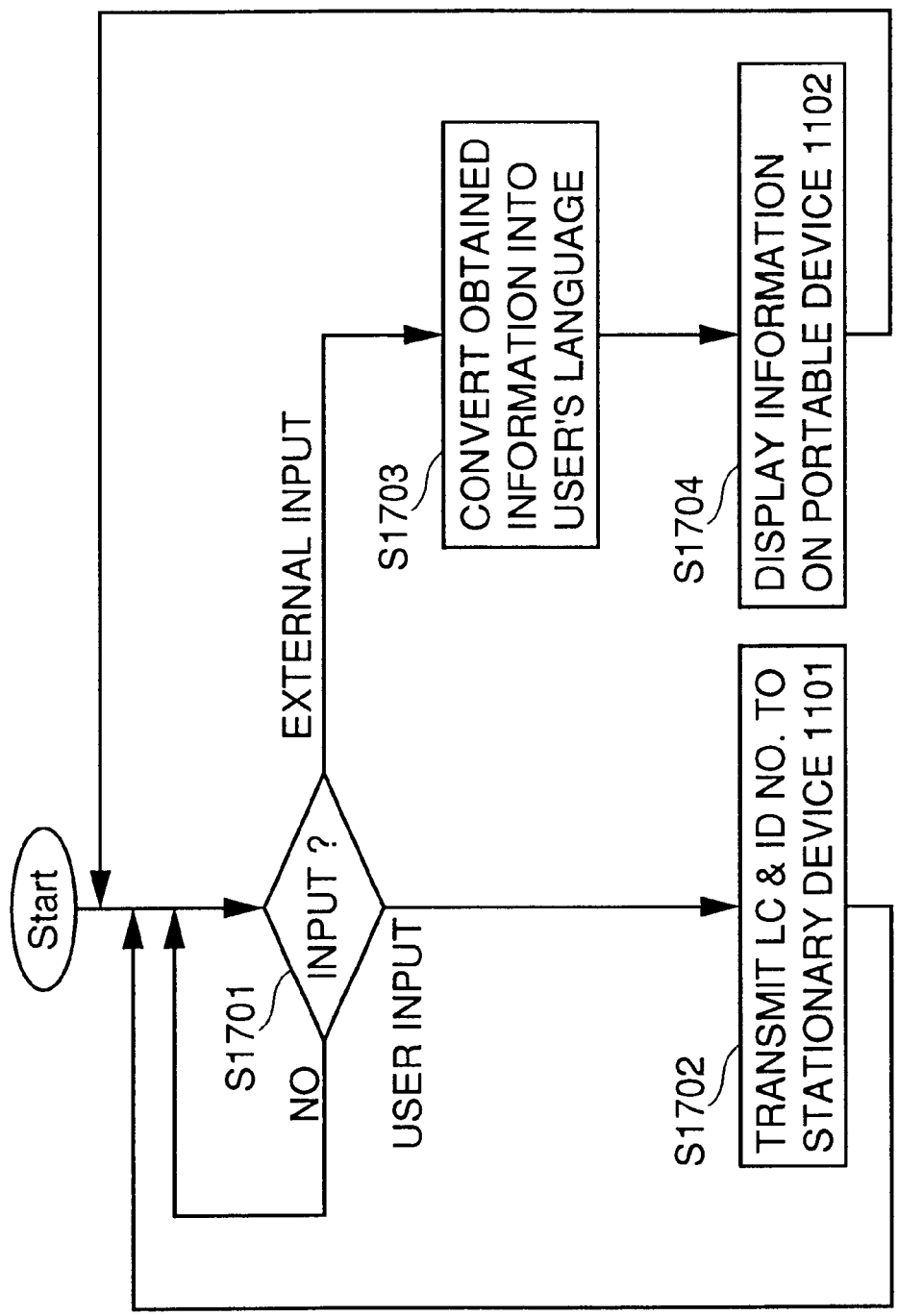
FIG. 23 is a flow chart representing a process performed by portable device 1102.

Referring to FIG. 23, portable device 1102 operates as described below: portable device 1102 waits for data input by a user or from stationary device 1101 (S1701). If a user inputs data or LC input block 1301 receives a logical concept (a user input at S1701), then LC transmit block 1303 transmits to stationary device 1101 positioned opposite to portable device 1102 the logical concept and an ID number stored in ID number memory 1302 (S1702).

If via stationary device 1101 data is input or direction receive block 1304 receives from stationary device 1101 a direction and a logical concept (an external input at S1701), then direction receive block 1304 converts the data of the received direction and logical concept into a predetermined language used by the user and outputs the converted data (S1703). Direction display block 1303 receives and displays such data (S1704).

Figure 24:
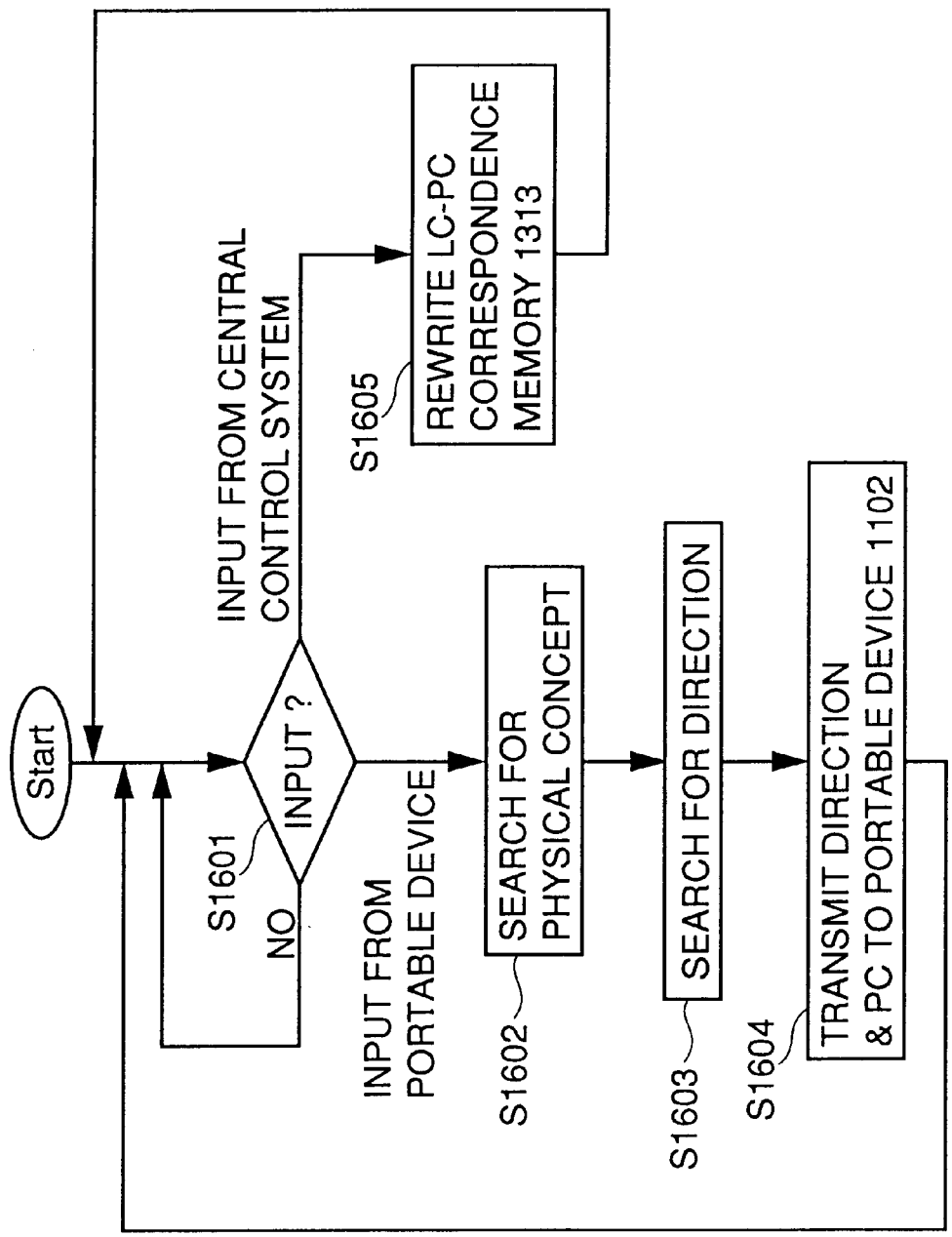
FIG. 24 is a flow chart representing a process performed by stationary device 1101.

Referring to FIG. 24, stationary device 1101 operates as described below: stationary device 1101 waits for data input from portable device 1102 or the central control system (S1601). If via portable device 1102 data is input or LC receive block 1311 receives a logical concept and an ID number (an input from the portable device at S1601), then PC search block 1312 searches LC-PC correspondence memory 1313 for and outputs a physical concept corresponding to the logical concept and ID number (S1602).

Direction search block 1314 receives the physical concept from LC-PC correspondence memory 1313, searches LC-PC correspondence memory 1313 for a direction to a destination represented by the physical concept and outputs a retrieved direction together with the physical concept (S1603). Direction transmit block 1316 receives from direction search block 1314 the direction and the physical concept and transmits them to portable device 1102 (S1604). Then the controls goes back to S1601.

If via the central control system data is input (an input from the central control system at S1601), then in LC-PC correspondence memory 1313, connected to the central control system, an association between a logical concept, ID number and a physical concept that is stored therein is rewritten (S1605). Then the controls goes back to S1601.

In the information service system as described above, the user is not required to input his or her current position and is only required to input a destination to obtain a direction to the destination and thus efficiently reach the destination.

Furthermore, the user can input a destination through a logical concept. As such, the user can efficiently reach the destination if as in a hotel or other unfamiliar buildings the user does not know the name of a hall or the like corresponding to the destination or the positional relationship thereof.

Furthermore, the portable device capable of displaying information in a manner switchable depending on the user, such as in languages switchable used to display the information, can have enhanced operability.

Furthermore, the LC-PC correspondence memory and the PC search block can be provided internal to the stationary device and the LC-PC correspondence memory can store an association between a logical concept and a physical concept that can be rewritten by a central control system externally connected. This can eliminate the necessity of rewriting an association between a logical concept and a physical concept for each portable device and thus allows such association to be rewritten efficiently.

Furthermore, the portable device does not include the LC-PC correspondence memory or the PC search block and simply transmits a logical concept input by a user together with an ID number and displays received data. Thus the portable device can be miniaturized and thus convenient to hold.

Fourth Embodiment

Figure 25:
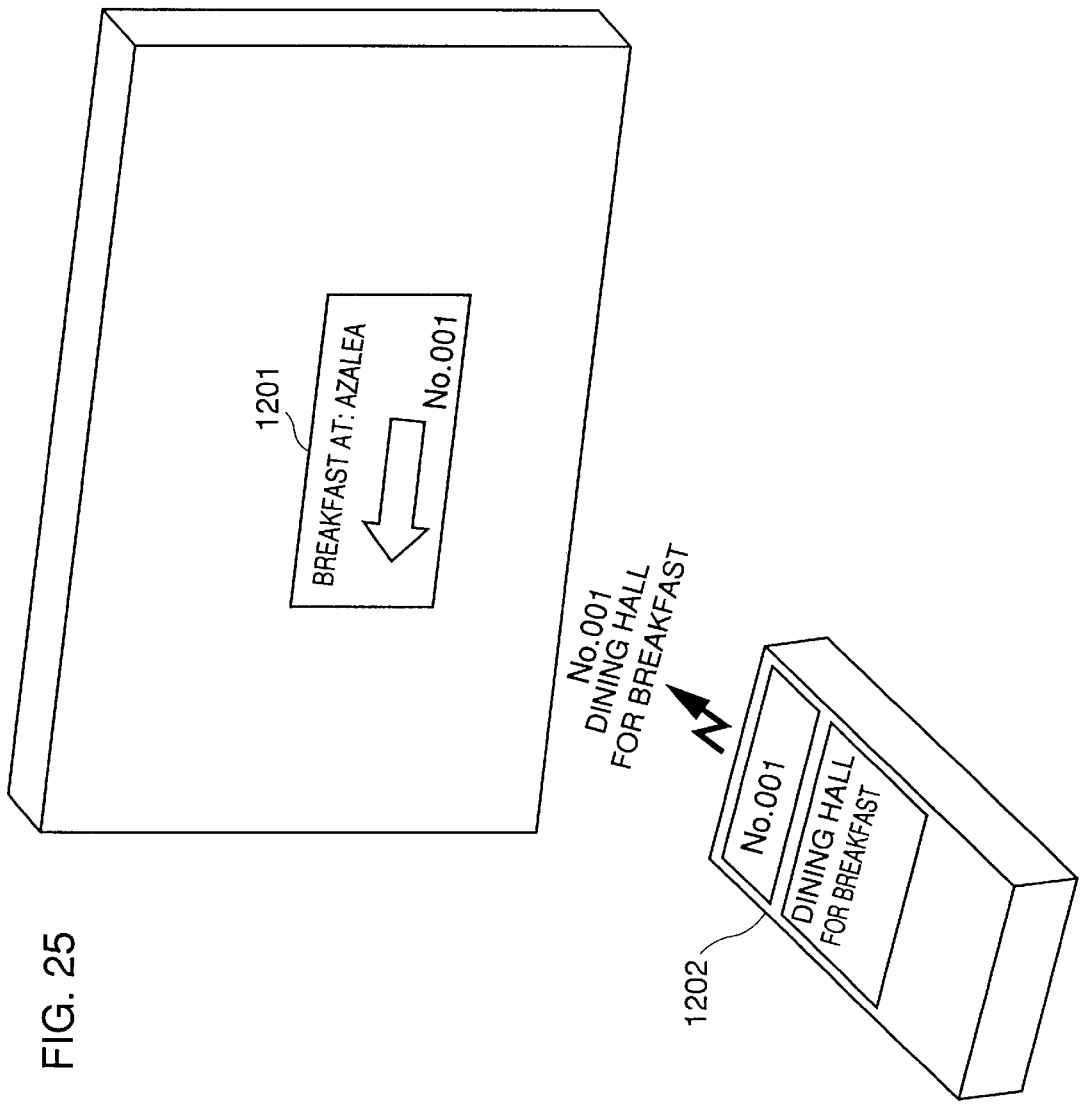
FIG. 25 shows an appearance of an information service system according to a fourth embodiment of the present invention.

Referring to FIG. 25, an information service system according to a fourth embodiment includes a portable device 1202 receiving a logical concept indicating a destination, such as a dining hall for breakfast, a public bath, together with an ID number of the portable device, such as no. 001, and transmitting them to a stationary device 1201 (described later) installed, e.g., at an intersection of passageways in a hotel.

The information service system also includes stationary device 1201 receiving a logical concept and an ID number from portable device 1202, searching for a physical concept depending on the logical concept and the ID number, searching for a direction to the physical concept, and displaying the logical concept, the physical concept, a retrieved direction and the ID number, and a central control system (not shown) updating an association between a logical concept and ID number and a physical concept that is stored in stationary device 1201.

Figure 26:
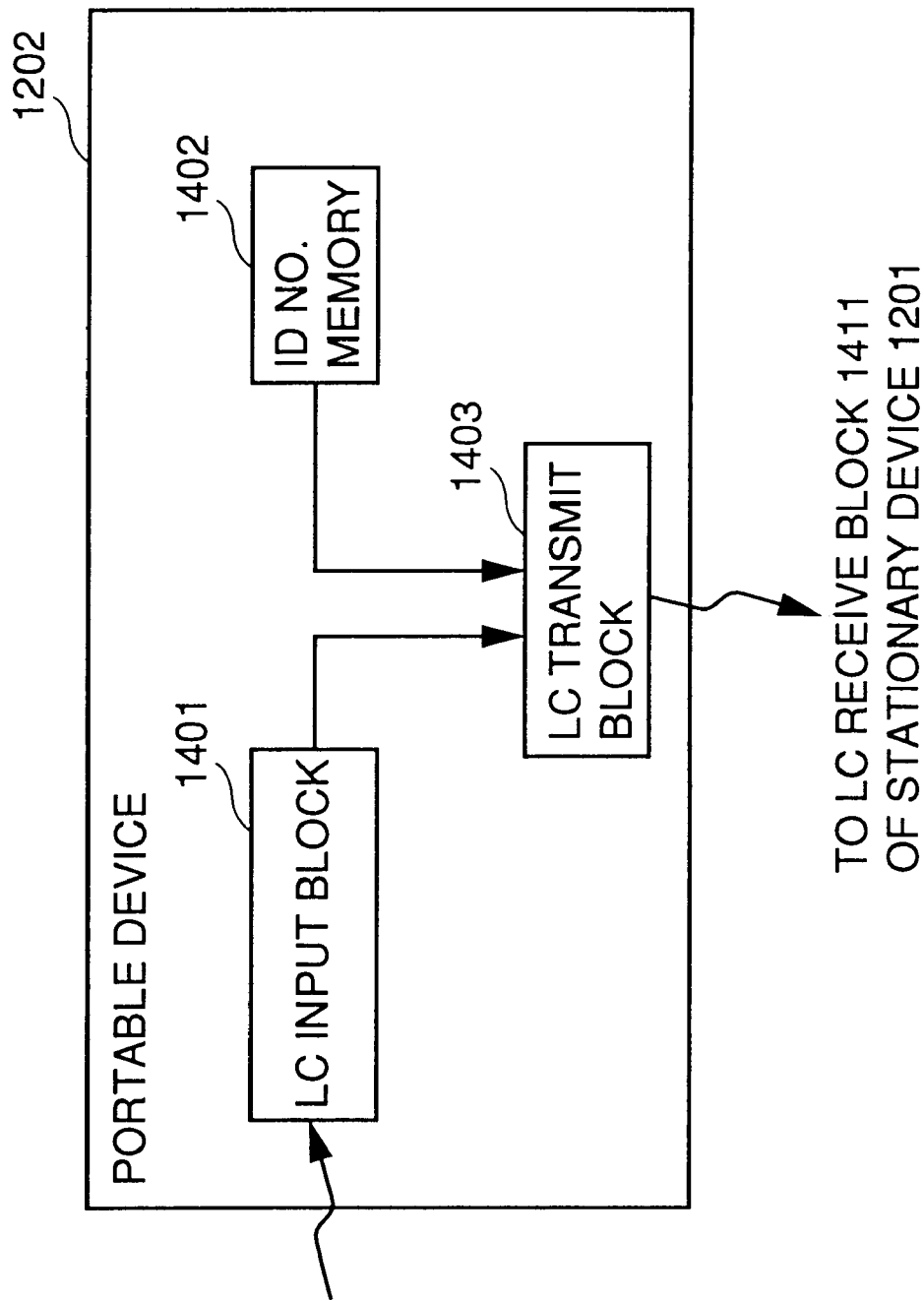
FIG. 26 is a block diagram showing a configuration of a portable device 1202.

Referring to FIG. 26, portable device 1202 includes an LC input block 1401 receiving a logical concept input by a user indicative of a destination, an ID number memory 1402 storing an ID number of portable device 1202, and an LC transmit block 1403 connected to LC input block 1401 and ID number memory 1402 to externally transmit a logical concept and an ID number.

Figure 27:
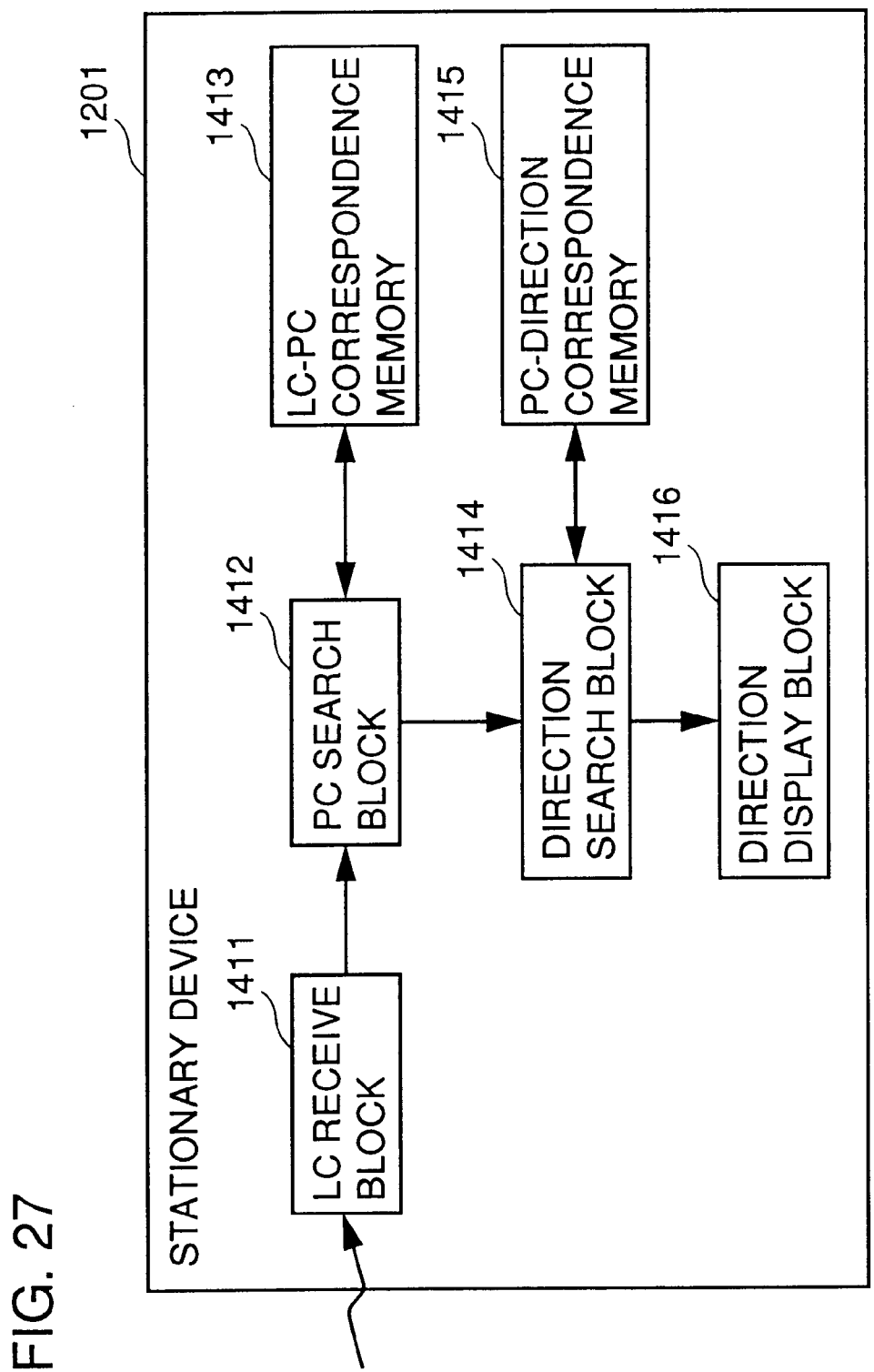
FIG. 27 is a block diagram showing a configuration of a stationary device 1201.

Referring to FIG. 27, stationary device 1201 includes an LC receive block 1411 receiving from portable device 1202 a logical concept and an ID number, an LC-PC correspondence memory 1413 storing an association between a logical concept and ID number and a physical concept, and a PC search block 1412 connected to LC receive block 1411 and LC-PC correspondence memory 1413 to search a correspondence stored in LC-PC correspondence memory 1413 for a physical concept corresponding to a logical concept and ID number and output a retrieved physical concept together with the logical concept and the ID number.

Stationary device 1201 also includes a PC-direction correspondence memory 1415 storing an association between a physical concept and a direction to a destination represented by the physical concept, a direction search block 1414 connected to PC search block 1412 and PC-direction correspondence memory 1415 to receive an output from PC search block 1412, search PC-direction correspondence memory 1415 for a direction to the destination represented by the physical concept, and output a retrieved direction together with the logical concept, the physical concept and the ID number, and a direction display block 1416 connected to direction search block 1414 to receive and display an output from direction search block 1414.

It should be noted that LC-PC correspondence memory 1413 is connected to the above-described central control system, which allows LC-PC correspondence memory 1413 to store an association between a logical concept, ID number and a physical concept that can be updated as appropriate.

LC-PC correspondence memory 1413 stores an association between a logical concept, ID number and a physical concept that is similar to an association between a logical concept, ID number and a physical concept that is stored in LC-PC correspondence memory 1413 of stationary device 1101 according to the third embodiment described with reference to FIG. 21. Accordingly, such association will not be described in detail.

PC-direction correspondence memory 1415 stores a PC-direction association similar to that stored in PC-direction correspondence memory 1315 of stationary device 1101 according to the third embodiment described with reference to FIG. 22. Accordingly, such association will not be described in detail.

Figure 28:
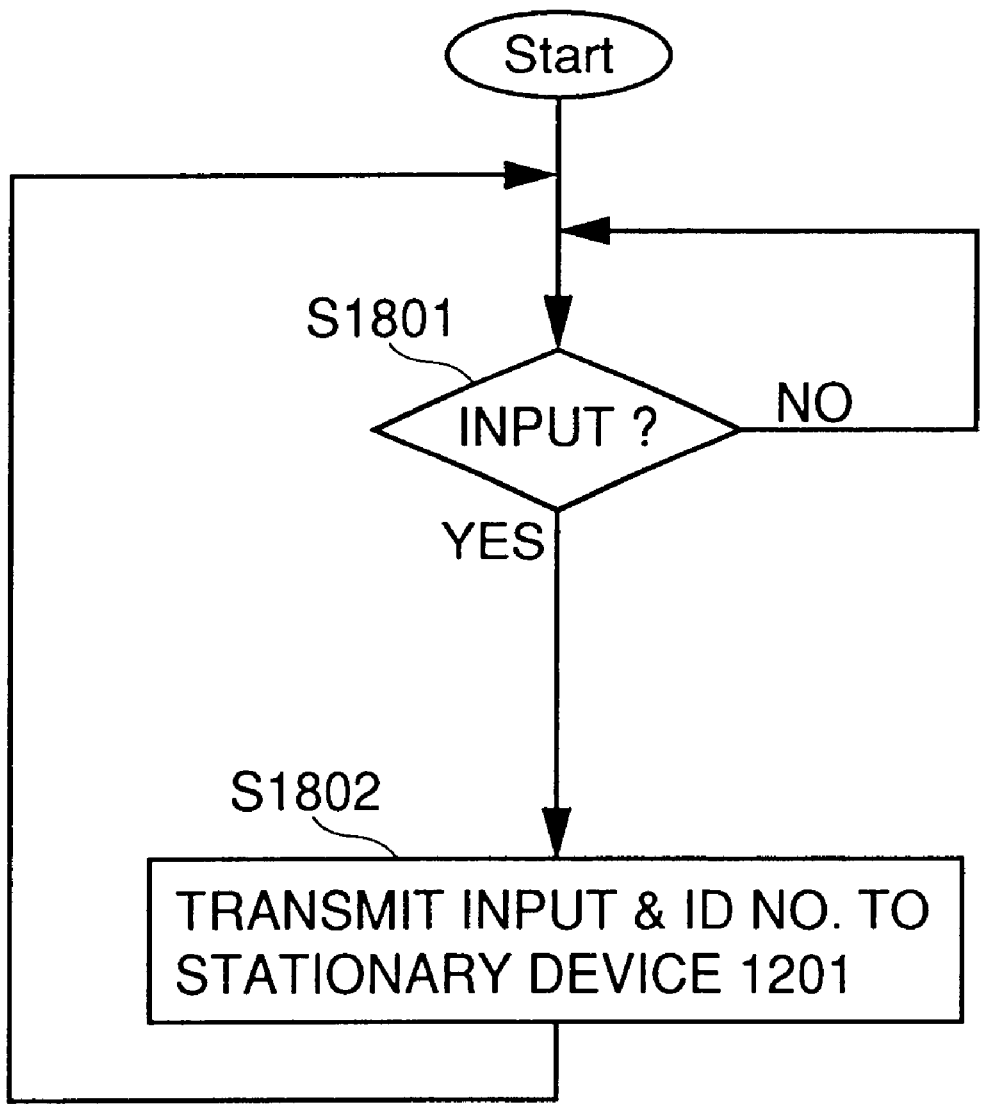
FIG. 28 is a flow chart representing a process performed by portable device 1202.

Referring to FIG. 28, portable device 1202 operates as described below: portable device 1202 waits for data input from a user (S1801). When a user inputs data or LC input block 1401 receives a logical concept (YES at S1801), LC transmit block 1403 transmits to stationary device 1201 positioned opposite to portable device 1202 the logical concept and an ID number stored in ID number memory 1402 (S1802).

Figure 29:
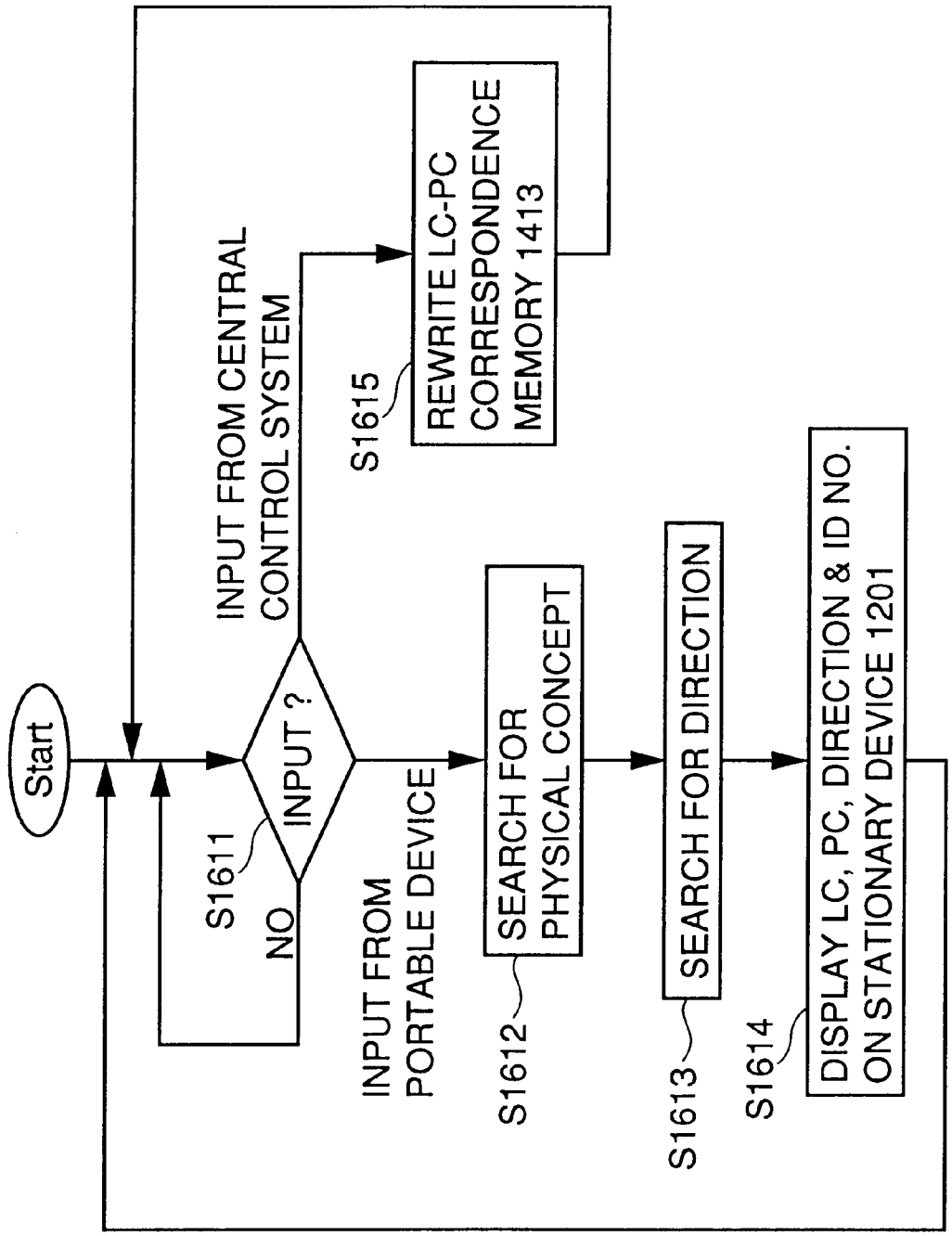
FIG. 29 is a flow chart representing a process performed by stationary device 1201.

Referring to FIG. 29, stationary device 1202 operates as described below: stationary device 1201 waits for data input from portable device 1202 or the central control system (S1611). If via portable device 1202 data is input or LC receive block 1411 receives a logical concept and an ID number (an input from the portable device at S1611), then PC search block 1412 searches LC-PC correspondence memory 1413 a physical concept corresponding to the logical concept and the ID number and outputs a retrieved physical concept together with the logical concept and the ID number (S1612). Direction search block 1414 receives from LC-PC correspondence memory 1413 the physical concept and the logical concept, searches LC-PC correspondence memory 1413 a direction to the destination represented by the physical concept, and outputs a retrieved direction together with the physical concept, the logical concept and the ID number (S1613). Direction display block 1416 receives from direction search block 1414 the logical concept, the physical concept, the direction and the ID number and displays them (S1614). Then the controls goes back to S1611.

If via the central control system data is input (an input from the central control system at S1611), then in LC-PC correspondence memory 1413, connected to the central control system, an association between a physical concept, ID number and a logical concept stored therein is rewritten (S1615). Then the controls goes back to S1611.

In the information service system as described above, the user is not required to input his or her current position and is only required to input a destination to obtain a direction to the destination and thus efficiently reach the destination.

Furthermore, the user can input a destination through a logical concept. As such, the user can efficiently reach the destination if as in a hotel or other unfamiliar buildings the user does not know the name of a hall or the like corresponding to the destination or the positional relationship thereof.

Furthermore, the LC-PC correspondence memory and the PC search block can be provided internal to the stationary device and the LC-PC correspondence memory can store an association between a logical concept and a physical concept that can be rewritten by a central control system connected externally. This eliminates the necessity of rewriting an association between a logical concept and a physical concept for each portable device and thus allows such association to be rewritten efficiently.

Furthermore, the portable device does not include the LC-PC correspondence memory or the PC search block and simply transmits a logical concept input by a user together with an ID number. Thus the portable device can be miniaturized.

Furthermore, the stationary device can display the portable device's ID number. As such, if more than one such portable device transmit information to the stationary device each user can determine whether the information displayed on the stationary device is associated with the information transmitted by the user. Thus the user can obtain information accurately.

Fifth Embodiment

Figure 30:
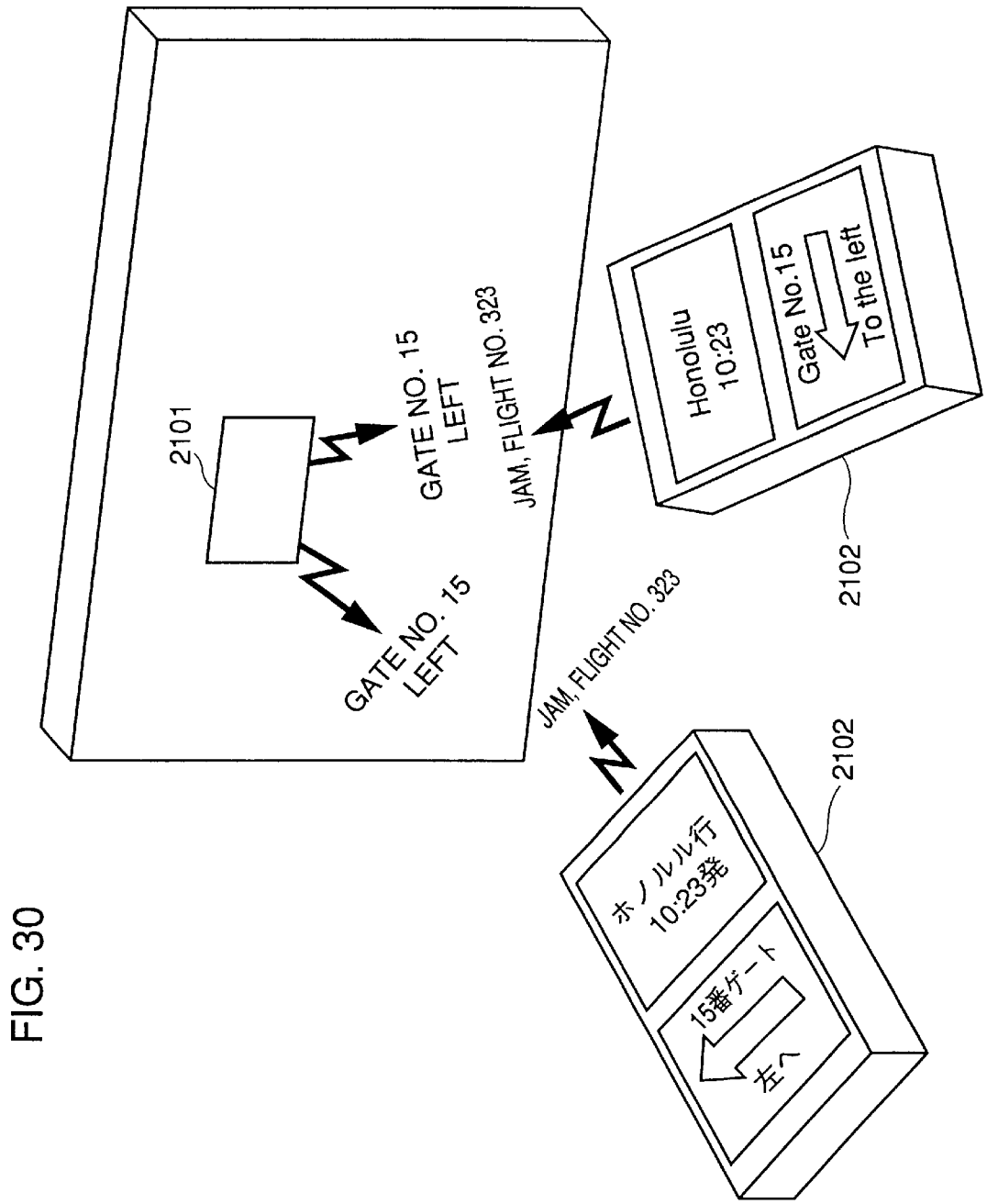
FIG. 30 shows an appearance of an information service system according to a fifth embodiment of the present invention.

Referring to FIG. 30, an information service system according to a fifth embodiment includes a portable device 2102 using an input logical concept indicating a destination and departure time of an airplane, such as "To Honolulu, departing at 10:23," to search for an intermediate concept indicating the airplane to board, such as "JAM, Flight no. 323," transmitting a retrieved intermediate concept to a stationary device 2101 (described later) installed, e.g., at an intersection of passageways in an airport terminal, receiving from stationary device 2101 a physical concept indicating a destination, such as "Gate no. 15," and a direction to be taken by the user and displaying the physical concept and the direction.

The information service system also includes stationary device 2101 receiving an intermediate concept from portable device 2102, searching for a physical concept depending on the intermediate concept, searching for a direction to the physical concept, and transmitting to portable device 2102 the physical concept and the direction to the physical concept, and a central control system (not shown) connected to stationary device 2101 to update an association between an intermediate concept and a physical concept that is stored in stationary device 2101.

Portable device 2102 displays data in a language as desired by the user. Accordingly, stationary device 2101 and portable device 2102 are adapted to communicate data represented by codes common throughout the world. Such codes are similar to those described with reference to FIGS. 2 and 3 and will thus not be described in detail.

Figure 31:
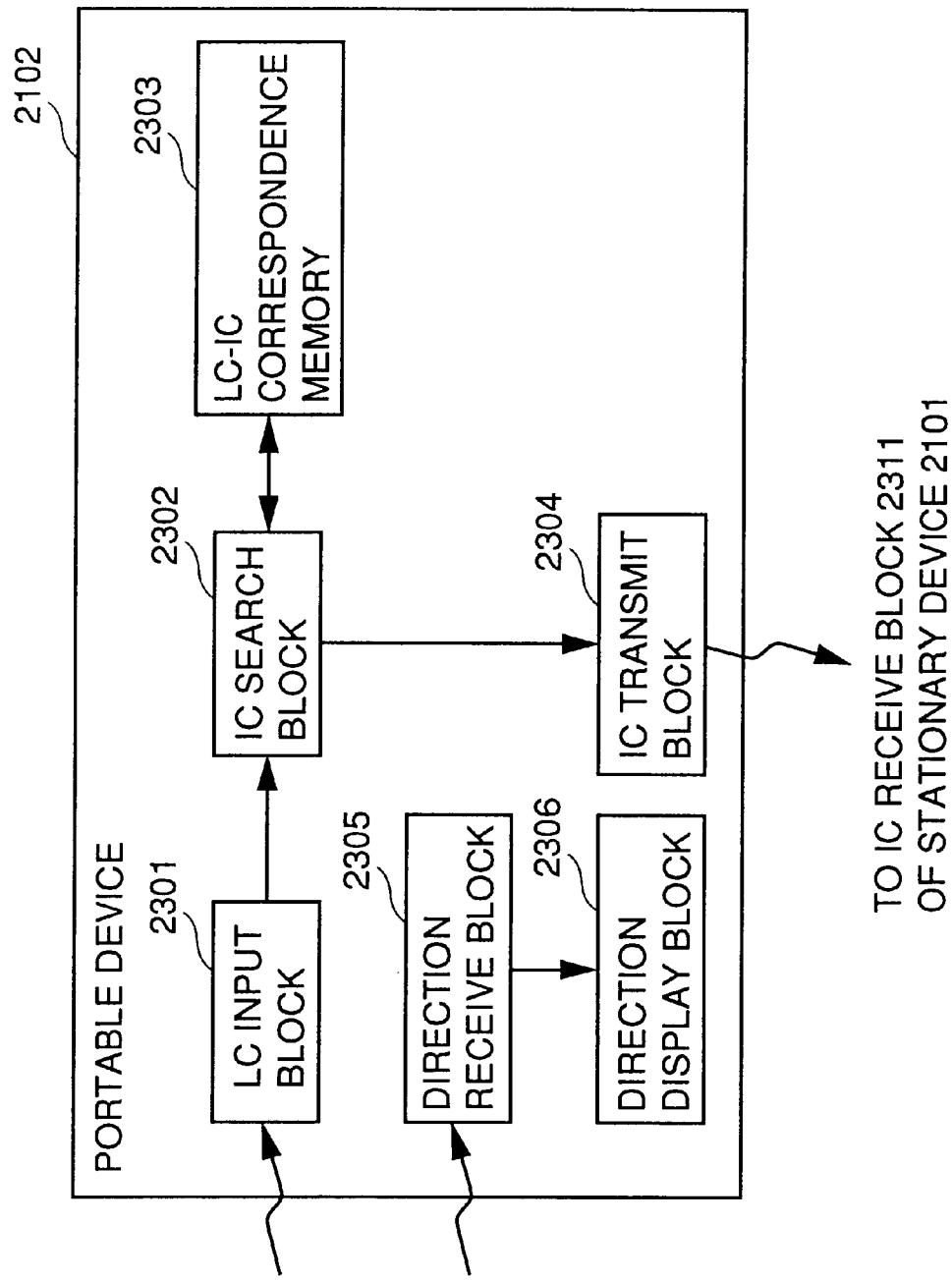
FIG. 31 is a block diagram showing a configuration of a portable device 1202.

Referring to FIG. 31, portable device 2101 includes an LC input block 2301 receiving a logical concept input by a user indicating a destination and departure time of an airplane, a logical concept-intermediate concept (LC-IC) correspondence memory 2303 storing an association between a logical concept and an intermediate concept, an IC search block 2302 connected to LC input block 2301 and LC-IC correspondence memory 2303 to receive a logical concept input by a user and search LC-IC correspondence memory 2303 for an intermediate concept corresponding to the logical concept input by the user and output a retrieved intermediate concept, and an IC transmit block 2304 connected to IC search block 2302 to externally transmit an output from IC search block 2302.

Portable device 2102 also includes a direction receive block 2305 receiving from stationary device 2101 a logical concept and a direction to a destination, and a direction display block 2306 connected to direction receive block 2305 to display a logical concept and a direction to a destination.

Referring to FIG. 32, LC-IC correspondence memory 2303, as has been described above, stores an association between a logical concept and an intermediate concept. For example, a logical concept "To Honolulu, departing at 10:23" corresponds to an intermediate concept "JAM, Flight no. 323." A logical concept "To Helsinki, departing at 10:51" corresponds to an intermediate concept "JAM, Flight no. 421."

Figure 33:
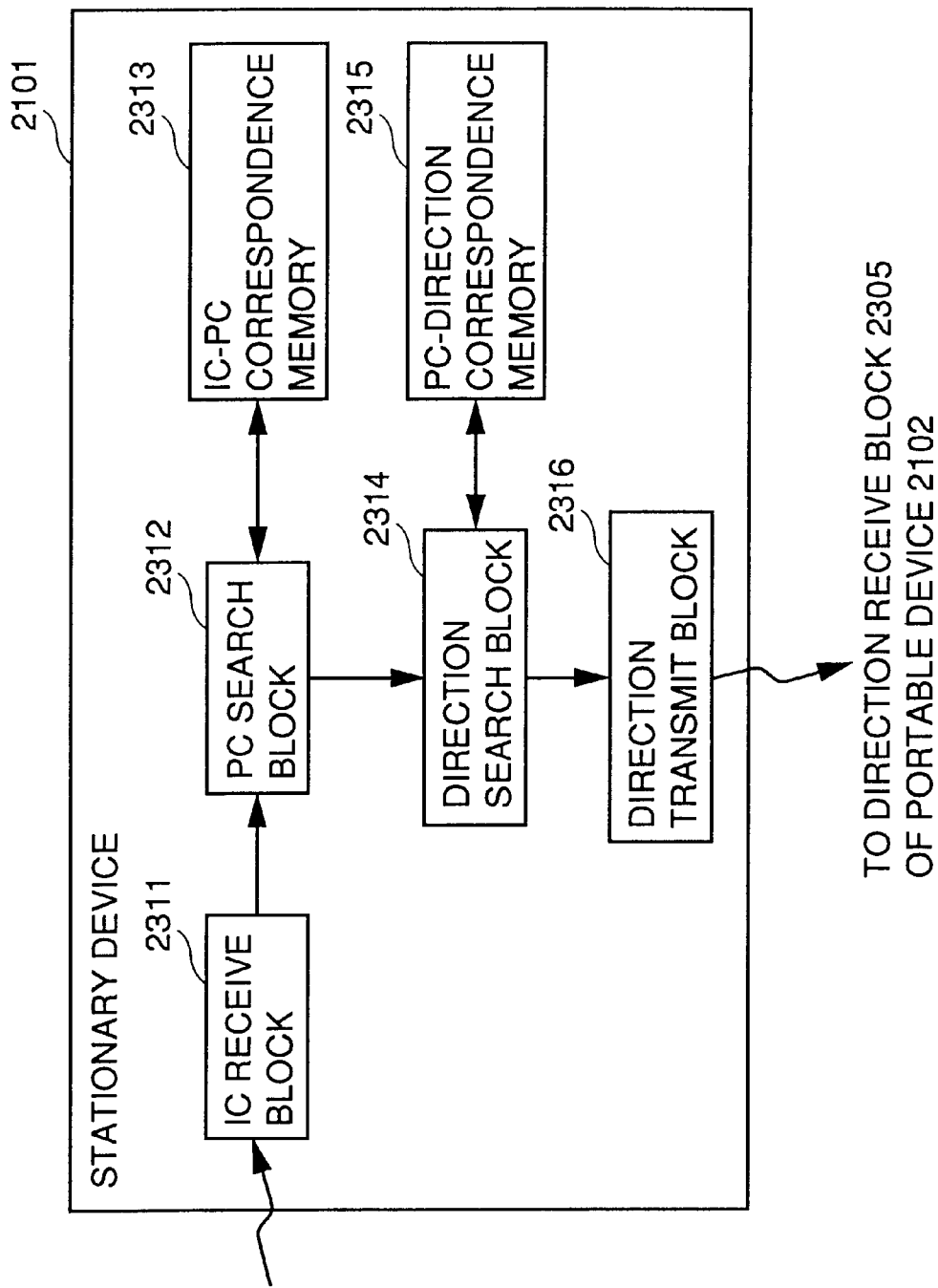
FIG. 33 is a block diagram showing a configuration of a stationary device 2101.

Referring to FIG. 33, stationary device 2101 includes an IC receive block 2311 receiving an intermediate concept transmitted from portable device 2102, an IC-PC correspondence memory 2313 storing an association between an intermediate concept and a physical concept, and a PC search block 2312 connected to IC receive block 2311 and IC-PC correspondence memory 2313 to search IC-PC correspondence memory 2313 for a physical concept corresponding to an intermediate concept output from IC receive block 2311 and output a retrieved physical concept.

Stationary device 2101 also includes a PC-direction correspondence memory 2315 storing an association between a physical concept and a direction to a destination represented by the physical concept, a direction search block 2314 connected to PC search block 2312 and PC-direction correspondence memory 2315 to search PC-direction correspondence memory 2315 for a direction to a destination represented by a physical concept output from PC search block 2312 and output a retrieved direction together with the physical concept, and a direction transmit block 2316 connected to direction search block 2314 to receive from direction search block 2314 a physical concept and a direction and externally output the physical concept and the direction.

It should be noted that IC-PC correspondence memory 2313 is connected to the above-described central control system, which allows IC-PC correspondence memory 2313 to store an association between an intermediate concept and a physical concept that can be updated as appropriate.

Referring to FIG. 34, IC-PC correspondence memory 2313, as has been described above, stores an association between an intermediate concept and a physical concept. For example, intermediate concepts, such as "JAM, Flight no. 323," "JAM, Flight no. 421" correspond to physical concepts, such as "Gate no. 15," "Gate no. 32," respectively.

Referring to FIG. 35, PC-direction correspondence memory 2315, as has been described above, stores an association between a physical concept and a direction. For example, physical concepts such as "Gate no. 1," "Gate no. 2," correspond to directions, such as "turn right," "turn left," respectively.

Figure 36:
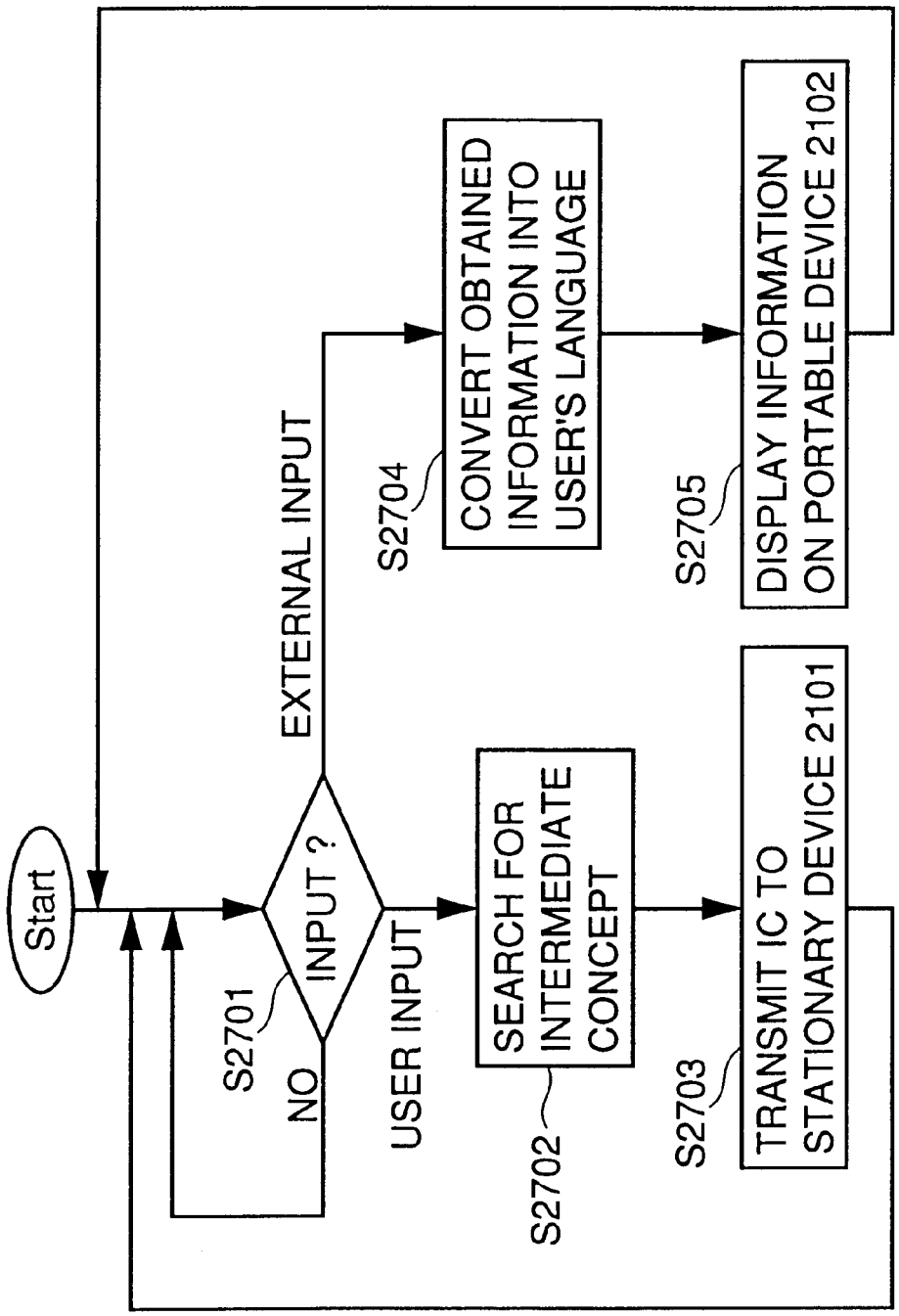
FIG. 36 is a flow chart representing a process performed by portable device 2102.

Referring to FIG. 36, portable device 2102 operates as described below: portable device 2102 waits for data input by a user or from stationary device 2101 (S2701). If a user inputs data or LC input block 2301 receives a logical concept (a user input at S2701), then IC search block 2302 searches LC-IC correspondence memory 2303 for an intermediate concept corresponding to the logical concept output from LC input block 2301 and outputs a retrieved intermediate concept (S2702). IC transmit block 2304 receives an intermediate concept output from IC search block 2302 and transmits the intermediate concept to stationary device 2102 positioned opposite to portable device 2102 (S2703).

If via stationary device 2101 data is input or direction receive block 2305 receives from stationary device 2101 a direction and a logical concept (an external input at S2701), then direction receive block 2305 converts the data of the received direction and logical concept in a language used by the user and outputs the data thus converted (S2704). Direction display block 2306 receives and displays the converted data (S2705).

Figure 37:
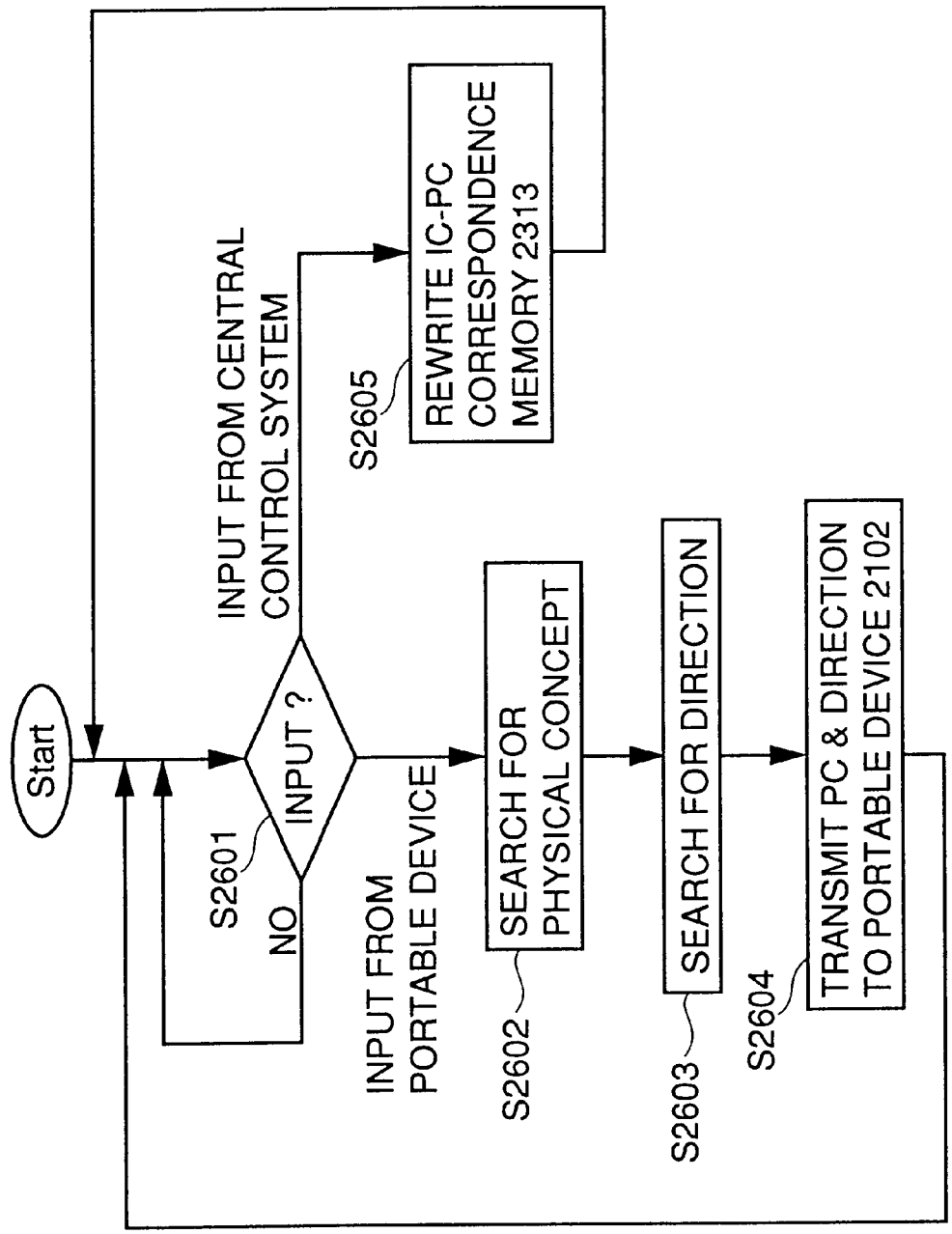
FIG. 37 is a flow chart representing a process performed by stationary device 2101.

Referring to FIG. 37, stationary device 2101 operates as described below: stationary device 2101 waits for data input from portable device 2102 or the central control system (S2601). If via portable device 2102 data is input or IC receive block 2311 receives an intermediate concept (an input from the portable device at S2601), then PC search block 2312 searches IC-PC correspondence memory 2313 for a physical concept corresponding to the intermediate concept and outputs a retrieved physical concept (S2602). Direction search block 2314 receives the physical concept from PC search block 2312, searches PC-direction correspondence memory 2315 for a direction to a destination represented by the physical concept and outputs a retrieved direction together with the physical concept (S2603). Direction transmit block 2316 receives from direction search block 2314 the direction and the physical concept and transmits them to portable device 2102 (S2604). The controls then goes back to S2601.

If via the central control system data is input (an input from the central control system at S2601), then in the IC-PC correspondence memory, connected to the central control system, an association between an intermediate concept and a physical concept that is stored therein is rewritten (S2605). Then the controls goes back to S2601.

In the information service system as described above, a user is not required to input his or her current position and is only required to input a destination to obtain a direction to the destination and thus efficiently reach the destination.

Furthermore, the user can input a destination through a logical concept. As such, the user can efficiently reach the destination if as in an unfamiliar building such as an airport gate the user does not know the name of a place corresponding to the destination or the positional relationship thereof.

Furthermore, the portable device capable of displaying information in a manner switchable depending on the user, such as in languages switchable used to display the information, can have enhanced operability.

Furthermore, the portable device is not required to internally store data large in scale, such as a map. Thus the device can be miniaturized and thus have a structure convenient to hold.

Furthermore, the IC-PC correspondence memory and the PC search block can be provided internal to the stationary device and the IC-PC correspondence memory can store an association between an intermediate concept and a physical concept that can be rewritten by a central control system connected externally. As such, if an intermediate concept and a physical concept have therebetween an association varying with time, the portable device can display accurate information on a direction and the user can thus efficiently reach a destination.

Furthermore, if a logical concept and a physical concept have a complicated association therebetween, using an intermediate concept allows a user simply inputting the logical concept to efficiently reach a destination.

Furthermore, the present system is particularly effective when a logical concept and a physical concept do not have therebetween an association that is previously definite. For example, when a ticket for an airplane is actually purchased, the destination and time of the airplane (a logical concept) and the gate number therefor (a physical concept) do not yet have therebetween a definite association while the destination and time of the airplane and the flight number thereof already have a definite association therebetween. As such, additionally introducing an intermediate concept "flight number" can distinctively separate an association definite when a ticket is actually purchased (an association between a logical concept and an intermediate concept) and an association definite on the day when the airplane departs (an association between an intermediate concept and a physical concept). If an association can be divided in two, as described above, the association can be understood and controlled more readily. For example, an association between a destination and time and a flight number may be controlled by an airline and an association between the flight number and a gate number may be controlled by an airport management office. It should also be noted that if desired, a logical concept and a physical concept may have therebetween an association divided in more than two.

Sixth Embodiment

Figure 38:
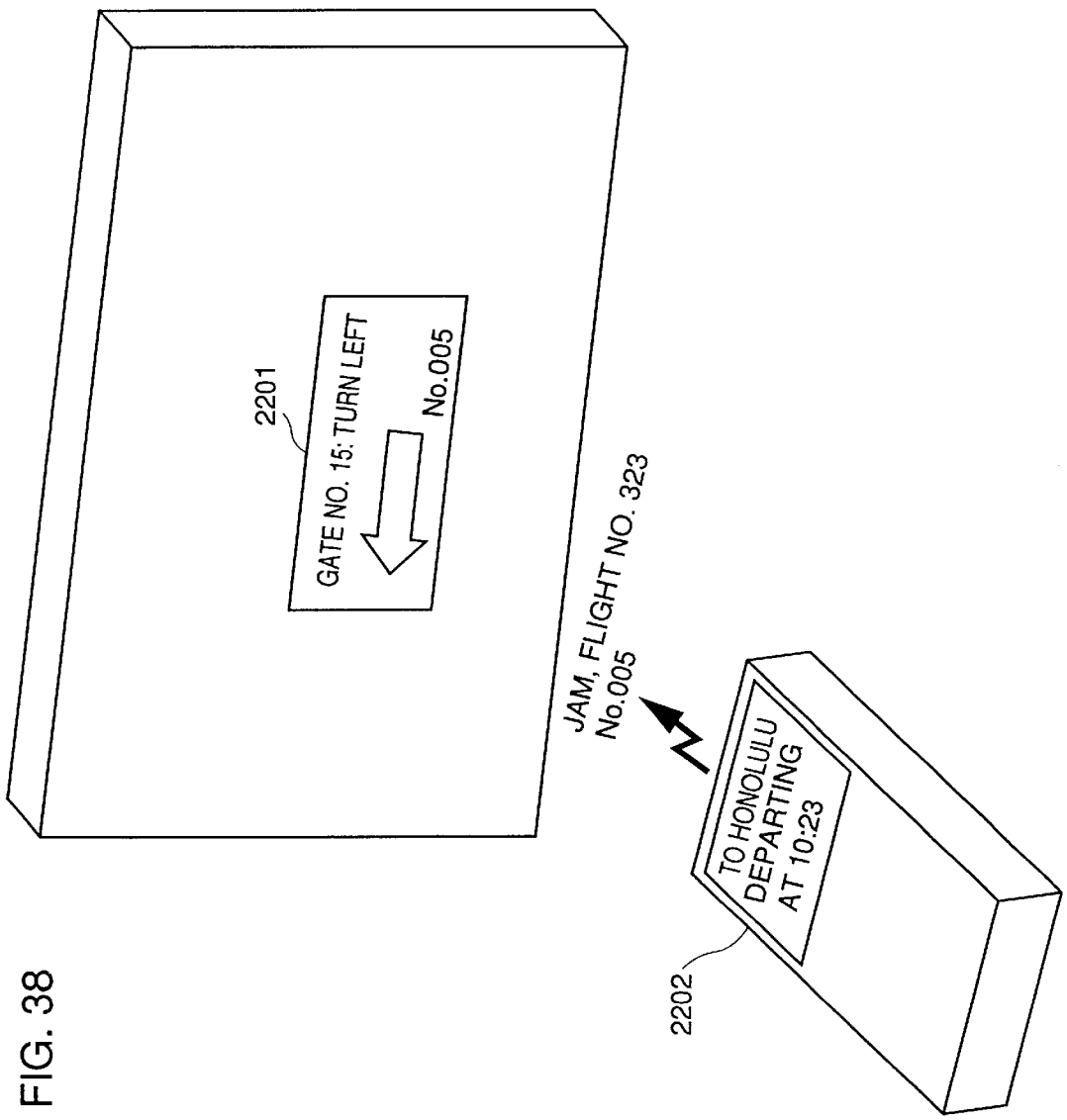
FIG. 38 shows an appearance of an information service system according to a sixth embodiment of the present invention.

Referring to FIG. 38, an information service system according to a sixth embodiment includes a portable device 2202 using a received logical concept indicating an airplane's destination and departure time, such as "To Honolulu, departing at 10:23," to search for an intermediate concept indicating the airplane to board, such as "JAM, Flight no. 323," and transmit a retrieved intermediate concept together with an ID number of the portable device 2202 to a stationary device 2202 (described later) installed, e.g., at an intersection of passageways in an airport terminal.

The information service system also includes stationary device 2201 receiving from portable device 2202 an intermediate concept and an ID number, searching for a physical concept depending on the intermediate concept, searching for a direction to the physical concept, and displaying the physical concept, the direction to the physical concept and the ID number, and a central control system (not shown) updating an association between an intermediate concept and a physical concept that is stored in stationary device 2201.

Figure 39:
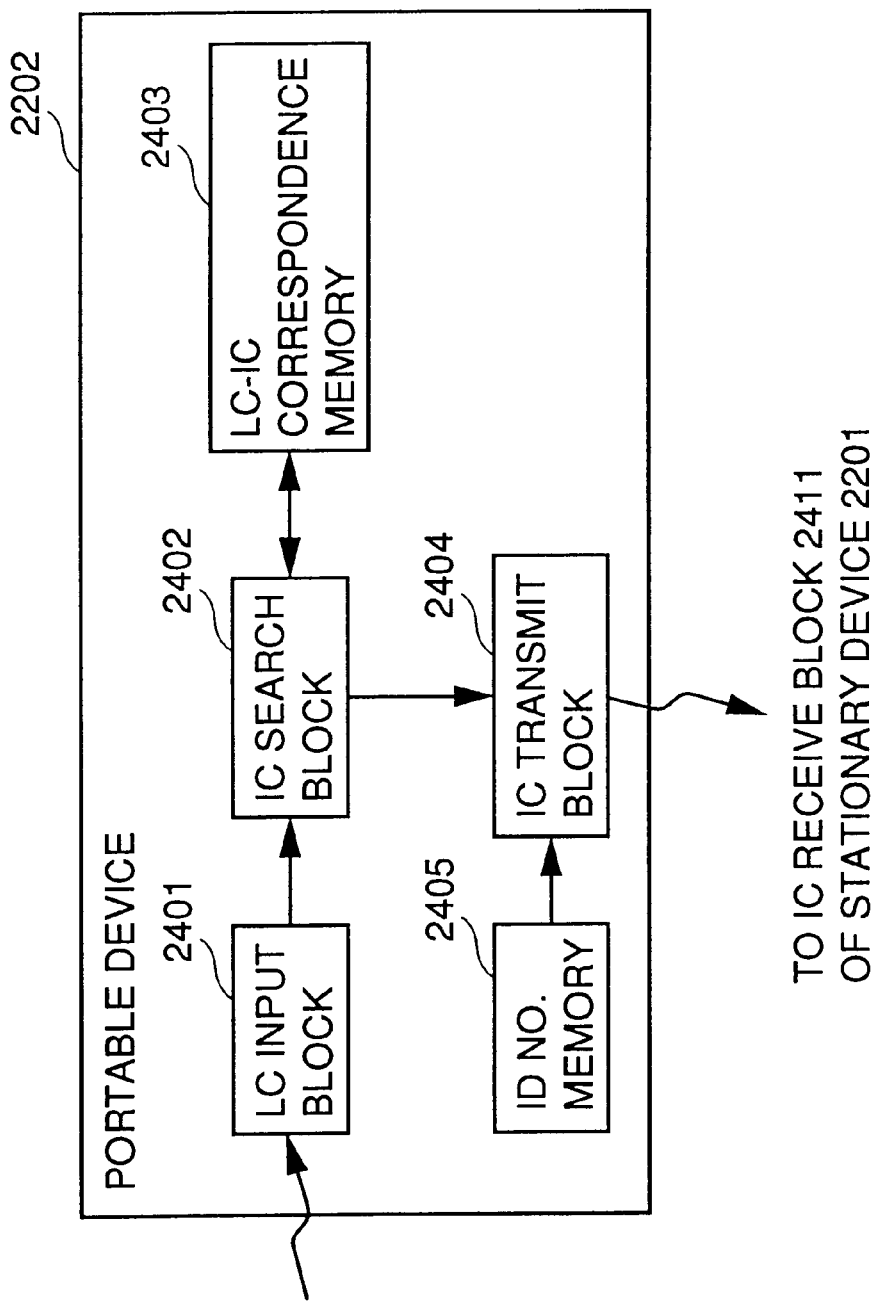
FIG. 39 is a block diagram showing a configuration of a portable device 2202.

Referring to FIG. 39, portable device 2202 includes an LC input block 2401 receiving a logical concept input by a user indicative of an airplane's destination and departure time, an LC-IC correspondence memory 2403 storing an association between a logical concept and an intermediate concept, and an IC search block 2402 connected to LC input block 2401 and LC-IC correspondence memory 2403 to receive a logical concept input by a user, search LC-IC correspondence memory 2403 for an intermediate concept corresponding to the logical concept and output a retrieved intermediate concept.

Portable device 2202 also includes an ID number memory 2405 storing an ID number of portable device 2202, and an IC transmit block 2404 connected to ID number memory 2405 and IC search block 2402 to externally transmit an output from IC search block 2402 and an ID number.

LC-IC correspondence memory 2403 stores an LC-IC association similar to that stored in LC-IC correspondence memory 2303 of stationary device 2101 according to the fifth embodiment described with reference to FIG. 32. As such, such association will not be described in detail.

Figure 40:
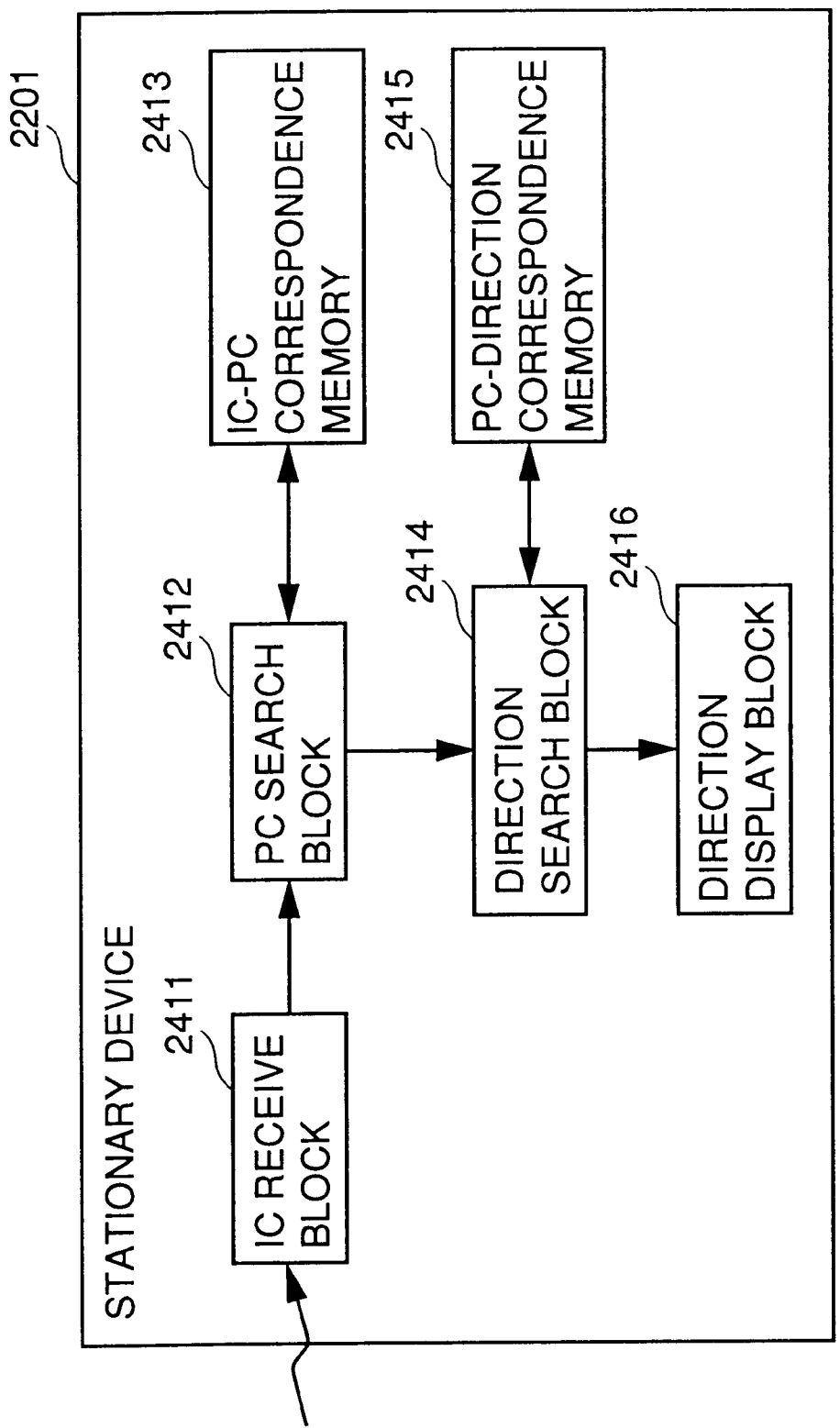
FIG. 40 is a block diagram showing a configuration of a stationary device 2201.

Referring to FIG. 40, stationary device 2201 includes an IC receive block 2411 receiving from portable device 2202 an intermediate concept and an ID number, an IC-PC correspondence memory 2413 storing an association between an intermediate concept and a physical concept, and a PC search block 2412 connected to IC receive block 2411 and IC-PC correspondence memory 2413 to search IC-PC correspondence memory 2413 for a physical concept corresponding to an intermediate concept output from IC receive block 2411 and output a retrieved physical concept together with an ID number.

Stationary device 2201 also includes a PC-direction correspondence memory 2415 storing an association between a physical concept and a direction to a destination represented by the physical concept, a direction search block 2414 connected to PC search block 2412 and PC-direction correspondence memory 2415 to search PC-direction correspondence memory 2415 for a direction to a destination represented by a physical concept output from PC search block 2412, and output a retrieved direction together with the physical concept and an ID number, and a direction display block 2416 connected to direction search block 2414 to receive from direction search block 2414 a physical concept, a direction and an ID number and display them.

It should be noted that IC-PC correspondence memory 2413 is connected to the above-described central control system, which allows IC-PC correspondence memory 2413 to store an association between an intermediate concept and a physical concept that can be updated as appropriate.

IC-PC correspondence memory 2413 stores an IC-PC association similar to that stored in IC-PC correspondence memory 2313 of stationary device 2101 according to the fifth embodiment described with reference to FIG. 34. As such, such association will not be described in detail.

PC-direction correspondence memory 2415 stores a PC-direction association similar to that stored in PC-direction correspondence memory 2415 of stationary device 2101 according to the fifth embodiment described with reference to FIG. 35. As such, such association will not be described in detail.

Figure 41:
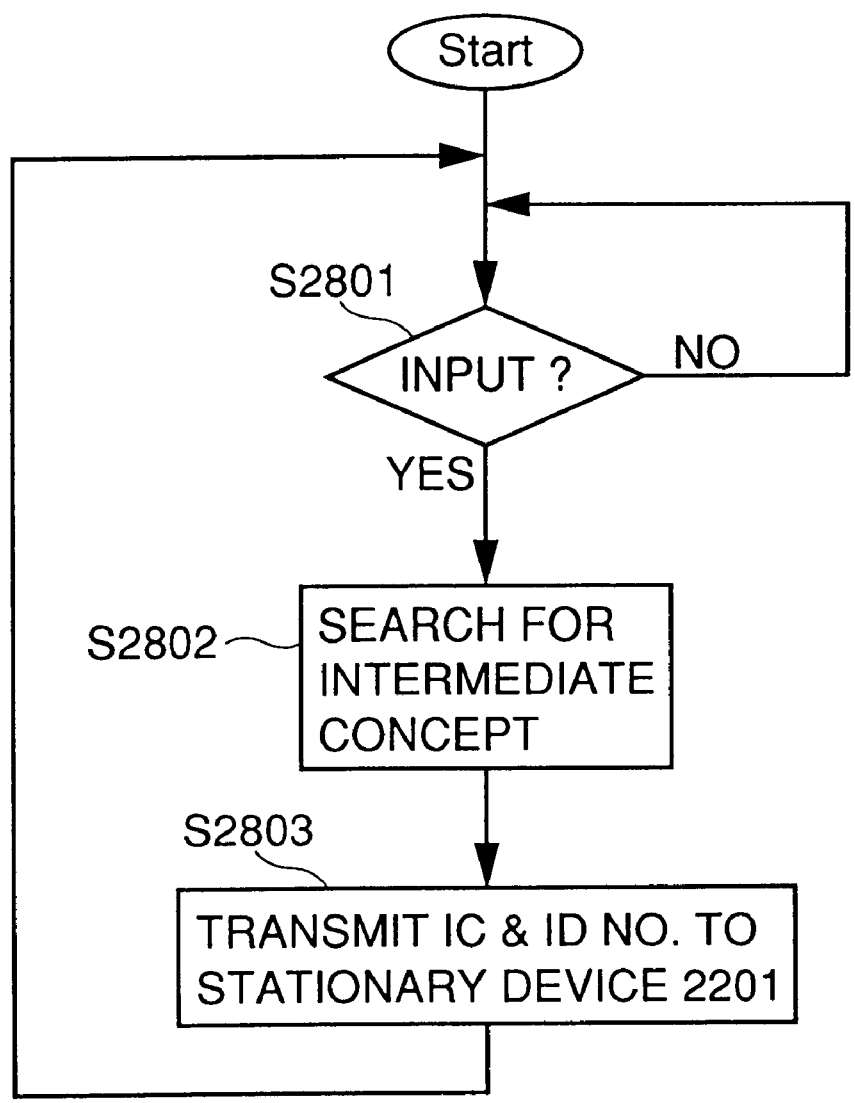
FIG. 41 is a flow chart representing a process performed by portable device 2202.

Referring to FIG. 41, portable device 2202 operates as described below: portable device 2202 waits for data input by a user (S2801). When a user inputs data or LC input block 2401 receives a logical concept (YES at S2801), then IC search block 2402 searches LC-IC correspondence memory 2403 for an intermediate concept corresponding to the logical concept output from LC input block 2401 and outputs a retrieved intermediate concept (S2802). IC transmit block 2404 receives the intermediate concept output from IC search block 2302 and outputs the intermediate concept together with an ID number to stationary device 2201 positioned opposite to portable device 2202 (S2803).

Figure 42:
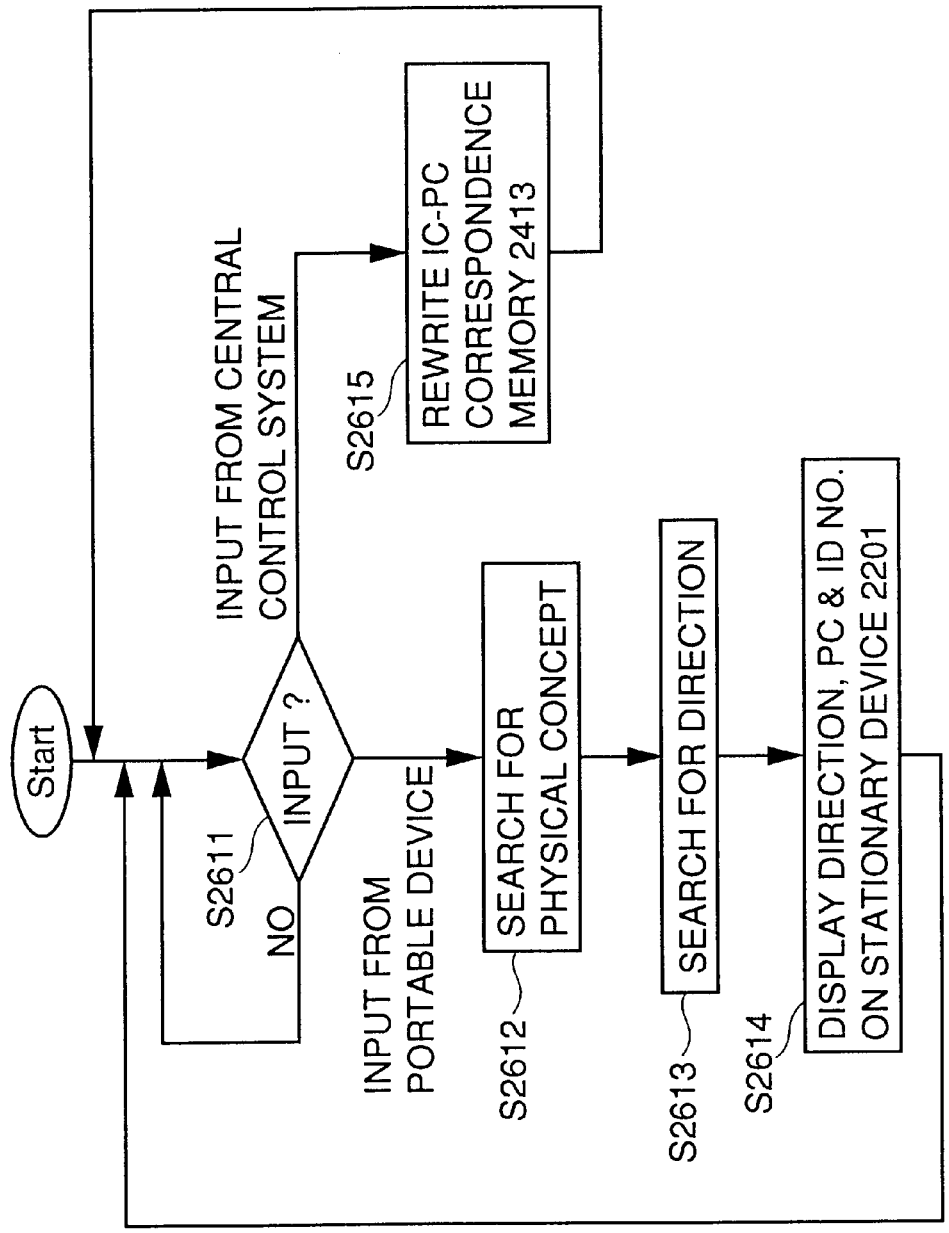
FIG. 42 is a flow chart representing a process performed by stationary device 2201.

Referring to FIG. 42, stationary device 2201 operates as described below: stationary device 2201 waits for data input from portable device 2202 or the central control system (S2611). If via portable device 2202 data is input or IC receive block 2411 receives an intermediate concept and an ID number (an input from the portable device at S2611), then PC search block 2412 searches IC-PC correspondence memory 2413 for a physical concept corresponding to the received intermediate concept and outputs a retrieved physical concept together with the ID number (S2612). Direction search block 2414 receives from PC search block 2412 the physical concept and the ID number, searches PC-direction correspondence memory 2415 a direction to a destination represented by the physical concept and outputs a retrieved direction together with the physical concept and the ID number (S2613). Direction display block 2416 receives from direction search block 2414 the direction, the physical concept and the ID number and displays them (S2614). Then the controls goes back to S2611.

If via the central control system data is input (an input from the central control system at S2611), then in IC-PC correspondence memory 2413, connected to the central control system, an association between an intermediate concept and a physical concept that is stored therein is rewritten (S2615). Then the controls goes back to S2601.

In the information service system as described above, a user is not required to input his or her current position and is only required to input a destination to obtain a direction to the destination and thus efficiently reach the destination.

Furthermore, the user can input a destination through a logical concept. As such, the user can efficiently reach the destination if as in an unfamiliar building such as an airport gate the user does not know the name of a place corresponding to the destination or the positional relationship thereof.

Furthermore, the portable device is not required to internally store data large in scale, such as a map. Thus the device can be miniaturized and thus have a structure convenient to hold.

Furthermore, the IC-PC correspondence memory and the PC search block can be provided internal to the stationary device and the IC-PC correspondence memory can store an association between an intermediate concept and a physical concept that can be rewritten by a central control system connected externally. As such, if an intermediate concept and a physical concept have therebetween an association varying with time, the portable device can display accurate information on a direction and the user can thus efficiently reach a destination.

Furthermore, if a logical concept and a physical concept have a complicated association therebetween, using an intermediate concept allows a user simply inputting the logical concept to efficiently reach a destination.

Furthermore, the stationary device can display the portable device's ID number. As such, if more than one such portable device transmit information to the stationary device, each user can determine whether the information displayed on the stationary device is associated with the information transmitted by the user. Thus the user can obtain information accurately.

Furthermore, the present system is particularly effective when a logical concept and a physical concept do not have therebetween an association that is previously definite. For example, when a ticket for an airplane is actually purchased, the destination and time of the airplane (a logical concept) and the gate number therefor (a physical concept) do not yet have therebetween a definite association while the destination, time of the airplane and the flight number thereof already have a definite association therebetween. As such, additionally introducing an intermediate concept "flight number" can distinctively separate an association definite when a ticket is actually purchased (an association between a logical concept and an intermediate concept) and an association definite on the day when the airplane departs (an association between an intermediate concept and a physical concept). If an association can be divided in two, as described above, the association can be understood and controlled more readily. For example, an association between a destination, time and a flight number may be controlled by an airline and an association between the flight number and a gate number may be controlled by an airport management office. It should also be noted that if desired, a logical concept and a physical concept may have therebetween an association divided in more than two.

Seventh Embodiment

Figure 43:
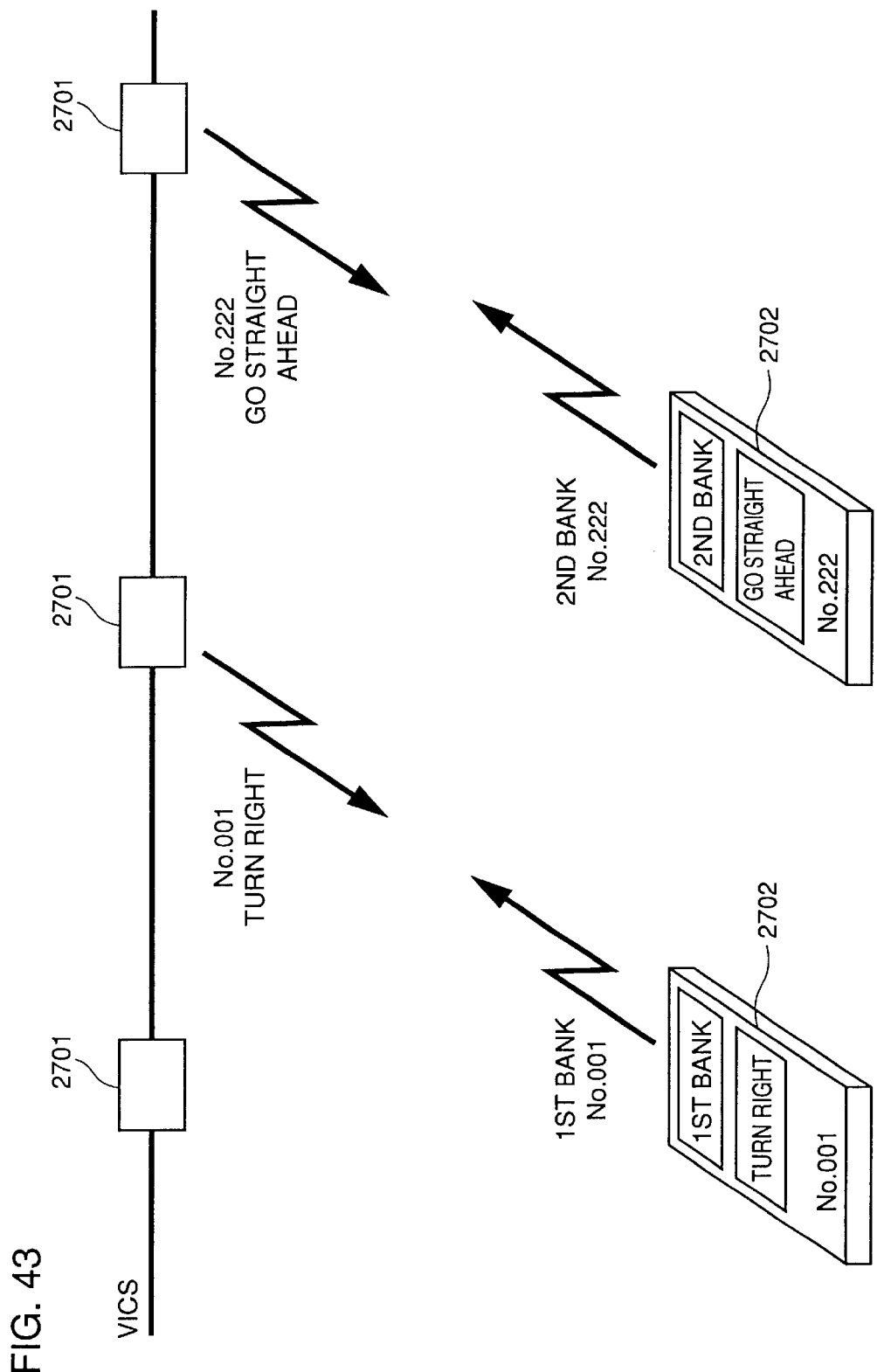
FIG. 43 shows an appearance of an information service system according to a seventh embodiment of the present invention.

Referring to FIG. 43, an information service system according to a seventh embodiment includes a user-portable device 2702 used to transmit to a beacon 2701 (described later) a physical concept indicative of the name of a bank which a user desires to use (referred to as "the bank of interest" hereinafter), such as "the first bank," "the second bank," together with an ID number of the portable device 2702, such as "no. 001," "no. 002," and receive from beacon 2701 and display a direction to the location of a nearest branch bank or a place with an automatic teller machine (ATM) installed at which the user can use a band book or a cash card of the bank of interest (referred to as an "affiliate bank" hereinafter).

The information service system also includes a plurality of beacons 2701 used in the Vehicle Information and Communication System (VICS), installed on roads, each receiving from portable device 2702 the name of the bank of interest (a logical concept) and an ID number of portable device 2702, searching for an affiliate bank (a physical concept) depending on the name of the bank of interest and the current time and transmitting to portable device 2702 a direction to the affiliate bank.

Portable device 2702 displays information in a language desired by a user. Accordingly, a direction to a physical concept and a logical concept are represented by codes common throughout the world. Such codes are similar to those described with reference to FIGS. 2 and 3 and will thus not be described in detail.

Figure 44:
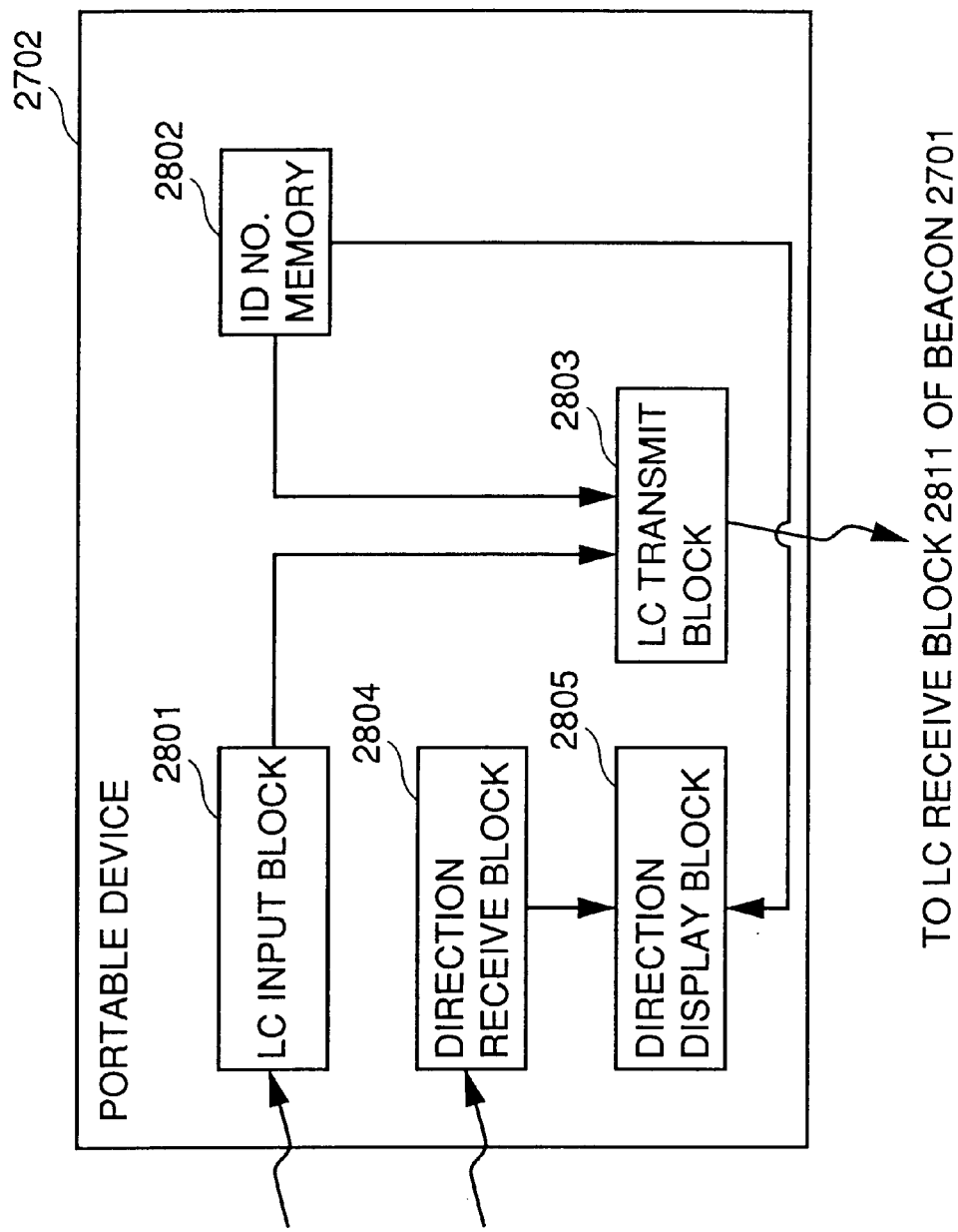
FIG. 44 is a block diagram showing a configuration of a portable device 2702.

Referring to FIG. 44, portable device 2702 includes an LC input block 2801 used by a user to input the name of the bank of interest, an ID number memory 2802 storing an ID number of portable device 2702, and an LC transmit block 2803 connected to LC input block 2801 and ID number memory 2802 to externally transmit the name of the bank of interest and an ID number.

Portable device 2702 also includes a direction receive block 2804 receiving from beacon 2701 a direction to an affiliate bank and an ID number, and a direction display block 2805 connected to direction receive block 2804 and ID number memory 2802 to display a direction received together with an ID number received by direction receive block 2804 if the ID number received by direction receive block 2804 matches an ID number stored in ID number memory 2802.

Figure 45:
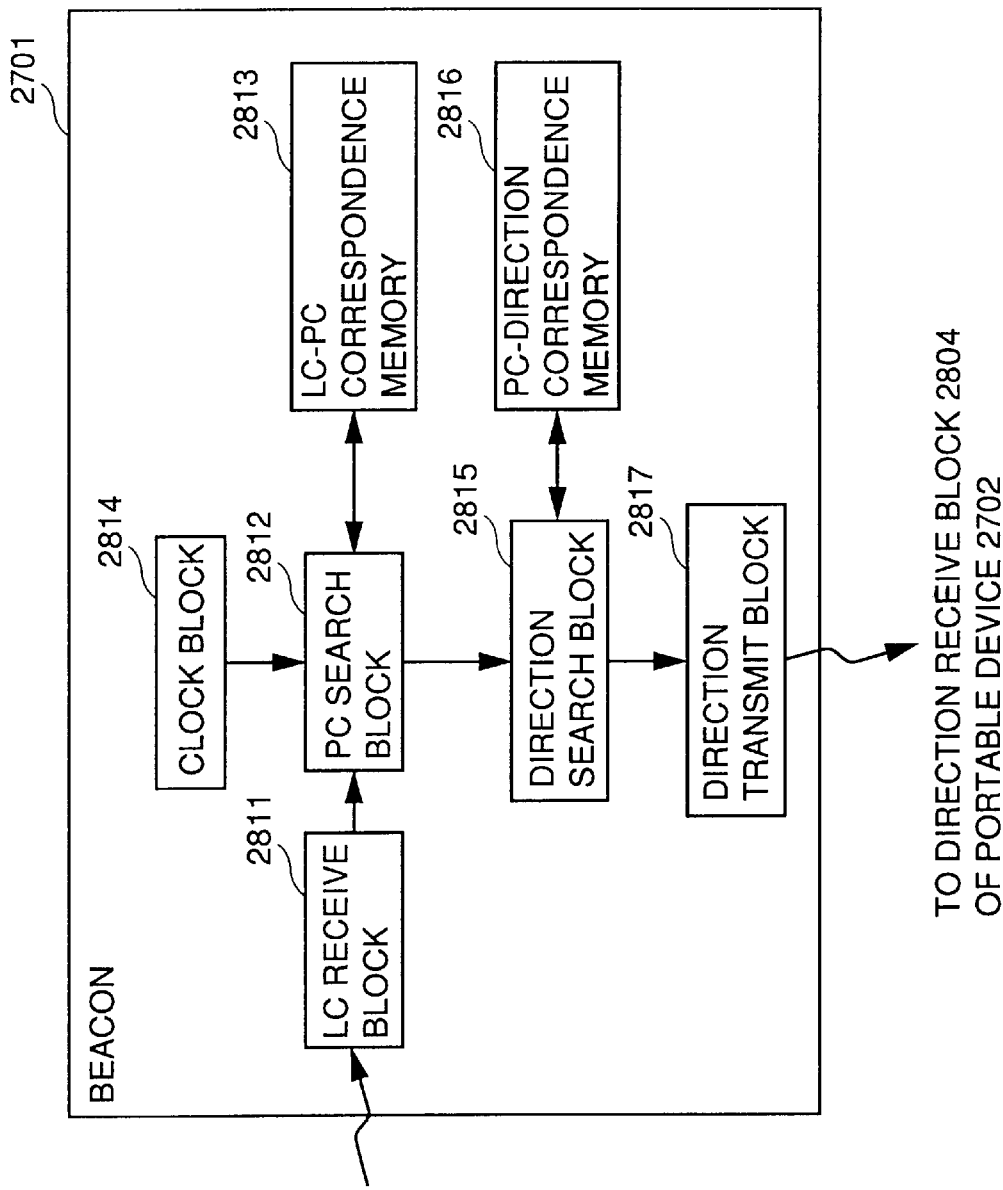
FIG. 45 is a block diagram showing a configuration of a beacon 2701.

Referring to FIG. 45, beacon 2701 includes an LC receive block 2811 receiving from portable device 2702 the name of the bank of interest and an ID number, a clock block 2814 outputting the current time, an LC-PC correspondence memory 2813 storing an association between the name of the bank of interest, the name of an affiliate bank and the business hours of the affiliate bank, and a PC search block 2812 connected to LC receive block 2811, clock block 2814 and LC-PC correspondence memory 2813 to refer to the name of the bank of interest and the current time and thus search for the name of an affiliate bank open for business and output it together with an ID number.

Beacon 2701 also includes a PC-direction correspondence memory 2816 storing the name of an affiliate bank and a direction to the affiliate bank, a direction search block 2815 connected to PC search block 2812 and PC-direction correspondence memory 2816 to refer to an affiliate bank's name output from PC search block 2812 and thus search PC-direction correspondence memory 2816 for a direction to the affiliate bank and output a retrieved direction together with an ID number received from PC search block 2812, and a direction transmit block 2817 connected to direction search block 2815 to externally transmit a direction and an ID number.

Referring to FIG. 46, LC-PC correspondence memory 2813, as has been described above, stores an association between the name of the bank of interest, the name of an affiliate bank, and the business hours of the affiliate bank. For example, it can be seen that the first bank's bank book or cash card can be accepted by an affiliate bank by the name of "32nd bank, Akasaka branch." It can also be seen that the Akasaka branch of the 32nd bank opens for business from nine to five.

Referring to FIG. 47, PC-direction correspondence memory 2816, as has been described above, stores the name of the bank of interest and a direction to an affiliate bank. It can be seen for example that in order to go to the Akasaka branch of the 32nd bank the user should turn right and that in order to the Kita-Akasaka branch of the eighth bank the user should go straight ahead.

The information service system according to the present embodiment is used for example as described below. A user, holding portable device 2702 in front of beacon 2701 installed at an intersection or the like, inputs the name of the bank of interest to LC input block 2801. Then, portable device 2702 and beacon 2701 communicate with each other and portable device 2702 displays on direction display block 2805 a direction to an affiliate bank. Since multiple beacons 2701 are installed on roads, each at a different location, portable device 2702 displays an updated direction whenever portable device 2702 communicates with a different beacon 2701. The user can proceed in a displayed direction and thus move toward the affiliate bank and reach the affiliate bank.

Figure 48:
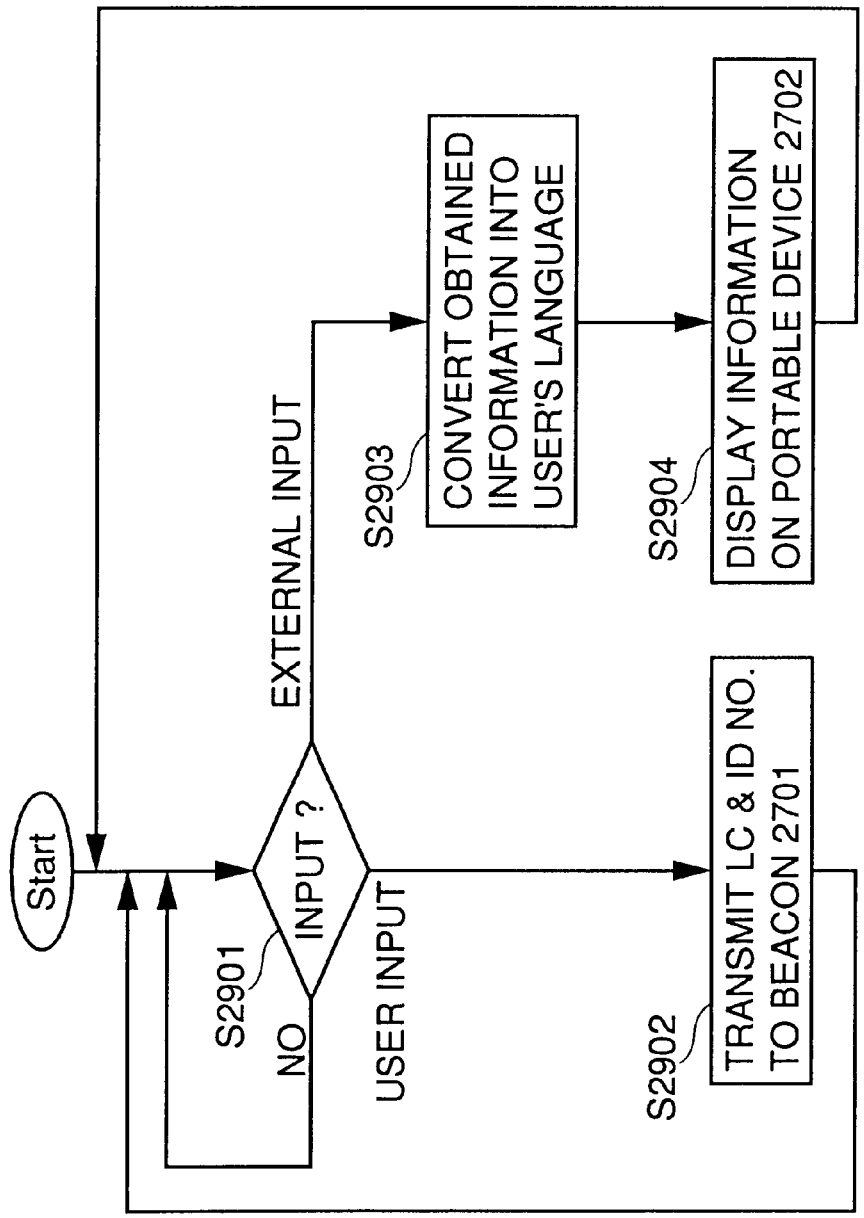
FIG. 48 is a flow chart representing a process performed by portable device 2702.

Referring to FIG. 48, portable device 2702 operates as described below: portable device 2702 waits for data input from a user or beacon 2701 (S2901). If a user inputs data or LC input block 2801 receives the name of the bank of interest (a user input at S2901), then LC transmit block 2803 transmits to beacon 2701 positioned opposite to portable device 2702 the name of the bank of interest and an ID number stored in ID number memory 2802 (S2902).

If via beacon 2701 data is input or direction receive block 2804 receives from beacon 2701 a code for a direction and an ID number (an external input at S2901), then direction receive block 2804 converts the code for the received direction in a predetermined language used by the user and outputs it together with the ID number (S2903). Direction display block 2805 displays the direction if the ID number output from direction receive block 2804 matches an ID number stored in ID number memory 2802 (S2904).

Figure 49:
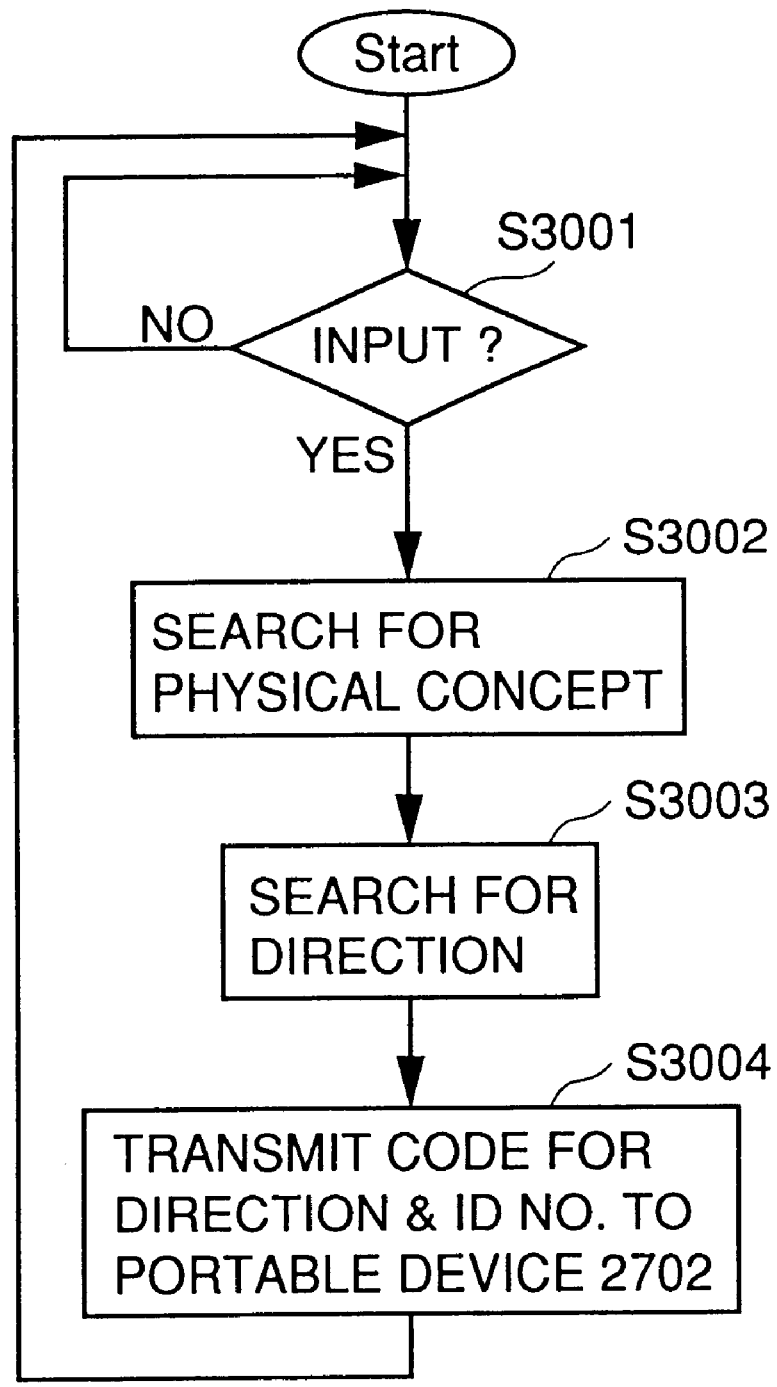
FIG. 49 is a flow chart representing a process performed by beacon 2701.

Referring to FIG. 49, beacon 2701 operates as described below: beacon 2701 waits for data input from portable device 2702 (S3001). When via portable device 2702 data is input or LC receive block 2811 receives the name of the bank of interest and an ID number (YES at S3001), then PC search block 2812 obtains the current time from clock block 2814. PC search block 2812 refers to the name of the bank of interest and the current time to search LC-PC correspondence memory 2813 for the name of an affiliate bank open for business and outputs it together with the ID number (S3002). For example, as shown in FIG. 46, if the bank of interest is the first bank and the current time is 13:20, then the Akasaka branch of the 32nd bank can be used. Thus, PC search block 2812 outputs the name of an affiliate bank "32nd bank, Akasaka branch" together with an ID number. It can also be seen that if the bank of interest is the first bank and the current time is 18:40, then that the Akasaka branch of the 32nd bank is closed. Accordingly LC-PC correspondence memory 2813 is searched for another affiliate bank.

Direction search block 2815 searches PC-direction memory 2816 for a direction to an affiliate bank and outputs a retrieved direction together with an ID number (S3003). For example, as shown in FIG. 47, if the bank of interest is the Akasaka branch of the 32nd bank, then the bank's direction is a rightward direction and direction search block 2815 thus outputs a code for "right" together with the ID number. Direction transmit block 2817 transmits to portable device 2702 the code for the direction and the ID number (S3004).

If a new bank starts business or a new ATM is installed or their business hours are changed, a content stored in LC-PC correspondence memory 2813 and that stored in PC-direction correspondence memory 2816 must be changed. Such contents stored in correspondence memories 2813 and 2816 are changed via a central control system (not shown) connected to beacon 2701 via a network.

If a user opens a new bank account or closes a bank account, in portable device 2702 at LC input block 2801 the name of a bank that can be input must be changed. Such procedure of changing the name of a bank may be dealt with at a counter of the bank. Alternatively, a user may receive changed information by electric mail via a personal computer (not shown) connected to portable device 2702 to change the name of a bank selectable via LC input block 2801.

It should be noted that while in the above description beacon 2701 performs the physical concept and direction search processes, the central control system connected to beacon 2701 may alternatively perform such processes.

In the information service system as described above, if a user does not know the location of an affiliate bank, the user is only required to input the name of the bank of interest to obtain a direction to the affiliate bank and thus efficiently reach the affiliate bank.

Furthermore, the portable device capable of displaying information in a manner switchable depending on the user, such as in languages switchable used to display the information, can have enhanced operability.

Furthermore, the LC-PC correspondence memory and the PC search block can be provided internal to the beacon and the LC-PC correspondence memory can store an association between a logical concept and a physical concept that can be rewritten by a central control system externally connected. Thus, such association can be efficiently rewritten.

Furthermore, the portable device does not include the LC-PC correspondence memory or the PC search block and the portable device simply transmits a logical concept input by a user together with an ID number and displays received data. As such, the portable device can be miniaturized and thus be convenient to hold.

Furthermore, used in the VICS, the system can guide a user not only in a limited range of area but also in a wide range of area.

Eighth Embodiment

Figure 50:
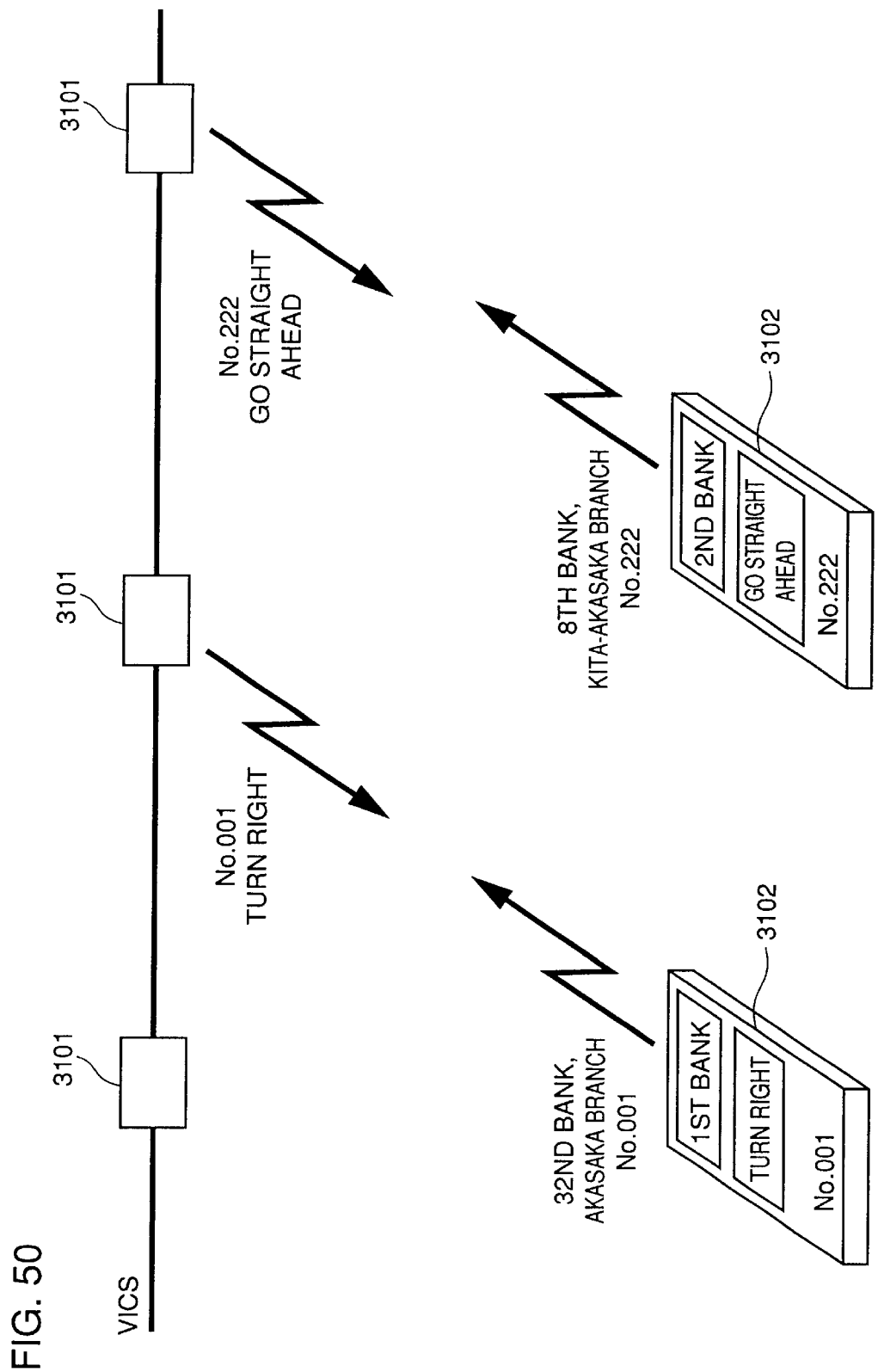
FIG. 50 shows an appearance of an information service system according to an eighth embodiment of the present invention.

Referring to FIG. 50, an information service system according to an eighth embodiment includes: a user-portable device 3102 which, when receiving the name of the bank of interest (a logical concept), transmits to a beacon 3101 (described later) the name of an affiliate bank (a physical concept, together with an ID number of the portable device 3102, receives from beacon 3101 a direction to the affiliate bank and displays the direction to the affiliate bank; and a plurality of beacons 3101 used in the VICS, installed on roads, each receiving from portable device 3102 the name of an affiliate bank and an ID number and transmitting to portable device 2702 a direction to the affiliate bank.

Portable device 3102 displays information in a language as desired by the user. Accordingly, a direction to a physical concept and a logical concept are adapted to be represented by codes common throughout the world. Such codes are similar to those described with reference to FIGS. 2 and 3 and will thus not be described in detail.

Figure 51:
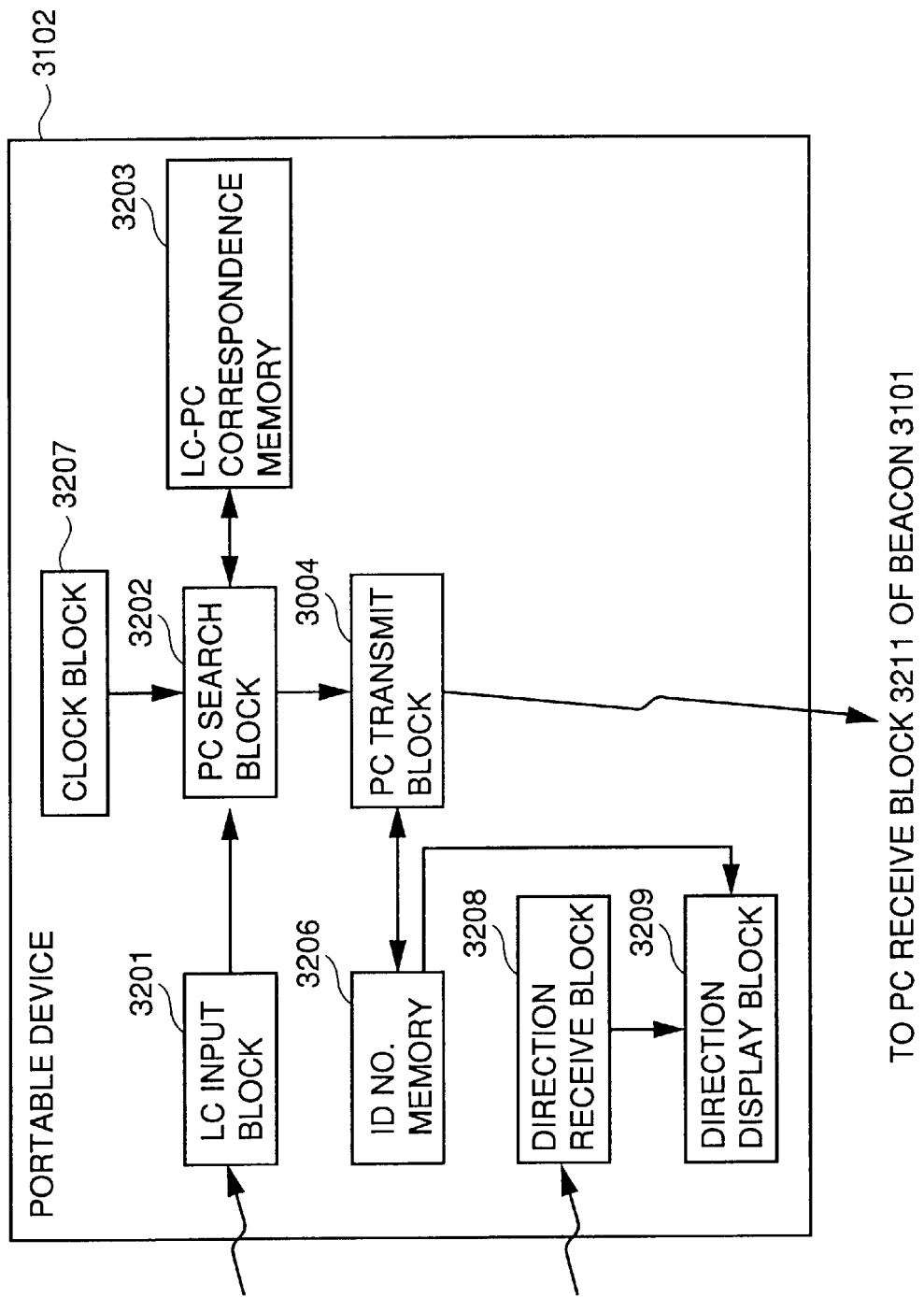
FIG. 51 is a block diagram showing a configuration of a portable device 3102.

Referring to FIG. 51, portable device 3102 includes an LC input block 3201 used by a user to input the name of the bank of interest, a clock block 3207 outputting the current time, an LC-PC correspondence memory 3203 storing an association between the name of the bank of interest, the name of an affiliate bank and the business hours of the affiliate bank, a PC search block 3202 connected to LC input block 3201, clock block 3207 and LC-PC correspondence memory 3203 to search LC-PC correspondence memory 3203 for the name of an affiliate bank depending on the name of the bank of interest and the current time and output the name of an affiliate bank retrieved, and an ID number memory 3206 storing an ID number of portable device 3102, and an LC transmit block 3204 connected to PC search block 3202 and ID number memory 3206 to transmit to beacon 3101 the name of an affiliate bank and an ID number.

Portable device 3102 also includes a direction receive block 3208 receiving from beacon 3101 a direction to an affiliate bank and an ID number, and a direction display block 3209 connected to direction receive block 3208 and ID number memory 3206 to display a direction received simultaneously with an ID number received by direction receive block 3208 when the ID number received by direction receive block 3208 matches and ID number stored in ID number memory 3206.

Figure 52:
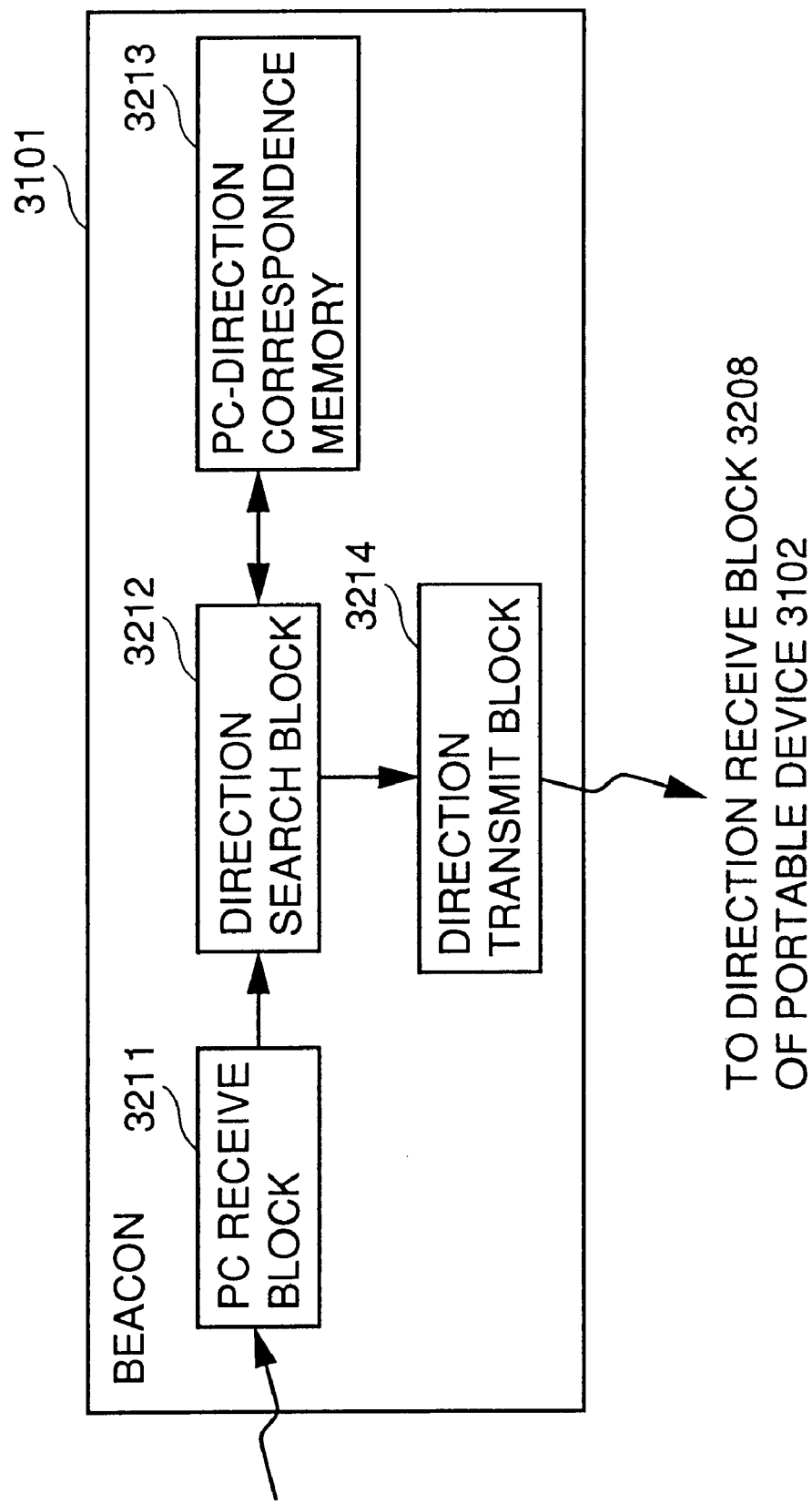
FIG. 52 is a block diagram showing a configuration of a beacon 3101.

Referring to FIG. 52, beacon 3101 includes a PC receive block 3211 receiving from portable device 3102 the name of an affiliate bank and an ID number, PC-direction correspondence memory 3213 storing the name of an affiliate bank and a direction to the affiliate bank, a direction search block 3212 connected to PC receive block 3211 and PC-direction correspondence memory 3213 to refer to the name of an affiliate bank received by PC receive block 3211 to search PC-direction correspondence memory 3213 for a direction to the affiliate bank and output a retrieved direction to the affiliate bank together with an ID number received by PC receive block 3211, and a direction transmit block 3214 connected to direction search block 3211 to externally transmit a direction to an affiliate bank and an ID number.

LC-PC correspondence memory 3203 stores an association between the name of the bank of interest, the name of an affiliate bank and the business hours of the affiliate bank that is similar to the association described with reference to FIG. 46. As such, such association will not be described in detail.

PC-direction correspondence memory 3213 stores the name of an affiliate bank and a direction to the affiliate bank that are similar to those described with reference to FIG. 47. As such, they will not be described in detail.

The information service system according to the present embodiment is used for example as described below. A user holds portable device 3102 in front of beacon 3101 installed, e.g., at an intersection and inputs the name of the bank of interest to LC input block 3201. Then, portable device 3102 and beacon 3101 communicate with each other, and in portable device 3102 on direction display block 3209 a direction to an affiliate bank is displayed. Since multiple beacon 3101 are installed on roads at different locations, the portable device's direction display block 3209 displays a direction updated whenever the portable device communicates with a different beacon 3101. Thus the user can proceed in a displayed direction to move to and thus reach an affiliate bank.

Figure 53:
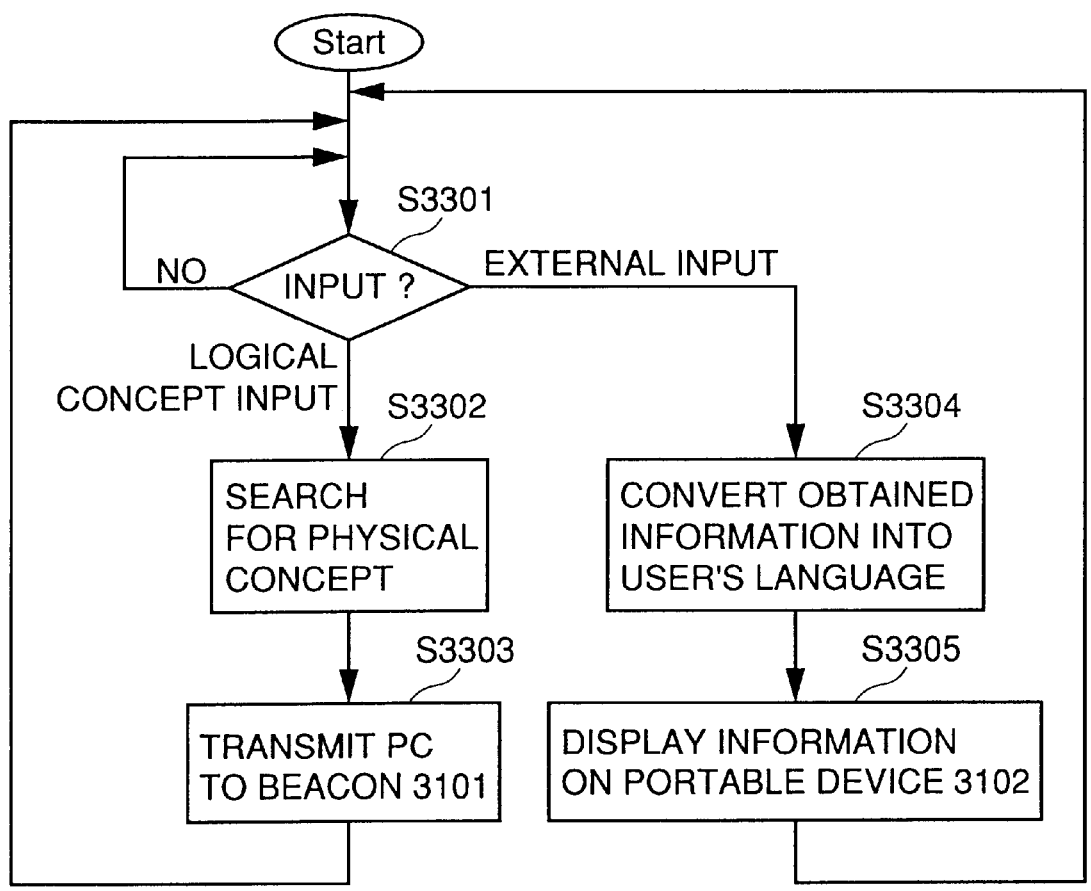
FIG. 53 is a flow chart representing a process performed by portable device 3102.

Referring to FIG. 53, portable device 3102 operates as described below: portable device 3102 waits for data input by a user or from beacon 3101 (S3301). If a user inputs data or LC input block 3201 receives the name of the bank of interest (a logical concept at S3301), then PC search block 3202 obtains the current time from clock block 3207. PC search block 3202 refers to the name of the bank of interest and the current time to search LC-PC correspondence memory 3203 for the name of an affiliate bank open for business and output the name of an affiliate bank retrieved (S3302). For example, as shown in FIG. 46, if the bank of interest is the first bank and the current time is 13:20, then the Akasaka branch of the 32nd bank is open for business. Thus, PC search block 3202 outputs the name of an affiliate bank "32nd bank, Akasaka branch." If the bank of interest is the first bank and the current time is 18:40 then the Akasaka branch of the 32nd bank is already closed. Accordingly, LC-PC correspondence memory 3203 is searched for another affiliate bank.

LC transmit block 3204 receives the name of an affiliate bank output from PC search block 3202 and transmits the name of the affiliate bank to beacon 3101 together with an ID number stored in ID number memory 3206 (S3303).

If via beacon 3101 data is input or direction receive block 3208 receives from beacon 3101 a code for a direction and an ID number (an external input from S3301) then direction receive block 3208 converts the received code for a direction in a predetermined language used by the user and outputs it together with the ID number (S3304). Direction display block 3209 displays the direction if the ID number output from direction receive block matches an ID number stored in ID number memory 3206 (S3305).

Figure 54:
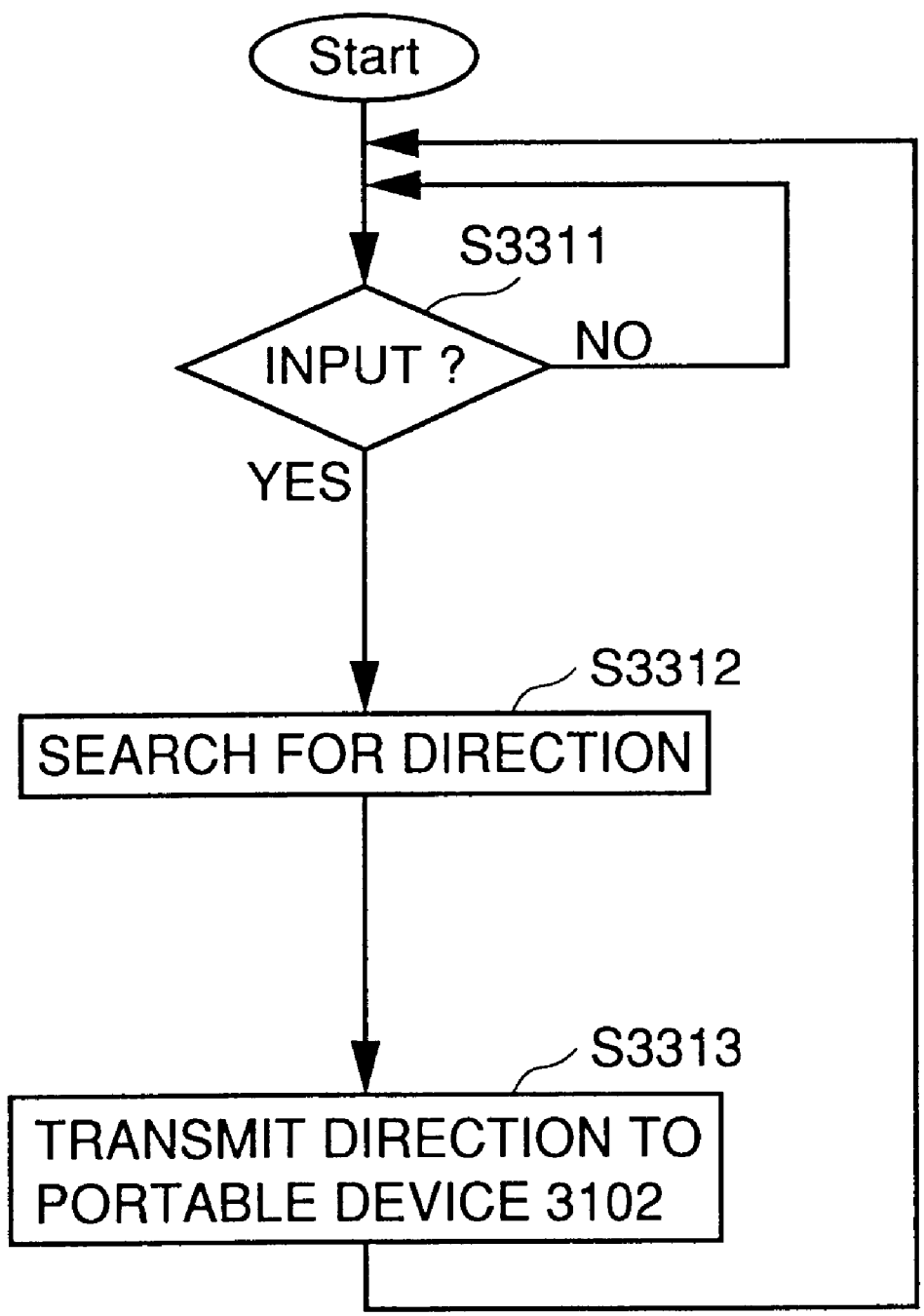
FIG. 54 is a flow chart representing a process performed by beacon 3101.

Referring to FIG. 54, beacon 3101 operates as described below: beacon 3101 waits for data input via portable device 3102 (S3311). When via portable device 3102 data is input or PC receive block 3211 receives the name of an affiliate bank and an ID number (YES at S3311), then direction search block 3212 searches LC-PC correspondence memory 3213 for a direction to the affiliate bank and outputs a retrieved direction together with the ID number (S3312). For example, as shown in FIG. 47, for an affiliate bank "32nd bank, Akasaka branch," its direction is a rightward direction. Thus, direction search block 3212 outputs a code for "right" together with an ID number. Direction transmit block 3214 transmits to portable device 3102 the code for the direction together with the ID number (S3313).

If a new bank starts business or a new ATM is installed or their business hours are changed, a content stored in LC-PC correspondence memory 3203 and that stored in PC-direction correspondence memory 3213 must be changed. The content stored in LC-PC correspondence memory 3203 is changed via a central control system (not shown) connected to portable device 3102 through a network, and the content stored in PC-direction correspondence memory 3213 is changed via the central control system connected to beacon 2701 through a network.

If a user opens a new bank account or closes a bank account, in portable device 3102 at LC input block 3201 the name of a bank that can be input must be changed. Such procedure may be dealt with at a counter of the bank. Alternatively, the user may receive changed information by electric mail received via a personal computer (not shown) connected to portable device 3102 to change the name of a bank selectable via LC input block 3201.

It should be noted that while in the above description beacon 2701 provides the direction search process, the central control system connected to beacon 2701 may alternatively provide such process.

In the information service system as described above, if a user does not know the location of an affiliate bank, the user is only required to input the name of the bank of interest to obtain a direction to the affiliate bank and thus efficiently reach the affiliate bank.

Furthermore, the portable device capable of displaying information in a manner switchable depending on the user, such as in languages switchable used to display the information, can have enhanced operability.

Furthermore, used in the VICS, the system can guide a user not only in a limited range of area but also in a wide range of area.

Ninth Embodiment

Figure 55:
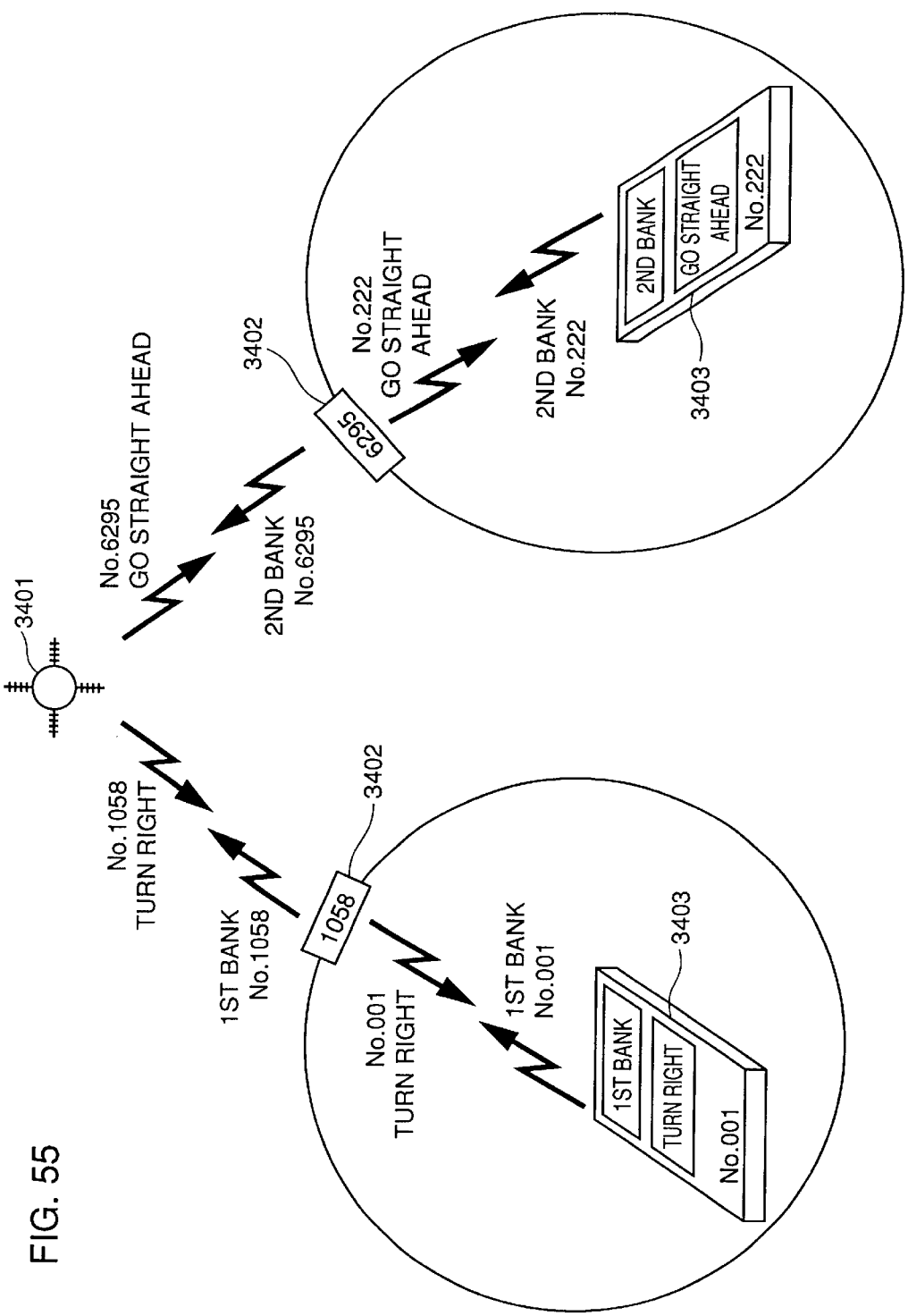
FIG. 55 shows an appearance of an information service system according to a ninth embodiment of the present invention.

Referring to FIG. 55, an information service system according to a ninth embodiment includes a user-portable device 3403 which transmits the name of the bank of interest (a logical concept) together with an ID number of the portable device 3403 to a cellular station 3402 (described later), receives from cellular station 3402 a direction to an affiliate bank (a physical concept) and displays the received direction, and cellular station 3402 which receives from portable device 3403 the name of the bank of interest and an ID number of portable device 3403, transmits the name of the bank of interest and an ID number of cellular station 3402 to an artificial satellite 3401 (described later), receives from satellite 3401 a direction to an affiliate bank and transmits to portable device 3403 the direction and the ID number of portable device 3403, wherein multiple such cellular stations 3402 are provided on roads at different locations.

The information service system also includes artificial satellite 3401 receiving from cellular station 3402 the name of the bank of interest and an ID number of cellular station 3402, searching for the name of an affiliate bank depending on the name of the bank of interest and the current time, and transmitting to cellular station 3402 a direction to the affiliate bank.

Portable device 3403 displays information in a language desired by a user. Accordingly, a direction to a physical concept and a logical concept are each represented by a code common throughout the world. Such codes are similar to those described with reference to FIGS. 2 and 3 and will thus not be described in detail.

Portable device 3403 is similar in hardware configuration to portable device 2702 according to the seventh embodiment described with reference to FIG. 44 and will thus not be described in detail.

Figure 56:
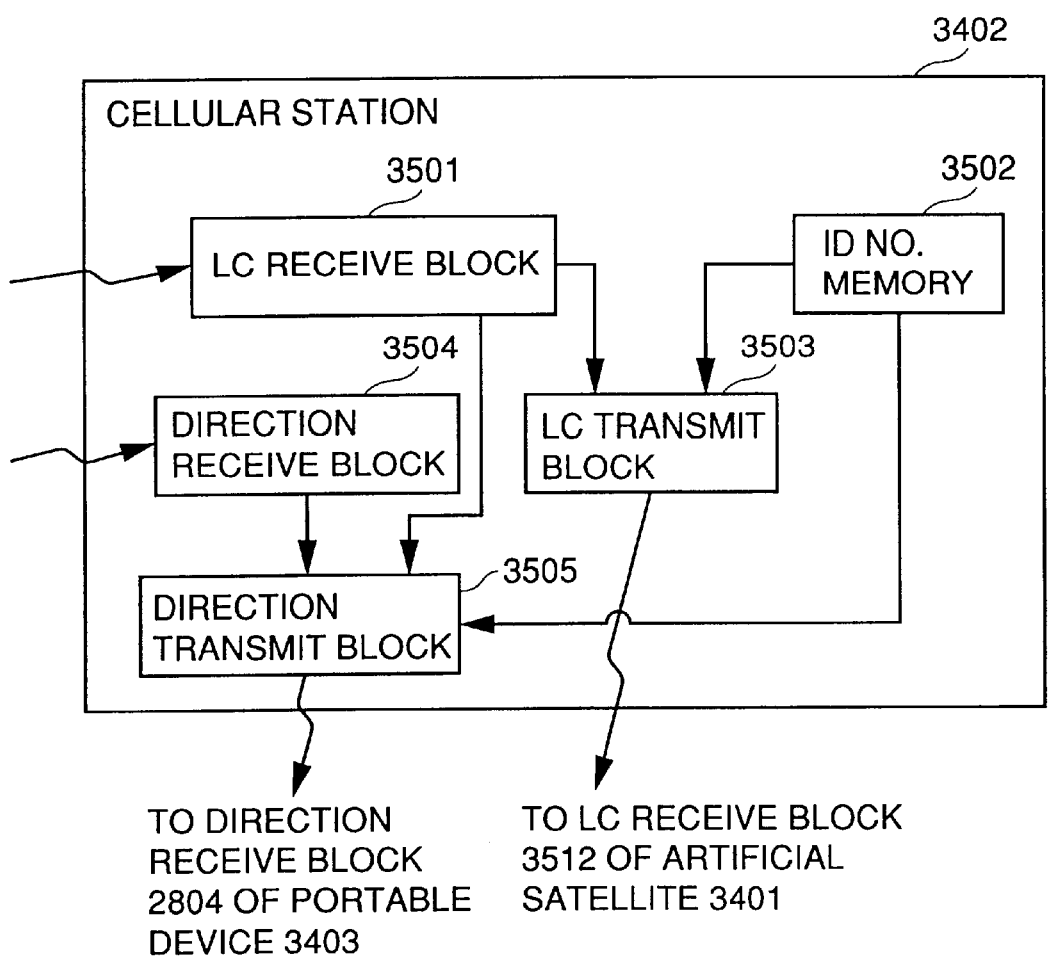
FIG. 56 is a block diagram showing a configuration of a cellular station 3402.

Referring to FIG. 56, cellular station 3402 includes an LC receive block 3501 receiving from portable device 3403 the name of the bank of interest and an ID number of portable device 3403, and an ID number memory 3502 storing an ID number of cellular station 3402, and an LC transmit block 3503 connected to LC receive block 3501 and ID number memory 3502 to externally transmit the name of the bank of interest and an ID number of cellular station 3402.

Cellular station 3402 also includes a direction receive block 3504 receiving from artificial satellite 3401 a code for a direction to an affiliate bank and an ID number of cellular station 3402, and a direction transmit block 3505 connected to LC receive block 3501, ID number memory 3502 and direction receive block 3504 to externally transmit a code for a direction to an affiliate bank together with an ID number of portable device 3403 received by LC receive block 3501 when an ID number of cellular station 3402 received from satellite 3401 matches an ID number stored in ID number memory 3502.

Figure 57:
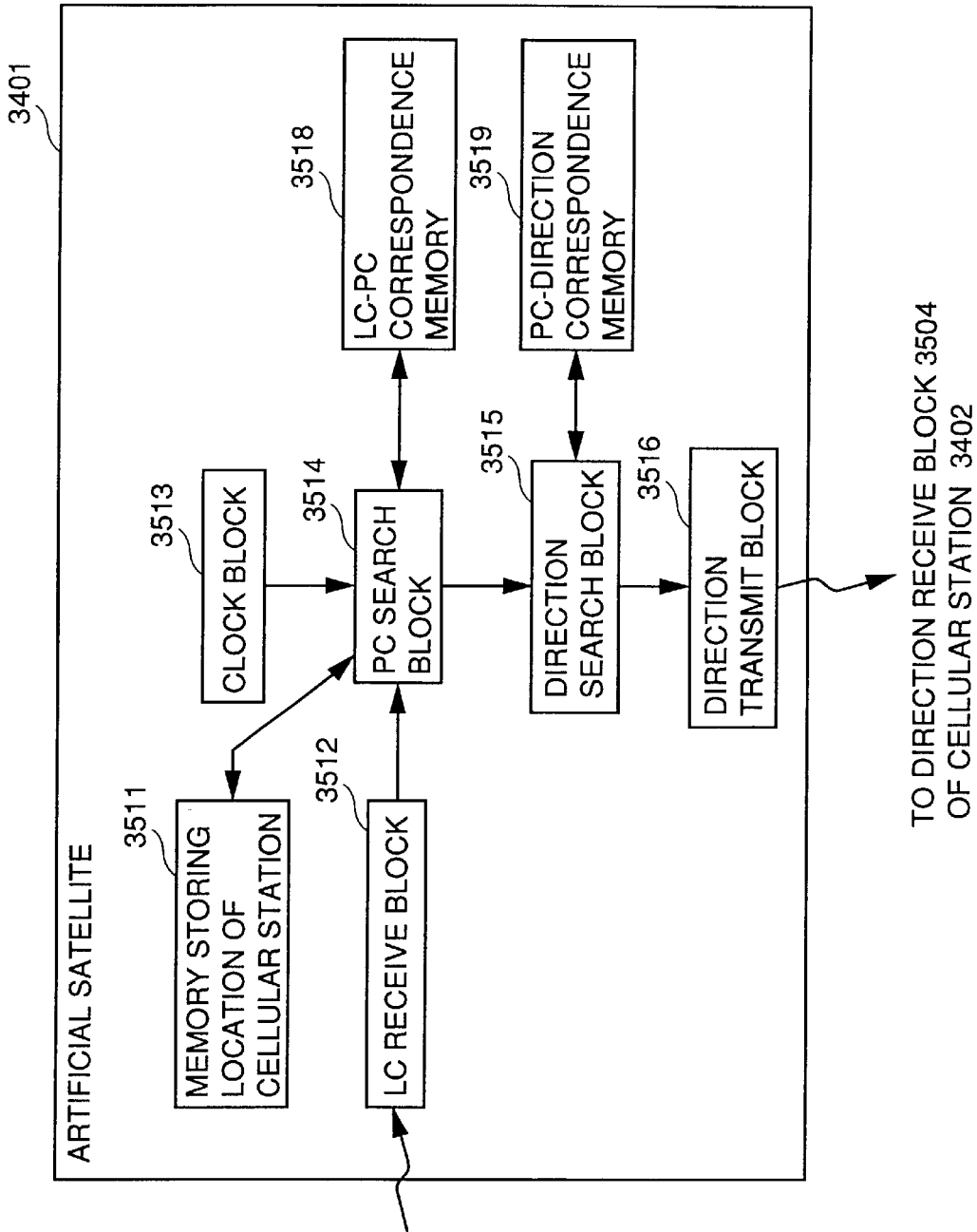
FIG. 57 is a block diagram showing a configuration of an artificial satellite 3401.

Referring to FIG. 57, artificial satellite 3401 includes an LC receive block 3512 receiving from cellular station 3402 the name of the bank of interest and an ID number of cellular station 3402, a clock block 3513 outputting the current time, a memory storing a cellular station's location 3511 storing an association between an ID number of cellular station 3402 and the exact location of cellular station 3402, and an LC-PC correspondence memory 3518 storing an association between the name of the bank of interest and the name, location and business hours of a bank affiliated with the bank of interest.

Artificial satellite 3401 also includes a PC search block 3514 connected to LC receive block 3512, clock block 3513, memory storing a cellular station's location 3511 and LC-PC correspondence memory 3518 to obtain from memory 3511 the location of cellular station 3402 depending on an ID number of cellular station 3402, search LC-PC correspondence memory 3518 for an affiliate bank open for business and closest to cellular station 3402 depending on the location of cellular station 3402 and the current time, and output the name of the affiliate bank and the ID number of cellular station 3402.

Artificial satellite 3401 also includes a PC-direction correspondence memory 3519 storing the name of an affiliate bank and a direction to the affiliate bank, a direction search block 3515 connected to PC search block 3514 and PC-direction correspondence memory 3519 to refer to the name of an affiliate bank output from PC search block 3514 to search PC-direction correspondence memory 3519 for a direction to the affiliate bank and output a retrieved direction to the affiliate bank together with an ID number of cellular station 3402, and a direction transmit block 3516 connected to direction search block 3515 to externally transmit a direction and an ID number of cellular station 3402.

Referring to FIG. 58, memory 3511, as has been described above, stores an ID number of cellular station 3402 and the exact location of cellular station 3402. For example, it can be seen that cellular station 3402 with an ID number "1058" is located at "45 degree of north latitude and 30 degree of east longitude."

Referring to FIG. 59, LC-PC correspondence memory 3518, as has been described above, stores an association between the name, location and business hours of an affiliated bank and the name of the bank of interest that ties up with the affiliate bank. For example, it can be seen that an affiliate bank "32nd bank, Akasaka branch" is located at 46 degree of north latitude and 31 degree of east longitude and that its business hours are nine to five. It can also be seen that the first bank, the sixth bank and the 32nd bank tie up with the Akasaka branch of the 32nd bank.

PC-direction correspondence memory 3519 stores an affiliate bank's name and direction similar to that described with reference to FIG. 47. As such it will not be described in detail.

The information service system according to the present embodiment is used for example as described below. A user carrying portable device 3403 with him or her inputs the name of the bank of interest to LC input block 2801. Then, portable device 3403, cellular station 3402 closest to portable device 3403 and artificial satellite 3401 communicate with each other and in portable device 3403 on direction display block 2805 a direction to an affiliate bank is displayed. Since multiple cellular stations 3402 are provided on roads at different locations, whenever portable device 3403 communicates with a different cellular station 3402 it displays an updated direction. The user can proceed in a displayed direction and thus reach the affiliate bank.

The portable device 3403 operation is similar to the portable device 2702 operation according to the seventh embodiment described with reference to FIG. 48. Thus it will not be described in detail.

Figure 60:
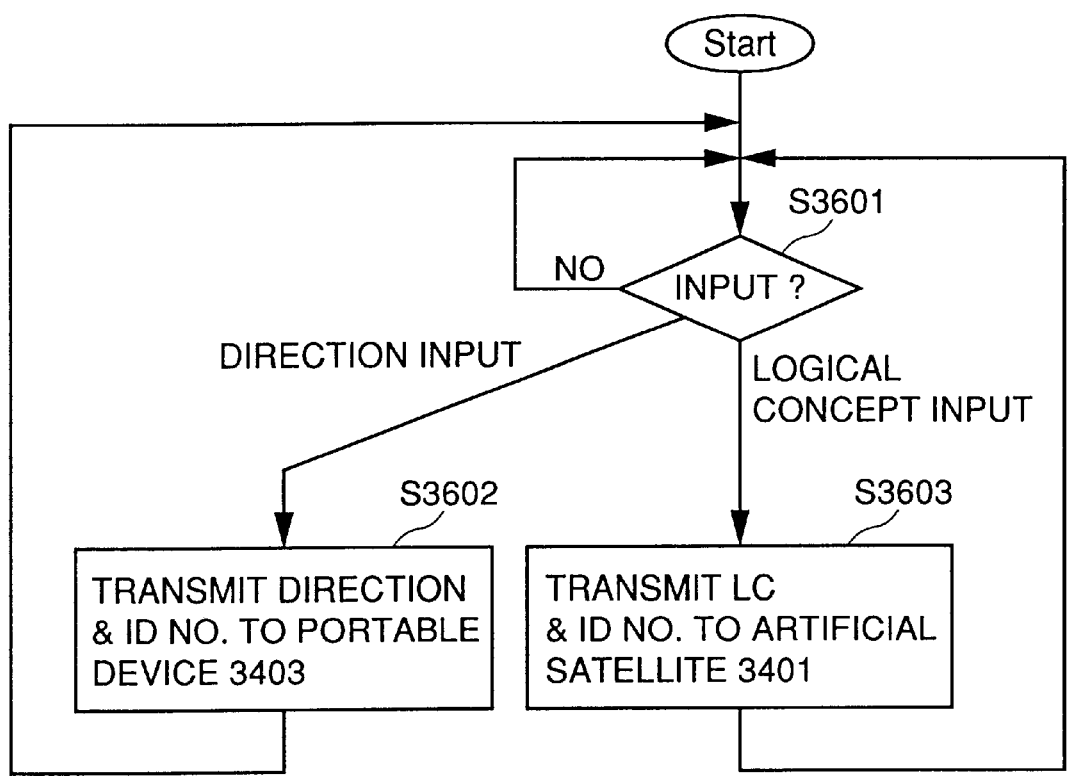
FIG. 60 is a flow chart representing a process performed by cellular station 3402.

Referring to FIG. 60, cellular station 3402 operates as described below: cellular station 3402 waits for data input from portable device 3403 or artificial satellite 3401 (S3601). If via portable device 3403 data is input or LC receive block 3501 receives from portable device 3403 the name of the bank of interest and an ID number of portable device 3403 (a logical concept at S3601), then LC transmit block 3503 transmits to satellite 3401 the received name of the bank of interest together with an ID number stored in ID number memory 3502 (S3603).

If via artificial satellite 3401 data is input or direction receive block 3504 receives from satellite 3401 a direction to an affiliate bank and an ID number of cellular station 3402 (a direction at S3601) and an ID number of cellular station 3402 received from satellite 3401 matches an ID number stored in ID number memory 3502, then direction transmit block 3505 transmits to portable device 3403 a code for the direction to the affiliate bank together with the ID number of portable device 3403 received by LC receive block 3501 (S3602).

Figure 61:
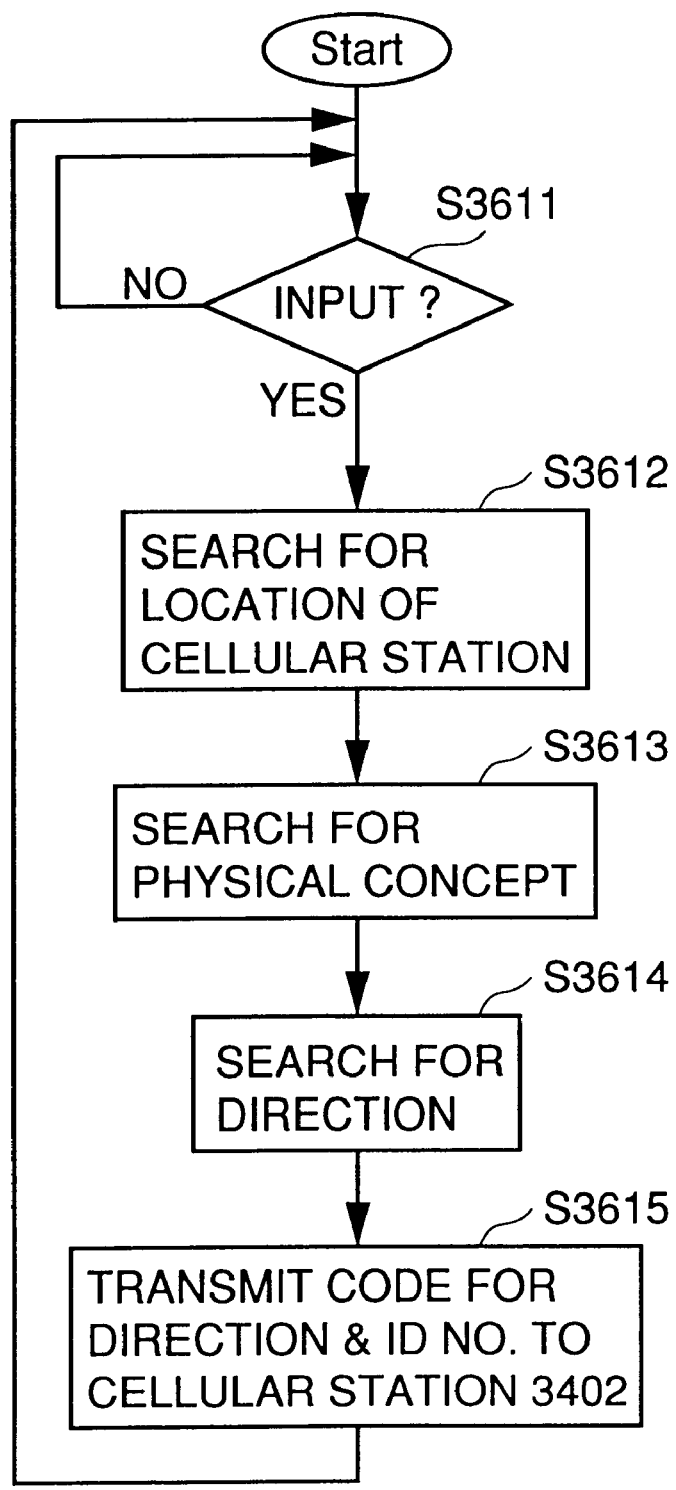
FIG. 61 is a flow chart representing a process performed by artificial satellite 3401.

Referring to FIG. 61, artificial satellite 3401 operates as described below: satellite 3401 waits for data input from cellular station 3402 (S3611). When via cellular station 3402 data is input or LC receive block 3512 receives the name of the bank of interest and an ID number of cellular station 3402 (YES at S3611), then PC search block 3514 refers to the received ID number of satellite 3401 and thus searches memory 3511 for the location of cellular station 3402 (S3611). For example, as shown in FIG. 58, if cellular station 3402 has an ID number "1058" then data "45 degree of north latitude and 30 degree of east longitude" is output as the location of cellular station 3402.

PC search block 3514 obtains the current time from clock block 3513. LC receive block 3512 refers to the name of the bank of interest, the location of cellular station 3402 and the current time to search LC-PC correspondence memory 3518 for an affiliate bank currently open for business and closest to cellular station 3402 and output the retrieved name of an affiliate bank together with the ID number of cellular station 3402 (S3613). For example, as shown in FIG. 59, if the bank of interest is the first bank, cellular station 3402 is located at 45 degree of north latitude and 30 degree of east longitude and the current time is 13:20, then the name of a bank "32nd bank, Akasaka branch," which is affiliated with the first bank, closest to 45 degree of north latitude and 30 degree of east longitude and currently open for business, is output together with the ID number of cellular station 3402.

Direction search block 3515 refers to the affiliate bank's name output from PC search block 3514 to search PC-direction correspondence memory 3519 for a direction to the affiliate bank and output a retrieved direction to the affiliate bank together with the ID number of cellular station 3402 (S3614). For example, as shown in FIG. 47, if an affiliate bank has a name "32nd bank, Akasaka branch" then its direction is a rightward direction and direction search block 3515 thus outputs a code for "right" together with the ID number of cellular station 3402.

Direction transmit block 3516 transmits to cellular station 3402 the code for the direction and the ID number of cellular station 3402 (S3615).

If a new bank starts business or a new ATM is installed or their business hours are changed, then a content stored in LC-PC correspondence memory 3518 and that stored in PC-direction correspondence memory 3517 must be changed. The contents stored in correspondence memories 3518 and 3517 are changed via a central control system (not shown) capable of transmitting information to the satellite.

If a user opens a new bank account or closes a bank account, in portable device 3403 at LC input block 2801 the name of a bank that can be input must be changed. Such procedure may be dealt with at a counter of the bank. Alternatively, the user may receive changed information by electric mail via a personal computer (not shown) connected to portable device 3403 to change the name of a bank selectable via LC input block 2801.

In the information service system as described above, if a user does not know the location of an affiliate bank, the user is only required to input the name of the bank of interest to obtain a direction to the affiliate bank and thus efficiently reach the affiliate bank.

Furthermore, the portable device capable of displaying information in a manner switchable depending on the user, such as in languages switchable used to display the information, can have enhanced operability.

Furthermore, LC-PC correspondence memory and the PC search block can be provided internal to an artificial satellite and the LC-PC correspondence memory can store an association between a logical concept and a physical concept that can be rewritten by a central control system externally connected. As such, such association can be efficiently rewritten.

Furthermore, the portable device does not include the LC-PC correspondence memory or the PC search block and only transmits a logical concept input by a user together with an ID number and displays received data. As such, the portable device can be miniaturized and thus convenient to hold.

Furthermore, with an artificial satellite used the system can guide a user not only in a limited range of area but also a wide range of area.

Tenth Embodiment

Figure 62:
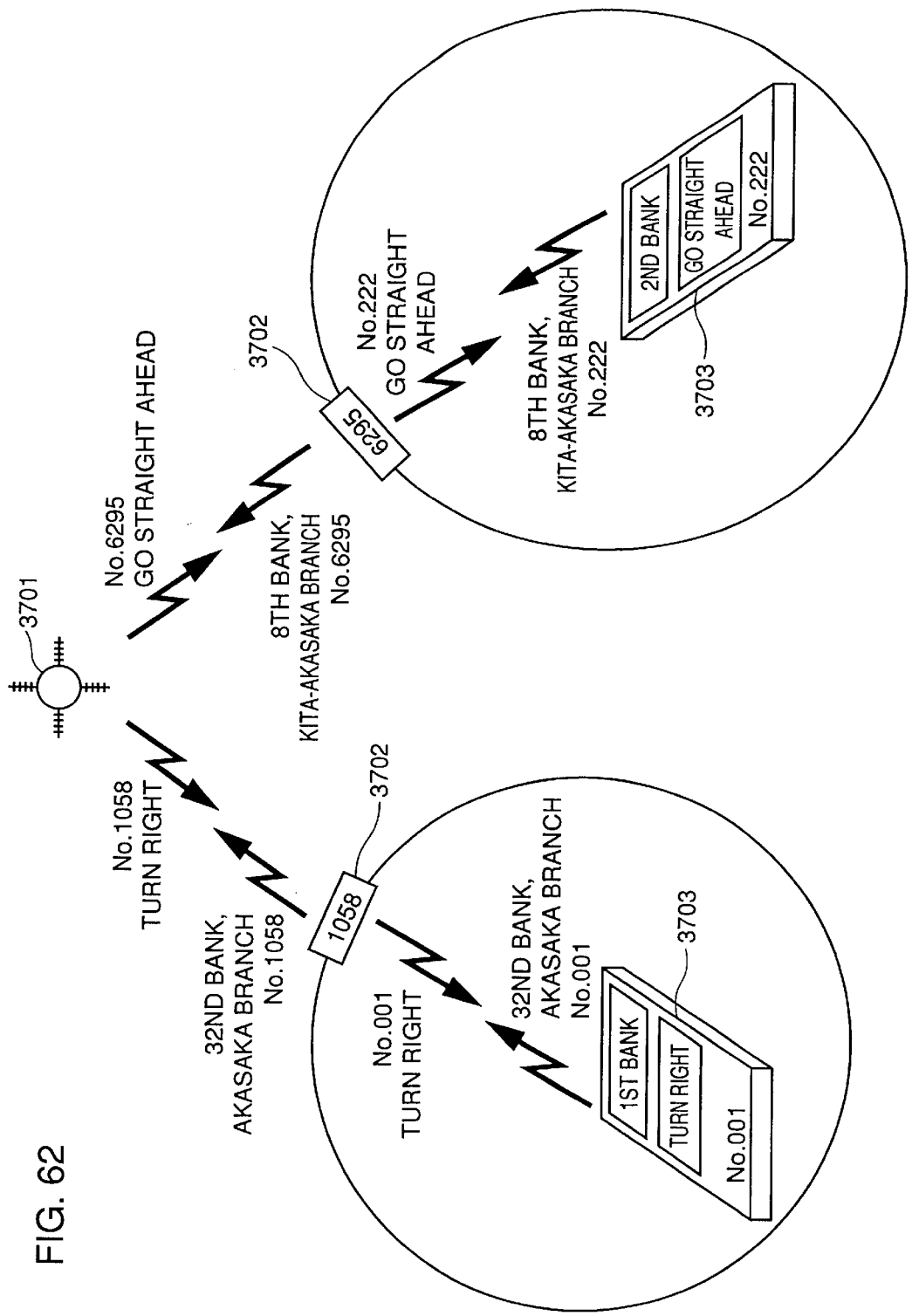
FIG. 62 shows an appearance of an information system according to a tenth embodiment of the present invention.

Referring to FIG. 62, the information service system according to a tenth embodiment includes a user-portable device 3703 which, when receiving the name of the bank of interest (a logical concept), transmits to a cellular station 3702 (described later) the name of a bank affiliated with the bank of interest (a physical concept) together with an ID number of portable device 7303, receives from cellular station 3702 a direction to the affiliate bank and displays the direction to the affiliate bank.

The information service system also includes cellular stations 3702 provided on roads at various locations to receive from portable device 3703 the name of an affiliate bank and an ID number of portable device 3703, transmit the name of the affiliate bank and an ID number of cellular station 3702 to an artificial satellite 3701 described later, receive from satellite 3701 a direction to the affiliate bank, and transmit to portable device 3703 the direction to the affiliate bank and the ID number of portable device 3703, and artificial satellite 3701 receiving from cellular station 3702 the name of an affiliate bank and an ID number of cellular station 3702 and transmitting to cellular station 3702 a direction to the affiliate bank.

Portable device 3703 displays data in a language as desired by the user. Accordingly, a direction to a physical concept and a logical concept are each represented by a code common throughout the world. Such codes are similar to those described with reference to FIGS. 2 and 3 and will thus not be described in detail.

Portable device 3703 is similar in hardware configuration to portable device 3102 according to the eighth embodiment described with reference to FIG. 51 and will thus not be described in detail.

Figure 63:
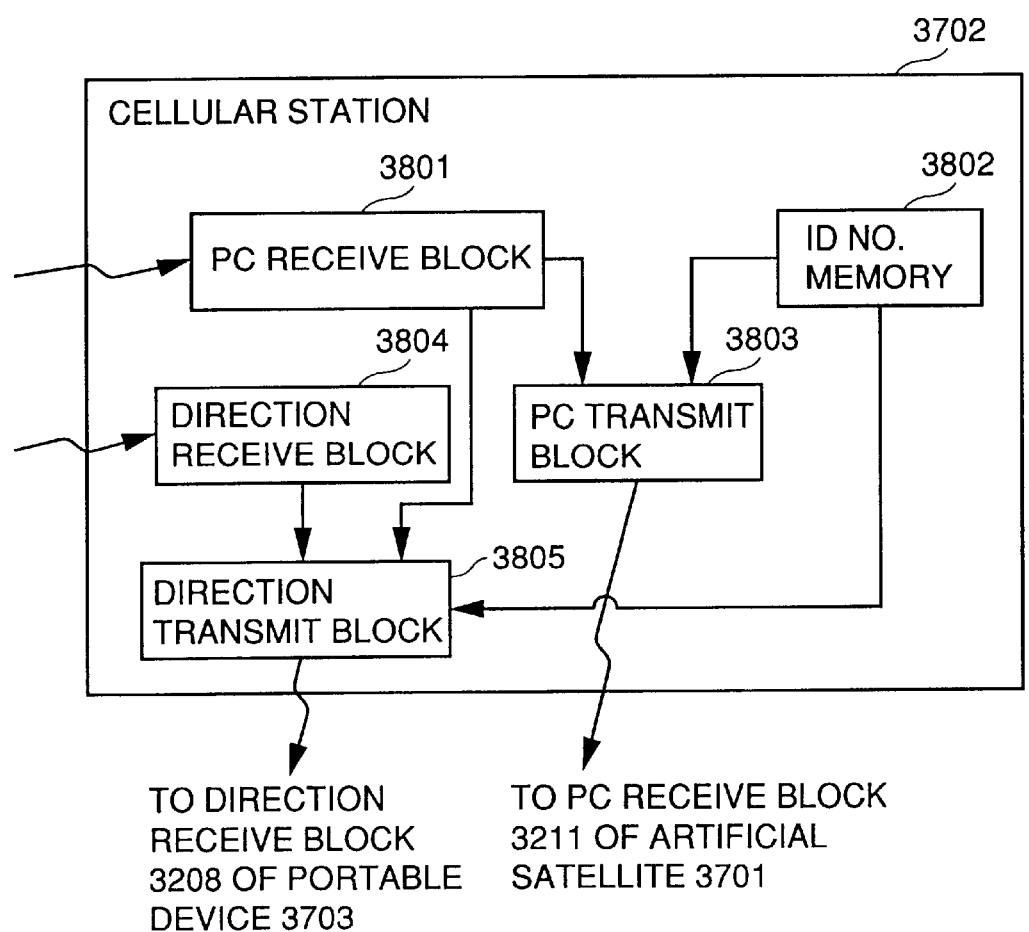
FIG. 63 is a block diagram showing a configuration of a cellular station 3702.

Referring to FIG. 63, cellular station 3702 includes a PC receive block 3801 receiving the name of an affiliate bank and an ID number of portable device 3703, an ID number memory 3802 storing an ID number of cellular station 3702, and a PC transmit block 3803 connected to PC receive block,3801 and ID number memory 3802 to externally transmit the name of an affiliate bank and an ID number of cellular station 3702.

Cellular station 3702 also includes a direction receive block 3804 receiving from artificial satellite 3701 a code for a direction to an affiliate bank and an ID number of cellular station 3702, and a direction transmit block 3805 connected to direction receive block 3804, PC receive block 3801 and ID number memory 3802 to externally transmit a code for a direction to an affiliate bank together with an ID number of portable device 3703 received by PC receive block 3801 if an ID number of cellular station 3702 received from satellite 3701 matches an ID number stored in ID number memory 3802.

Artificial satellite 3701 is similar in hardware configuration to beacon 3101 described with reference to FIG. 52 and will thus not be described in detail.

In portable device 3703 LC-PC correspondence memory 3203 stores an association between the name of the bank of interest, the name of an affiliate bank and the business hours of the affiliate bank that is similar to an association described with reference to FIG. 46. As such, such association will not be described in detail.

Referring to FIG. 64, in artificial satellite 3701 at PC-direction correspondence memory 3203 is stored an association between an ID number of cellular station 3702, the name of an affiliate bank and a direction to the affiliate bank. For example, for cellular station 3702 with an ID number "1058," an affiliate bank "32nd bank, Akasaka branch" is located in a rightward direction.

The information service system according to the present embodiment is used for example as described below. A user carrying portable device 3703 with him or her inputs the name of the bank of interest to LC input block 3201. Then, portable device 3703, cellular station 3702 and artificial satellite 3701 communicate with each other and in portable device 3703 on direction display block 3209 a direction to an affiliate bank is displayed. Since multiple cellular stations 3702 are each provided on a road at a different location, whenever portable device 3703 communicates with a different cellular station 3702 it displays an updated direction. The user can proceed in a displayed direction and thus reach the affiliate bank.

Figure 65:
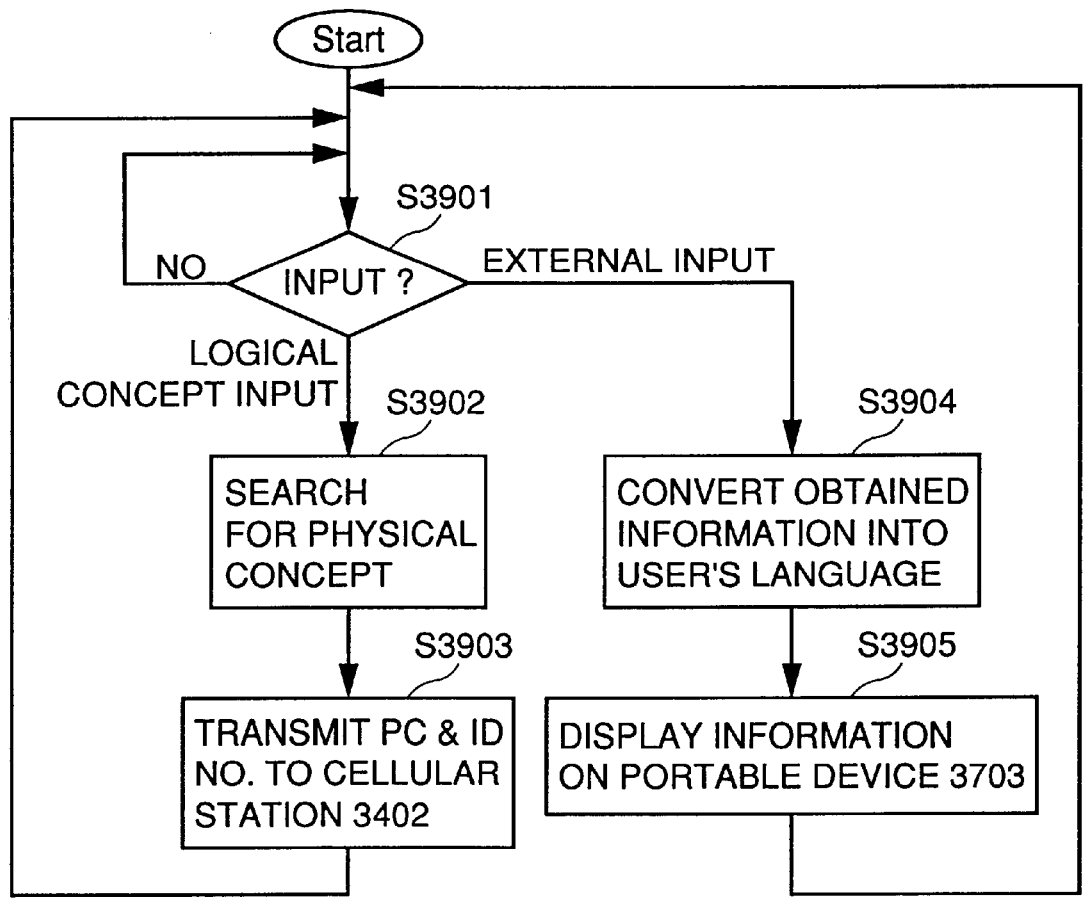
FIG. 65 is a flow chart representing a process performed by a portable device 3703.

Referring to FIG. 65, portable device 3703 operates as described below: portable device 3703 waits for data input by a user or from cellular station 3702 (S3901). If a user inputs data or LC input block 3201 receives the name of the bank of interest (a logical concept at S3901), then PC search block 3202 obtains the current time from clock block 3207. PC search block 3202 refers to the name of the bank of interest and the current time to search LC-PC correspondence memory 3203 for the name of an affiliate bank currently open for business and output the name of such affiliate bank retrieved (S3902).

For example, as shown in FIG. 46, if the bank of interest is the first bank and the current time is 13:20, then the Akasaka branch of the 32nd bank is open for business. Thus, PC search block 3202 outputs the name of the affiliate bank "32nd bank, Akasaka branch." If the bank of interest is the first bank and the current time is 18:40, then the Akasaka branch of the 32nd bank is already closed. Accordingly, LC-PC correspondence memory 3203 is searched for another affiliate bank.

LC transmit block 3204 transmits to cellular station 3702 an affiliate bank's name output from PC search block 3202 together with an ID number stored in ID number memory 3206 (S3903).

If via cellular station 3702 data is input or direction receive block 3208 receives from cellular station 3702 a code for a direction and an ID number of portable device 3703 (an external input at S3901), then direction receive block 3208 converts the received code for the direction in a predetermined language used by the user and outputs it together with the ID number of portable device 3703 (S3904). Direction display block 3209 displays the direction if the ID number of portable device 3704 transmitted from cellular station 3702 matches an ID number stored in ID number memory 3206 (S3905).

Figure 66:
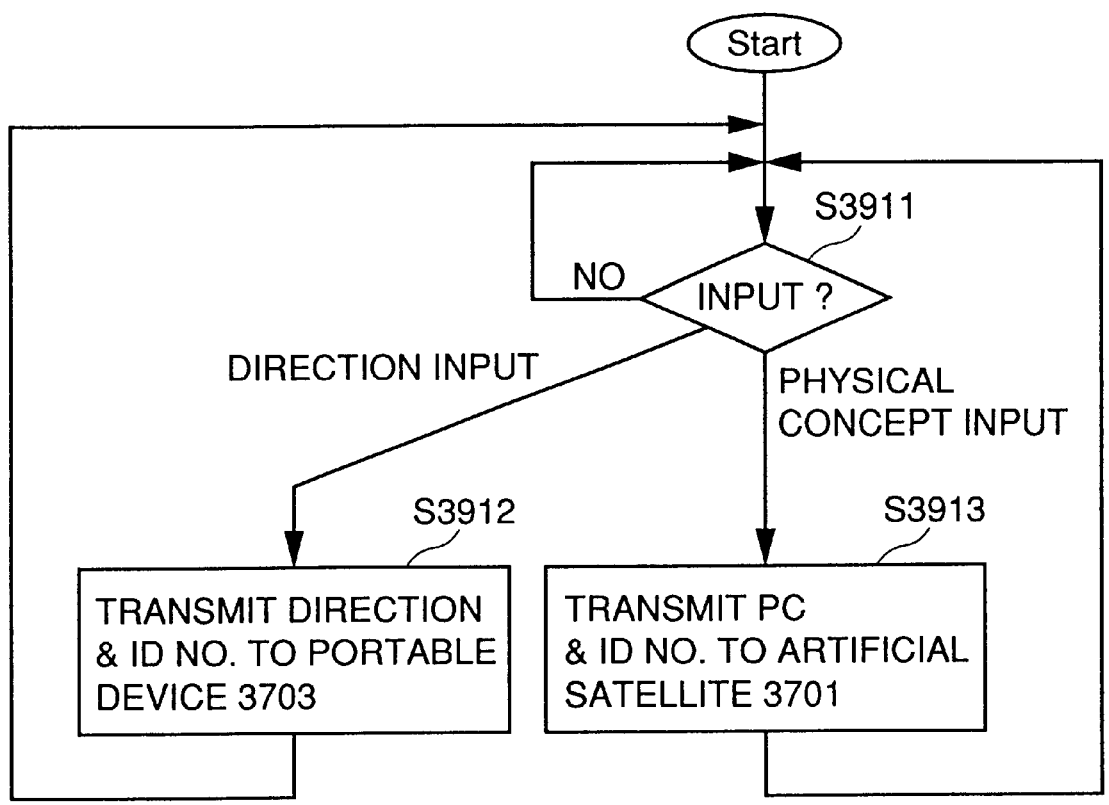
FIG. 66 is a flow chart representing a process performed by cellular station 3702.

Referring to FIG. 66, cellular station 3702 operates as described below: cellular station 3702 waits for data input from portable device 3703 or artificial satellite 3701 (S3911). If via portable device data is input or PC receive block 3801 receives from portable device 3703 the name of an affiliate bank and an ID number of portable device 3703 (a physical concept at S3911), then PC transmit block 3803 transmits to satellite 3701 the received name of the affiliate bank together with an ID number stored in ID number memory 3802 (S3913).

If via artificial satellite 3701 data is input or direction receive block 3804 receives from satellite 3701 a direction to an affiliate bank and an ID number of cellular station 3702 (a direction at S3911) and the ID number of cellular station 3702 received from satellite 3701 matches an ID number stored in ID number memory 3802, then PC transmit block 3803 transmits to portable device 3703 a code for the direction to the affiliate bank together with an ID number of portable device 3703 received by PC receive block 3801 (S3912).

Figure 67:
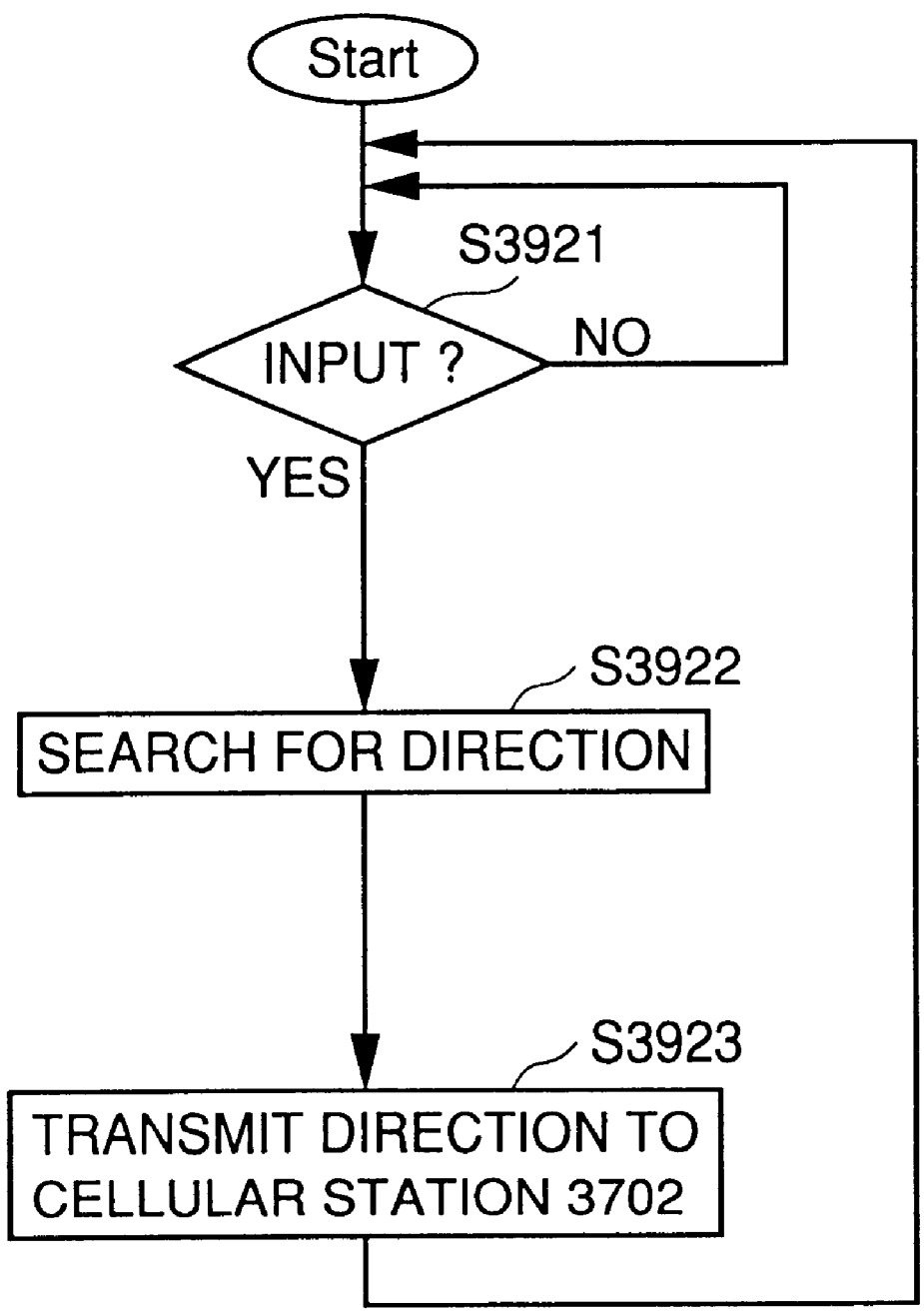
FIG. 67 is a flow chart representing a process performed by artificial satellite 3701.
Figure 68:
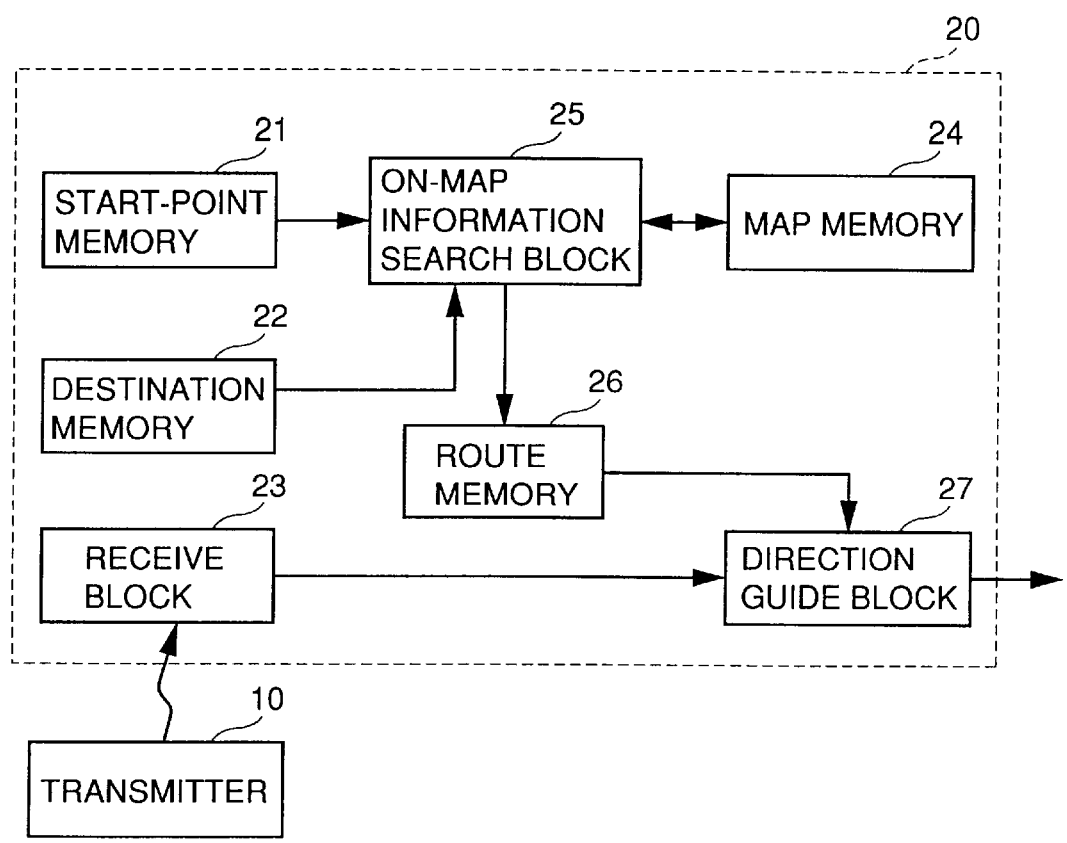
FIG. 68 is a block diagram showing a configuration of a guide system disclosed in Japanese Patent Laying-Open No. 5-189690.

Referring to FIG. 67, artificial satellite 3701 operates as described below: satellite 3701 waits for data input from cellular station 3702 (S3921). When via cellular station 3702 data is input or PC receive block 3211 receives the name of an affiliate bank and an ID number of cellular station 3702 (YES at S3921), then direction search block 3212 refers to the name of the affiliate bank and cellular station 3702 to search PC-direction correspondence memory 3213 for a direction to the affiliate bank and output a retrieved direction to the affiliate bank together with the ID number (S3922). For example, as shown in FIG. 64, if cellular station 3702 has an ID number "1058" and an affiliate bank has a name "32nd bank, Akasaka branch" then as seen from cellular station 3702 with ID number "1058" the affiliate bank is located in a rightward direction.

Direction transmit block 3214 transmits to cellular station 3702 the direction to the affiliate bank and the ID number of cellular station 3702 (S3923).

If a new bank starts business or a new ATM is installed or their business hours are changed, then a content stored in portable device 3703 at LC-PC correspondence memory 3203 and that stored in artificial satellite 3701 at PC-direction correspondence memory 3213 must be changed. The content stored in LC-PC correspondence memory 3203 is changed via a central control system (not shown) connected to portable device 3703 through a network, and that stored in PC-direction correspondence memory 3213 is changed via a central control system capable of transmitting information to artificial satellite 3701.

If a user opens a new bank account or closes a bank account, then in portable device 3703 at LC input block 3201 the name of a bank that can be selectively input must be changed. Such procedure may be dealt with at a counter of the bank. Alternatively, a user may receive changed information by electric mail via a personal computer (not shown) connected to portable device 3703 to change the name of a bank selectable.

In the information service system as described above, if a user does not know the location of an affiliate bank, the user is only required to input the name of the bank of interest to obtain a direction to the affiliate bank and thus efficiently reach the affiliate bank.

Furthermore, the portable device capable of displaying information in a manner switchable depending on the user, such as in languages switchable used to display the information, can have enhanced operability.

Furthermore, with an artificial satellite used the system can guide a user not only in a limited range of area but also a wide range of area.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information service system comprising:
a portable device receiving information contained in a first group and converting the information contained in said first group into information contained in a second group for output; and
an information service device receiving the information contained in said second group and converting the information contained in said second group into information contained in a third group; wherein:
said portable device includes
an input block inputting the information contained in said first group,
a first memory storing an association between the information contained in said first group and the information contained in said second group,
a first conversion block connected to said input block and said first memory to receive the information contained in said first group and refer to the association stored in said first memory to convert the information contained in said first group into the information contained in said second group, and a first transmit block connected to said first conversion block to receive an output of said first conversion block and transmit the output of said first conversion block to said information service device; and said information service device includes
a second memory storing an association between the information contained in said second group and the information contained in said third group,
a first receive block receiving information from said first transmit block, and
a second conversion block connected to said first receive block and said second memory to receive an output of said first receive block and refer to the association stored in said second memory to convert the information contained in said second group into the information contained in said third group for output.

2. The information service system of claim 1, wherein said portable device also includes a rewrite block connected to said first memory to rewrite the association between the information contained in said first group and the information contained in said second group stored in said first memory.

3. The information service system of claim 1, wherein:
said second memory includes
a third memory storing an association between the information contained in said second group and information contained in a fourth group, and
a fourth memory storing an association between the information contained in said fourth group and the information contained in said third group; and
said second conversion block includes
a third conversion block connected to said first receive block and said third memory to receive the output of said first receive block and refer to the association stored in said third memory to convert the information contained in said second group into the information contained in said fourth group for output, and
a fourth conversion block connected to said third conversion block and said fourth memory to receive an output of said third conversion block and refer to the association stored in said fourth memory to convert the information contained in said fourth group into the information contained in said third group for output.

4. The information service system of claim 3, further comprising a central control system connected to said third memory to rewrite the association between the information contained in said second group and the information contained in said fourth group stored in said third memory.

5. The information service system of claim 1, said portable device further including an information output block outputting the information contained in said fourth group, wherein:
said first memory stores an association between the information contained in said first group, the information contained in said second group and the information contained in said fourth group; and
said first conversion block is connected to said input block, said information output block and said first memory to receive the information contained in said first group and the information contained in said fourth group and refer to the association stored in said first memory to convert the information contained in said first group and the information contained in said fourth group into the information contained in said second group.

6. The information service system of claim 5, wherein said information output block includes a clock block outputting a current time.

7. The information service system of claim 1, wherein:
said information service device also includes a second transmit block connected to said second conversion block to transmit an output of said second conversion block to said portable device; and
said portable device also includes
a second receive block receiving information from said second transmit block, and
a display block connected to said second receive block to display an output of said second receive block.

8. The information service system of claim 7, said portable device also including an identifier memory storing an identifier of said portable device, wherein:
said first transmit block is connected to said first conversion block and said identifier memory to output the output of said first conversion block together with the identifier of said portable device to said information service device;
said second transmit block transmits to said portable device the output of said second conversion block together with the identifier of said portable device received by said first receive block; and
said display block is connected to said second receive block and said identifier memory to refer to a result of comparing an identifier received by said second receive block with an identifier stored in said identifier memory to display the output of said second conversion block.

9. The information service system of claim 7, wherein said second receive block receives and converts the information from said second transmit block into a predetermined language for output.

10. The information service system of claim 1, wherein said information service device also includes a display block connected to said second conversion block to display an output of said second conversion block.

11. The information service system of claim 10, said portable device also including an identifier memory storing an identifier of said portable device, wherein:
said first conversion block is connected to said input block, said first memory and said identifier memory to receive the information contained in said first group and refer to the association stored in said first memory to convert the information contained in said first group into the information contained in said second group for output together with said identifier; and
said second conversion block is connected to said first receive block and said second memory to receive the output of said first receive block and refer to the association stored in said second memory to convert the information contained in said second group into the information contained in said third group for output together with said identifier.

12. The information service system of claim 1, wherein said information contained in the first group corresponds to information that is incapable of specifying places, and
said information contained in the second group corresponds to information that is capable of specifying the places.

13. In an information service system comprising a portable device receiving information contained in a first group and converting the information contained in said first group into information contained in a second group for output, and an information service device receiving the information contained in said second group and converting the information contained in said second group into information contained in a third group, said portable device includes:
- an input block inputting the information contained in said first group;
- a first memory storing an association between the information contained in said first group and the information contained in said second group;
- a first conversion block connected to said input block and said first memory to receive the information contained in said first group and refer to the association stored in said first memory to convert the information contained in said first group into the information contained in said second group; and
- a first transmit block connected to said first conversion block to receive an output of said first conversion block and transmit the output of said first conversion block to said information service device.

14. The portable device of claim 13, further including a rewrite block connected to said first memory to rewrite the association between the information contained in said first group and the information contained in said second group stored in said first memory.

15. The portable device of claim 13, further including an information output block outputting information contained in a fourth group, wherein:
- said first memory stores an association between the information contained in said first group, the information contained in said second group and the information contained in said fourth group; and
- said first conversion block is connected to said input block, said information output block and said first memory to receive the information contained in said first group and the information contained in said fourth group and refer to the association stored in said first memory to convert the information contained in said first group and the information contained in said fourth group into the information contained in said second group.

16. The portable device of claim 15, wherein said information output block includes a clock block outputting a current time.

17. The portable device of claim 13, further comprising:
- a first receive block receiving from said information service device the information contained in said third group; and
- a display block connected to said first receive block to display an output of said first receive block.

18. The portable device of claim 17, wherein said first receive block receives from said information service device the information contained in said third group and converts the received information contained in said third group into a predetermined language for output.

19. In an information service system comprising a portable device receiving information contained in a first group and converting the information contained in said first group into information contained in a second group for output, and an information service device receiving the information contained in said second group and converting the information contained in said second group into information contained in a third group, said information service device includes:
- a first memory storing an association between the information contained in said second group and the information contained in said third group;
- a first receive block receiving from said portable device the information contained in said second group; and
- a first conversion block connected to said first receive block and said first memory to receive an output of said first receive block and refer to the association stored in said first memory to convert the information contained in said second group into the information contained in said third group for output.

20. The information service device of claim 19, wherein:
said first memory includes
- a second memory storing an association between the information contained in said second group and information contained in a fourth group, and
- a third memory storing an association between the information contained in said fourth group and the information contained in said third group; and said first conversion block includes
- a second conversion block connected to said first receive block and said second memory to receive the output of said first receive block and refer to the association stored in said second memory to convert the information contained in said second group into the information contained in said fourth group for output, and
- a third conversion block connected to said second conversion block and said third memory to receive an output of said second conversion block and refer to the association stored in said third memory to convert the information contained in said fourth group into the information contained in said third group for output.

21. The information service device of claim 19, further comprising a display block connected to said first conversion block to display an output of said first conversion block.

22. The information service device of claim 19, wherein the information contained in the first group corresponds to information that is incapable of specifying places, and the information contained in the second group corresponds to information that is capable of specifying places.

23. An information service system comprising:
- a portable device receiving information contained in a first group, and outputting the information contained in said first group and an identifier of the portable device; and
- an information service device receiving the information contained in said first group and said identifier to convert the information contained in said first group and said identifier into information contained in a second group and convert the information contained in said second group into information contained in a third group for output; wherein:

said portable device includes
- an identifier memory storing said identifier,
- an input block inputting the information contained in said first group, and
- a first transmit block connected to said input block and said identifier memory to receive the information contained in said first group and transmit to said information service device the information contained in said first group and said identifier stored in said identifier memory; and said information service device includes
- a first receive block receiving information from said first transmit block,
- a first memory storing an association between the information contained in said first group, said identifier and the information contained in said second group, a second memory storing an association between the information contained in said second group and the information contained in said third group, a first conversion block connected to said first receive block and said first memory to receive an output of said first receive block and refer to the association stored in said first memory to convert the information contained in said first group and said identifier into the information contained in said second group for output, and a second conversion block connected to said first conversion block and said second memory to receive an output of said first conversion block and refer to the association stored in said second memory to convert the information contained in said second group into the information contained in said third group for output.

24. The information service system of claim 23, further comprising a central control system connected to said first memory to rewrite the association between the information contained in said first group, said identifier and the information contained in said second group, stored in said first memory.

25. The information service system of claim 23, wherein:

said information service device also includes a second transmit block connected to said second conversion block to transmit an output of said second conversion block to said portable device; and said portable device also includes a second receive block receiving information from said second transmit block, and a display block connected to said second receive block to display an output of said second receive block.

26. The information service system of claim 25, wherein said second receive block receives and converts the information from said second transmit block into a predetermined language for output.

27. The information service system of claim 23, wherein said information service device also includes a display block connected to said second conversion block to display an output of said second conversion block.

28. The information service system of claim 27, wherein:

said first conversion block includes a third conversion block connected to said first receive block and said first memory to receive the output of said first receive block and refer to the association stored in said first memory to convert the information contained in said first group and said identifier into the information contained in said second group for output together with said identifier; and said second conversion block is connected to said third conversion block and said second memory to receive an output of said third conversion block and refer to the association stored in said second memory to convert the information contained in said second group into the information contained in said third group for output together with said identifier.

29. In an information service system comprising a portable device receiving information contained in a first group and outputting the information contained in said first group and an identifier of said portable device, and an information service device receiving the information contained in said first group and said identifier and converting the information contained in said first group and said identifier into information contained in a second group and further converting the information contained in said second group into information contained in a third group for output, said portable device includes:

an identifier memory storing said identifier;

an input block receiving the information contained in said first group; and a first transmit block connected to said input block and said identifier memory to receive the information contained in said first group and transmit to said information service device the information contained in said first group and said identifier stored in said identifier memory.

30. The portable device of claim 29, further comprising:

a first receive block receiving an output of said information service device; and a display block connected to said first receive block to display an output of said first receive block.

31. The portable device of claim 30, wherein said first receive block receives and converts the output of said information service system into a predetermined language for output.

32. In an information service system comprising a portable device receiving information contained in a first group and outputting the information contained in said first group and an identifier of said portable device, and an information service device receiving the information contained in said first group and said identifier and converting the information contained in said first group and said identifier into information contained in a second group and further converting the information contained in said second group into information contained in a third group for output, said information service device includes:

a first receive block receiving an output of said portable device;

a first memory storing an association between the information contained in said first group, said identifier and the information contained in said second group;

a second memory storing an association between the information contained in said second group and the information contained in said third group;

a first conversion block connected to said first receive block and said first memory to receive an output of said first receive block and refer to the association stored in said first memory to convert the information contained in said first group and said identifier into the information contained in said second group for output; and a second conversion block connected to said first conversion block and said second memory to receive an output of said first conversion block and refer to the association stored in said second memory to convert the information contained in said second group into the information contained in said third group for output.

33. The information service device of claim 32, further comprising a display block connected to said second conversion block to display an output of said second conversion block.

34. An information service system comprising:

a portable device receiving information contained in a first group and outputting the information contained in said first group; and an information service device receiving the information contained in said first group and converting the information contained in said first group into information contained in a second group and further converting the information contained in said second group into information contained in a third group for output; wherein:

said portable device includes
an input block inputting the information contained in said first group, and
a first transmit block connected to said input block to receive the information contained in said first group and transmit to said information service device the information contained in said first group; and
said information service device includes
a first receive block receiving information from said first receive block,
an information output block outputting information contained in a fourth group,
a first memory storing an association between the information contained in said first group, the information contained in said second group and the information contained in said fourth group,
a second memory storing an association between the information stored in said second group and the information stored in said third group,
a first conversion block connected to said first receive block, said information output block and said first memory to receive the information contained in said first group and the information contained in said fourth group and refer to the association stored in said first memory to convert the information contained in said first group and the information contained in said fourth group into the information contained in said second group, and
a second conversion block connected to said first conversion block and said second memory to receive an output of said first conversion block and refer to the association stored in said second memory to convert the information contained in said second group into the information contained in said third group for output.

35. The information service system of claim 34, wherein said information output block includes a clock block outputting a current time.

36. The information service system of claim 34, wherein:
said information service device also includes a second transmit block connected to said second conversion block to transmit an output of said second conversion block to said portable device; and
said portable device also includes
a second receive block receiving information from said second transmit block, and
a display block connected to said second receive block to display an output of said second receive block.

37. The information service system of claim 36, said portable device also including an identifier memory storing an identifier of said portable device, wherein:
said first transmit block is connected to said input block and said identifier memory to transmit to said information service device the information contained in said first group together with the identifier of said portable device;
said second transmit block transmits to said portable device the output of said second conversion block together with the identifier of said portable device received by said first receive block; and
said display block is connected to said second receive block and said identifier memory to refer to a result of comparing an identifier received by said second receive block with the identifier stored in said identifier memory to display the output of said second conversion block.

38. In an information service system comprising a portable device receiving information contained in a first group and outputting the information contained in said first group, and an information service device receiving the information contained in said first group and converting the information contained in said first group into information contained in said second group and further converting the information contained in said second group into information contained in a third group for output, said portable device includes:
an input block inputting information contained in said first group;
an identifier memory storing an identifier of said portable device;
a transmit block connected to said input block and said identifier memory to transit to said information service device the information contained in said first group together with the identifier of said portable device;
a receive block receiving from said information service device the information contained in said third group and the identifier of said portable device; and
a display block connected to said receive block and said identifier memory to refer to a result of comparing the identifier received by said receive block with the identifier stored in said identifier memory to display the information contained in said third group.

39. In an information service system comprising a portable device receiving information contained in a first group and outputting the information contained in said first group, and an information service device receiving the information contained in said first group and converting the information contained in said first group into information contained in said second group and further converting the information contained in said second group into information contained in a third group for output, said information service device includes:
a first receive block receiving information from said portable device;
an information output block outputting information contained in a fourth group;
a first memory storing an association between the information contained in said first group, the information contained in said second group and the information contained in said fourth group;
a second memory storing an association between the information contained in said second group and the information contained in said third group;
a first conversion block connected to said receive block, said information output block and said first memory to receive the information contained in said first group and the information contained in said fourth group and refer to the association stored in said first memory to convert the information contained in said first group and the information contained in said fourth group into the information contained in said second group; and
a second conversion block connected to said first conversion block and said second memory to receive an output of said first conversion block and refer to the association stored in said second memory to convert the information contained in said second group into the information contained in said third group for output.

40. An information service system comprising:
a portable device receiving information contained in a first group and outputting the information contained in said first group;
an information service device receiving the information contained in said first group and converting the information contained in said first group into information contained in a second group and further converting the information contained in said second group into information contained in a third group for output; and a relay device relaying information between said portable device and said information service device; wherein:

said portable device includes
an input block inputting the information contained in said first group, and
a first transmit block connected to said input block to receive the information contained in said first group and transmit to said relay device the information contained in said first group;

said relay device includes
a first receive block receiving information from said first transmit block, and
a second transmit block connected to said first receive block to receive the information contained in said first group and transmit to said information service device the information contained in said first group; and said information service device includes
a first memory storing an association between the information contained in said first group and the information contained in said second group,
a second memory storing an association between the information contained in said second group and the information contained in said third group,
a second receive block receiving information from said relay device,
a first conversion block connected to said second receive block and said first memory to refer to the association stored in said first memory to convert the information contained in said first group into the information contained in said second group for output, and
a second conversion block connected to said first conversion block and said second memory to refer to the association stored in said second memory to convert the information contained in said second group into the information contained in said third group for output.

41. The information service system of claim 40, said information service device further including an information output block outputting information contained in a fourth group, wherein:

said first memory stores an association between the information contained in said first group, the information contained in said second group and the information contained in said fourth group; and said first conversion block is connected to said second receive block, said information output block and said first memory to refer to the association stored in said first memory to convert the information contained in said first group and the information contained in said fourth group into the information contained in said second group for output.

42. The information service system of claim 41, wherein said information output block includes a clock block outputting a current time.

43. The information service system of claim 41, wherein:

said relay device also includes a relay device identifier memory storing an identifier of said relay device;

said second transmit block is connected to said first receive block and said relay device identifier memory to transmit to said information service device the information contained in said first group together with the identifier of said relay device;

said information service device also includes a third memory storing an association between the identifier of said relay device and information contained in a fifth group;

said first memory stores an association between the information contained in said first group, the information contained in said second group, the information contained in said fourth group and the information contained in said fifth group; and said first conversion block is connected to said second receive block, said information output block, said first memory and said third memory to receive the identifier of said relay device and refer to the association stored in said third memory to convert the identifier of said relay device into the information contained in said fifth group, and further refer to the association stored in said first memory to convert the information contained in said first group, the information contained in said fourth group and the information contained in said fifth group into the information contained in said second group for output.

44. The information service system of claim 40, wherein:

said information service device also includes a third transmit block connected to said second conversion block to transmit an output of said second conversion block to said relay device;

said relay device also includes
a third receive block receiving information from said third transmit block, and
a fourth transmit block connected to said third receive block to transmit to said portable device the information from said third transmit block; and said portable device also includes
a fourth receive block receiving information from said fourth transmit block, and
a display block connected to said fourth receive block to display an output of said fourth receive block.

45. The information service system of claim 44, said portable device also including a portable device identifier memory storing an identifier of said portable device, wherein:

said first transmit block is connected to said input block and said portable device identifier memory to transmit to said relay device the information contained in said first group together with the identifier of said portable device;

said fourth transmit block transmits to said portable device the output of said second conversion block together with the identifier of said portable device received by said first receive block; and said display block is connected to said fourth receive block and said portable device identifier memory to refer to a result of comparing an identifier received by said fourth receive block with an identifier stored in said portable device identifier memory to display the output of said fourth receive block.

46. In an information service system comprising a portable device receiving information contained in a first group and outputting the information contained in said first group, an information service device receiving the information contained in said first group and converting the information contained in said first group into information contained in a second group and further converting the information contained in said second group into information contained in a third group for output, and a relay device relaying information between said portable device and said information service device, said information service device includes:
  a first memory storing an association between the information contained in said first group and the information contained in said second group;
  a second memory storing an association between the information contained in said second group and the information contained in said third group;
  a receive block receiving the information from said relay device;
  a first conversion block connected to said receive block and said first memory to refer to the association stored in said first memory to convert the information contained in said first group into the information contained in said second group for output; and
  a second conversion block connected to said first conversion block and said second memory to refer to the association stored in said second memory to convert the information contained in said second group into the information contained in said third group for output.

47. The information service device of claim 46, further including an information output block outputting information contained in a fourth group, wherein:
  said first memory stores an association between the information contained in said first group, the information contained in said second group and the information contained in said fourth group; and
  said first conversion block is connected to said receive block, said information output block and said first memory to refer to the association stored in said first memory to convert the information contained in said first group and the information contained in said fourth group into the information contained in said second group for output.

48. The information service system comprising:
  a portable device receiving information contained in a first group to convert the information contained in said first group into information contained in a second group for output;
  an information service device receiving the information contained in said second group to convert the information contained in said second group into information contained in a third group for output; and
  a relay device relaying information between said portable device and said information service device; wherein:
  said portable device includes
    an input block inputting the information contained in said first group,
    a first memory storing an association between the information contained in said first group and the information contained in said second group,
    a first conversion block connected to said input block and said first memory to refer to the association stored in said first memory to convert the information contained in said first group into the information contained in said second group, and
    a first transmit block connected to said first conversion block to transmit to said relay device the information contained in said second group;
  said relay device includes
    a first receive block receiving information from said first transmit block, and
    a second transmit block connected to said first receive block to receive the information contained in said second group and transmit to said information service device the information contained in said second group; and
  said information service device includes
    a second memory storing an association between the information contained in said second group and the information contained in said third group,
    a second receive block receiving information from said second transmit block, and
    a second conversion block connected to said second receive block and said second memory to refer to the association stored in said second memory to convert the information received by said second receive block and contained in said second group into the information contained in said third group for output.

49. The information service system of claim 48, said portable device further including an information output block outputting information contained in a fourth group, wherein:
  said first memory stores an association between the information contained in said first group, the information contained in said second group and the information contained in said fourth group; and
  said first conversion block is connected to said input block, said information output block and said first memory to refer to the association stored in said first memory to convert the information contained in said first group and the information contained in said fourth group into the information contained in said second group for output.

50. The information service system of claim 49, wherein said information output block includes a clock block outputting a current time.

51. The information service system of claim 49, said relay device also including a relay device identifier memory storing an identifier of said relay device, wherein:
  said second transmit block is connected to said first receive block and said relay device identifier memory to transmit to said information service device the information contained in said second group together with the identifier of said relay device;
  said second memory stores an association between the information contained in said second group, the identifier of said relay device and the information contained in said third group; and
  said second conversion block is connected to said second receive block and said second memory to refer to the association stored in said second memory to convert the information received by said second receive block and contained in said second group and the identifier of said relay device into the information contained in said third group for output.

52. The information service system of claim 48, wherein:
  said information service device also includes a third transmit block connected to said second conversion block to transmit an output of said second conversion block to said relay device;
  said relay device also includes
    a third receive block receiving information from said third transmit block, and
    a fourth transmit block connected to said third receive block to transmit to said portable device the information from said third transmit block; and
  said portable device also includes
    a fourth receive block receiving information from said fourth transmit block, and a display block connected to said fourth receive block to display an output of said fourth receive block.

53. The information service system of claim 52, said portable device also including a portable device identifier memory storing an identifier of said portable device, wherein:

said first transmit block is connected to said first conversion block and said portable device identifier memory to transmit to said relay device the information contained in said second group together with the identifier of said portable device;

said fourth transmit block transmits to said portable device the information from said third transmit block together with the identifier of said portable device received by said first receive block; and said display block is connected to said fourth receive block and said portable device identifier memory to refer to a result of comparing an identifier received by said fourth receive block with an identifier stored in said portable device identifier memory to display the output of said fourth receive block.

54. In an information service system comprising a portable device receiving information contained in a first group and converting the information contained in said first group into information contained in a second group for output, an information service device receiving the information contained in said second group and converting the information contained in said second group into information contained in a third group for output, and a relay device relaying information between said portable device and said information service device, said portable device includes:

an input block inputting the information contained in said first group;

a memory storing an association between the information contained in said first group and the information contained in said second group;

a conversion block connected to said input block and said memory to refer to the association stored in said memory to convert the information contained in said first group into the information contained in said second group for output; and a transmit block connected to said conversion block to transmit to said relay device the information contained in said second group.

55. In an information service system comprising a portable device receiving information contained in a first group and converting the information contained in said first group into information contained in a second group for output, an information service device receiving the information contained in said second group and converting the information contained in said second group into information contained in a third group for output, and a relay device relaying information between said portable device and said information service device, said information service device includes:

a memory storing an association between the information contained in said second group and the information contained in said third group;

a receive block receiving information from said relay device; and a conversion block connected to said receive block and said memory to refer to the association stored in said memory to convert the information received by said receive block and contained in said second group into the information contained in said third group for output.

* * * * *